US008166314B1

(12) United States Patent
Raizen et al.

(10) Patent No.: US 8,166,314 B1
(45) Date of Patent: Apr. 24, 2012

(54) SELECTIVE I/O TO LOGICAL UNIT WHEN ENCRYPTED, BUT KEY IS NOT AVAILABLE OR WHEN ENCRYPTION STATUS IS UNKNOWN

(75) Inventors: Helen S. Raizen, Jamaica Plain, MA (US); Jeffrey Camp, Apex, NC (US); Michael E. Bappe, Loveland, CO (US)

(73) Assignee: EMC Corporation, Hopkinton, MA (US)

( * ) Notice: Subject to any disclaimer, the term of this patent is extended or adjusted under 35 U.S.C. 154(b) by 652 days.

(21) Appl. No.: 12/346,412

(22) Filed: Dec. 30, 2008

(51) Int. Cl.
*G06F 12/14* (2006.01)
(52) U.S. Cl. .......................... 713/193; 713/321; 711/164
(58) Field of Classification Search .................. 713/193; 711/164; 719/321
See application file for complete search history.

(56) References Cited

U.S. PATENT DOCUMENTS

| | | | |
|---|---|---|---|
| 5,742,792 A | 4/1998 | Yanai et al. | |
| 5,995,511 A | 11/1999 | Zhou et al. | |
| 6,101,497 A | 8/2000 | Ofek | |
| 6,145,028 A | 11/2000 | Shank et al. | |
| 6,230,229 B1 | 5/2001 | Van Krevelen et al. | |
| 6,249,866 B1 | 6/2001 | Brundrett et al. | |
| 6,249,896 B1 | 6/2001 | Brundrett et al. | |
| 6,408,348 B1 * | 6/2002 | Blount et al. | 710/38 |
| 6,434,637 B1 | 8/2002 | D'Errico | |
| 6,493,772 B1 * | 12/2002 | Hughes | 710/19 |
| 6,542,944 B2 | 4/2003 | D'Errico | |
| 6,542,994 B1 | 4/2003 | Dircks et al. | |
| 6,564,336 B1 | 5/2003 | Majkowski | |
| 6,629,189 B1 | 9/2003 | Sandstrom et al. | |
| 6,810,398 B2 | 10/2004 | Moulton | |
| 6,883,049 B1 | 4/2005 | Fuld et al. | |
| 6,947,556 B1 | 9/2005 | Matyas, Jr. et al. | |
| 6,973,529 B2 | 12/2005 | Casper et al. | |
| 7,032,041 B2 | 4/2006 | Sahara et al. | |
| 7,065,619 B1 | 6/2006 | Zhu et al. | |
| 7,076,690 B1 | 7/2006 | Todd et al. | |
| 7,080,221 B1 | 7/2006 | Todd et al. | |

(Continued)

OTHER PUBLICATIONS

EMC Corporation, EMC Invista Deployment Scenarios, by M. Waxman and B. Carr, EMC World Boston 2006, 31 pages.

(Continued)

*Primary Examiner* — Thuha T. Nguyen
*Assistant Examiner* — Andrew Georgandellis
(74) *Attorney, Agent, or Firm* — Daly, Crowley, Mofford & Durkee, LLP

(57) ABSTRACT

A method is provided for controlling I/O request access to an encrypted storage device when the encryption key for the encrypted storage device is not available. The method comprises the unordered steps of: providing an I/O filter driver in operable communication with an encrypted storage device, such that all I/O requests to the encrypted storage device are processed first through the I/O filter driver; receiving at the I/O filter driver an I/O request to the encrypted storage device; determining, for each I/O request, the type of the I/O request and, if the I/O request comprises a read, SCSI read, write, or SCSI write, determining a location on the storage device to which the I/O request is directed; determining, in a processor, whether a time period for obtaining the encryption key is still running; and, based on at least one of the I/O request type, whether the time period for obtaining the encryption key is still running, and, if applicable, the location on the device to which the I/O is requested, determining, in a processor, whether the I/O request to the encrypted storage device will be allowed.

20 Claims, 28 Drawing Sheets

U.S. PATENT DOCUMENTS

| | | | |
|---|---|---|---|
| 7,080,225 | B1 | 7/2006 | Todd |
| 7,093,088 | B1 | 8/2006 | Todd et al. |
| 7,120,912 | B2 | 10/2006 | Kadoiri et al. |
| 7,130,928 | B2 | 10/2006 | Hayashi et al. |
| 7,143,251 | B1 | 11/2006 | Patterson |
| 7,146,499 | B2 | 12/2006 | Yellepeddy |
| 7,206,863 | B1 | 4/2007 | Oliveira et al. |
| 7,240,135 | B2 | 7/2007 | Bai et al. |
| 7,272,602 | B2 | 9/2007 | Moulton |
| 7,305,532 | B2 | 12/2007 | Zhu et al. |
| 7,337,235 | B2 | 2/2008 | Allen et al. |
| 7,362,868 | B2 | 4/2008 | Madoukh et al. |
| 7,424,498 | B1 | 9/2008 | Patterson |
| 7,451,168 | B1 | 11/2008 | Patterson |
| 7,469,313 | B1 | 12/2008 | Venkatanarayanan et al. |
| 7,472,242 | B1 | 12/2008 | Deshmukh et al. |
| 7,500,246 | B2 | 3/2009 | Saake et al. |
| 7,519,635 | B1 | 4/2009 | Haustein et al. |
| 7,526,623 | B1 | 4/2009 | Rao |
| 7,536,503 | B1 | 5/2009 | Venatanarayanan et al. |
| 7,539,710 | B1 | 5/2009 | Haustein et al. |
| 7,558,916 | B2 | 7/2009 | Chikusa et al. |
| 7,562,186 | B2 | 7/2009 | Li et al. |
| 7,567,188 | B1 | 7/2009 | Anglin et al. |
| 7,568,052 | B1 | 7/2009 | Cwiakala et al. |
| 7,594,085 | B1 | 9/2009 | Rao |
| 7,603,529 | B1 | 10/2009 | MacHardy et al. |
| 7,603,532 | B2 | 10/2009 | Rajan et al. |
| 7,747,584 | B1 | 6/2010 | Jernigan, IV |
| 7,770,053 | B1 | 8/2010 | Bappe et al. |
| 7,809,912 | B1 | 10/2010 | Raizen et al. |
| 7,904,681 | B1 | 3/2011 | Bappe et al. |
| 7,957,398 | B1 | 6/2011 | Yochai et al. |
| 7,984,022 | B2 | 7/2011 | Cannon et al. |
| 2002/0099944 | A1 | 7/2002 | Bowin |
| 2002/0133512 | A1 | 9/2002 | Milillo |
| 2002/0166005 | A1 | 11/2002 | Errico |
| 2003/0056095 | A1 | 3/2003 | Elliott et al. |
| 2003/0065871 | A1 | 4/2003 | Casper et al. |
| 2003/0105734 | A1 | 6/2003 | Hitchen et al. |
| 2003/0140209 | A1 | 7/2003 | Testardi |
| 2003/0177290 | A1 | 9/2003 | Ayukawa et al. |
| 2003/0226059 | A1 | 12/2003 | Braun |
| 2004/0042489 | A1 | 3/2004 | Messick et al. |
| 2004/0080558 | A1 | 4/2004 | Blumenau et al. |
| 2004/0250021 | A1 | 12/2004 | Honda et al. |
| 2005/0076154 | A1 | 4/2005 | Chambliss et al. |
| 2005/0086501 | A1 | 4/2005 | Woo et al. |
| 2005/0108304 | A1 | 5/2005 | Wilson et al. |
| 2005/0114286 | A1 | 5/2005 | Bai et al. |
| 2005/0138308 | A1 | 6/2005 | Morishita et al. |
| 2005/0144199 | A2 | 6/2005 | Hayden |
| 2005/0144332 | A1 | 6/2005 | Nellitheertha |
| 2005/0172094 | A1* | 8/2005 | Goodwin ............... 711/163 |
| 2005/0228950 | A1 | 10/2005 | Karr |
| 2005/0235132 | A1 | 10/2005 | Karr et al. |
| 2005/0278465 | A1 | 12/2005 | Qi |
| 2005/0283552 | A1 | 12/2005 | Kobashi et al. |
| 2006/0069862 | A1 | 3/2006 | Kano |
| 2006/0095686 | A1 | 5/2006 | Miller et al. |
| 2006/0150247 | A1 | 7/2006 | Gafken |
| 2007/0061373 | A1 | 3/2007 | Kilday |
| 2007/0079095 | A1 | 4/2007 | Hanley |
| 2007/0150956 | A1 | 6/2007 | Sharma et al. |
| 2007/0168569 | A1 | 7/2007 | Bonwick et al. |
| 2007/0226519 | A1 | 9/2007 | Elbring |
| 2007/0233707 | A1 | 10/2007 | Osmond et al. |
| 2008/0034268 | A1 | 2/2008 | Dodd et al. |
| 2008/0162725 | A1 | 7/2008 | Voigt et al. |
| 2008/0184001 | A1 | 7/2008 | Stager |
| 2008/0209448 | A1* | 8/2008 | Ayres et al. ............ 719/321 |
| 2008/0232592 | A1* | 9/2008 | Lee et al. ............... 380/277 |
| 2008/0244172 | A1 | 10/2008 | Kano |
| 2008/0250178 | A1 | 10/2008 | Haustein et al. |
| 2008/0282047 | A1 | 11/2008 | Arakawa et al. |
| 2008/0295174 | A1 | 11/2008 | Fahmy et al. |
| 2009/0049217 | A1 | 2/2009 | Shimada |
| 2009/0049260 | A1 | 2/2009 | Upadhyayula |
| 2009/0063528 | A1 | 3/2009 | Yueh |
| 2009/0063795 | A1 | 3/2009 | Yueh |
| 2009/0076849 | A1 | 3/2009 | Diller |
| 2009/0119449 | A1 | 5/2009 | Chengal |
| 2009/0193223 | A1 | 7/2009 | Saliba et al. |
| 2009/0198805 | A1 | 8/2009 | Ben-Shaul et al. |
| 2009/0216774 | A1 | 8/2009 | Rao et al. |
| 2009/0216788 | A1 | 8/2009 | Rao et al. |
| 2009/0235022 | A1 | 9/2009 | Bates et al. |
| 2009/0276595 | A1 | 11/2009 | Abzarian et al. |
| 2009/0327720 | A1 | 12/2009 | Cathro |
| 2010/0250896 | A1 | 9/2010 | Matze |

OTHER PUBLICATIONS

EMC Corporation, Non-disruptive Data Migration with PowerPath Migration Enabler—a breakthrough technology from EMC, by J. Crum and H. Raizen, EMC World Boston 2006, 26 pages.

EMC Corporation, EMC plans array-based encryption via Power-Path, Feb. 8, 2007, ComputerWeekly.com. http://www.computerweekly.com/Articles/ArticlePge.aspx?ArticleID=221890&PrinterFriendly=true.

EMC Corporation, EMC Adds Disk Encryption to Security Portfolio, Heidi Biggar, Apr. 2008, Enterprise Strategy Group, Inc. http://www.emc.com/collateral/analyst-reports/esg-disc-encryption-security-portfolio.pdf.

Encrypting Data at Rest, Stacy Collett, Mar. 27, 2006, Computerworld. http://www.computerworld.com/action/article.do?command=printArticleBasic&articleId=109826.

EMC Corporation White Paper, Approaches for encryption of Data-at-Rest in the Enterprise, A Detailed Review, Jan. 2008, pp. 1-24. Part No. H4173. http://www.emc.com/collateral/hardware/white-papers/h4173-approaches-encryption-data-at-rest-enterprise-wp.pdf.

Guide to Storage Encryption Technologies for End User Devices, Karen Scarfone, Murugiah Souppaya and Matt Sexton, National Institute of Standards and Technology, U.S. Department of Commerce Special Publication 800-111, Nov. 2007. http://csrc.nist.gov/publications/histpubs/800-111/SP800-111.pdf.

EMC Corporation, PowerPath® Encryption with RSA, The EMC Solution for Securing Data in Enterprise Storage, Aug. 2008. http://www.emc.com/collateral/software/white-papers/rkmpp-sb-0808-lowres.pdf.

EMC Corporation, Press Release: EMC Strengthens Disk-Based Security with New Encryption Capabilities, Hopkinton, MA, Apr. 8, 2008. http://www.emc.com/about/news/press/2008/20080408-02.htm.

U.S. Appl. No. 11/478,897, Prakash Venkatanarayanan, et al., filed Jun. 30, 2006, file through Mar. 10, 2009, 100 pages.

U.S. Appl. No. 11/478,946, Prakash Venkatanarayanan, et al., filed Jun. 30, 2006, file through Mar. 10, 2009, 291 pages.

U.S. Appl. No. 11/536,995, Helen S. Raizen, et al., filed Sep. 29, 2006, file through Mar. 10, 2009, 541 pages.

U.S. Appl. No. 11/863,745, Bradford B. Glade, et al., filed Sep. 28, 2007, file through Mar. 10, 2009, 541 pages.

U.S. Appl. No. 11/682,049, Yechiel Yochai, et al., filed Mar. 5, 2007, file through Mar. 10, 2009, 123 pages.

U.S. Appl. No. 11/607,067, Michael E. Bappe, et al., filed Dec. 1, 2006, file through Mar. 10, 2009, 544 pages.

U.S. Appl. No. 11/427,889, Michael E. Bappe, et al., filed Jun. 30, 2006, file through Mar. 10, 2009, 156 pages.

U.S. Appl. No. 12/242,690, Helen S. Raizen, et al., filed Sep. 30, 2008, file through Mar. 10, 2009, 152 pages.

U.S. Appl. No. 12/242,638, Helen S. Raizen, et al., filed Sep. 30, 2008, file through Mar. 10, 2009, 149 pages.

"Approaches for Encryption of Data-at-Rest in the Enterprise *A Detailed Review*"; EMC Corporation, Part No. H4173; Jan. 2008, pp. 1-24.

"Securing data at rest white paper, An enterprise strategy for data encryption and key management", Hewlett-Packard Development Company, L.P., 4AA1-6170ENW, Oct. 2007, pp. 1-8.

U.S. Appl. No. 12/242,690, Helen S. Raizen, et al., filed Sep. 30, 2008 file from Mar. 11, 2009 through Oct. 11, 2011, 299 pages, Part1.

U.S. Appl. No. 12/242,690, Helen S. Raizen, et al., filed Sep. 30, 2008 file from Mar. 11, 2009 through Oct. 11, 2011, 308 pages, Part2.

U.S. Appl. No. 12/242,690, Helen S. Raizen, et al., filed Sep. 30, 2008 file from Mar. 11, 2009 through Oct. 11, 2011, 272 pages, Part3.
U.S. Appl. No. 12/242,690, Helen S. Raizen, et al., filed Sep. 30, 2008 file from Mar. 11, 2009 through Oct. 11, 2011, 395 pages, Part4.
U.S. Appl. No. 12/242,690, Helen S. Raizen, et al., filed Sep. 30, 2008 file from Mar. 11, 2009 through Oct. 11, 2011, 270 pages, Part5.
U.S. Appl. No. 12/242,690, Helen S. Raizen, et al., filed Sep. 30, 2008 file from Mar. 11, 2009 through Oct. 11, 2011, 269 pages, Part6.
U.S. Appl. No. 12/242,690, Helen S. Raizen, et al., filed Sep. 30, 2008 file from Mar. 11, 2009 through Oct. 11, 2011, 272 pages, Part7.
U.S. Appl. No. 12/242,690, Helen S. Raizen, et al., filed Sep. 30, 2008 file from Mar. 11, 2009 through Oct. 11, 2011, 562 pages, Part8.
U.S. Appl. No. 12/242,690, Helen S. Raizen, et al., filed Sep. 30, 2008 file from Mar. 11, 2009 through Oct. 11, 2011, 205 pages, Part9a.
U.S. Appl. No. 12/242,690, Helen S. Raizen, et al., filed Sep. 30, 2008 file from Mar. 11, 2009 through Oct. 11, 2011, 190 pages, Part9b.
U.S. Appl. No. 12/242,690, Helen S. Raizen, et al., filed Sep. 30, 2008 file from Mar. 11, 2009 through Oct. 11, 2011, 441 pages, Part10.
U.S. Appl. No. 11/863,745, Bradford B. Glade, et al., filed Sep. 28, 2007, file from Mar. 11, 2009 through Sep. 26, 2011, 151 pages.
U.S. Appl. No. 13/096,397, filed Apr. 28, 2011, 93 pages.
U.S. Appl. No. 12/242,638, Helen S. Raizen, et al., filed Sep. 30, 2008 file from Mar. 10, 2009 through Nov. 2, 2011, 156 pages, Part1.
U.S. Appl. No. 12/242,638, Helen S. Raizen, et al., filed Sep. 30, 2008 file from Mar. 10, 2009 through Nov. 2, 2011, 391 pages, Part2.
U.S. Appl. No. 12/242,638, Helen S. Raizen, et al., filed Sep. 30, 2008 file from Mar. 10, 2009 through Nov. 2, 2011, 271 pages, Part3.
U.S. Appl. No. 12/242,638, Helen S. Raizen, et al., filed Sep. 30, 2008 file from Mar. 10, 2009 through Nov. 2, 2011, 270 pages, Part4.
U.S. Appl. No. 12/242,638, Helen S. Raizen, et al., filed Sep. 30, 2008 file from Mar. 10, 2009 through Nov. 2, 2011, 406 pages, Part5.
U.S. Appl. No. 12/242,638, Helen S. Raizen, et al., filed Sep. 30, 2008 file from Mar. 10, 2009 through Nov. 2, 2011, 258 pages, Part6.
U.S. Appl. No. 12/242,638, Helen S. Raizen, et al., filed Sep. 30, 2008 file from Mar. 10, 2009 through Nov. 2, 2011, 272 pages, Part7.
U.S. Appl. No. 12/242,638, Helen S. Raizen, et al., filed Sep. 30, 2008 file from Mar. 10, 2009 through Nov. 2, 2011, 272 pages, Part8.
U.S. Appl. No. 12/242,638, Helen S. Raizen, et al., filed Sep. 30, 2008 file from Mar. 10, 2009 through Nov. 2, 2011, 308 pages, Part9.
U.S. Appl. No. 12/242,638, Helen S. Raizen, et al., filed Sep. 30, 2008 file from Mar. 10, 2009 through Nov. 2, 2011, 225 pages, Part10.
U.S. Appl. No. 12/242,638, Helen S. Raizen, et al., filed Sep. 30, 2008 file from Mar. 10, 2009 through Nov. 2, 2011, 395 pages, Part11.
U.S. Appl. No. 12/242,638, Helen S. Raizen, et al., filed Sep. 30, 2008 file from Mar. 10, 2009 through Nov. 2, 2011, 272 pages, Part12.
U.S. Appl. No. 12/242,638, Helen S. Raizen, et al., filed Sep. 30, 2008 file from Mar. 10, 2009 through Nov. 2, 2011, 308 pages, Part13.
U.S. Appl. No. 12/242,638, Helen S. Raizen, et al., filed Sep. 30, 2008 file from Mar. 10, 2009 through Nov. 2, 2011, 285 pages, Part14.
U.S. Appl. No. 12/242,638, Helen S. Raizen, et al., filed Sep. 30, 2008 file from Mar. 10, 2009 through Nov. 2, 2011, 173 pages, Part15.
U.S. Appl. No. 12/242,638, Helen S. Raizen, et al., filed Sep. 30, 2008 file from Mar. 10, 2009 through Nov. 2, 2011, 174 pages, Part16.
U.S. Appl. No. 12/242,638, Helen S. Raizen, et al., filed Sep. 30, 2008 file from Mar. 10, 2009 through Nov. 2, 2011, 174 pages, Part17a.
U.S. Appl. No. 12/242,638, Helen S. Raizen, et al., filed Sep. 30, 2008 file from Mar. 10, 2009 through Nov. 2, 2011, 169 pages, Part17b.
U.S. Appl. No. 12/242,638, Helen S. Raizen, et al., filed Sep. 30, 2008 file from Mar. 10, 2009 through Nov. 2, 2011, 169 pages, Part18.
U.S. Appl. No. 12/242,638, Helen S. Raizen, et al., filed Sep. 30, 2008 file from Mar. 10, 2009 through Nov. 2, 2011, 483 pages, Part19.
U.S. Appl. No. 12/242,638, Helen S. Raizen, et al., filed Sep. 30, 2008 file from Mar. 10, 2009 through Nov. 2, 2011, 308 pages, Part20.
U.S. Appl. No. 12/242,638, Helen S. Raizen, et al., filed Sep. 30, 2008 file from Mar. 10, 2009 through Nov. 2, 2011, 272 pages, Part21.
U.S. Appl. No. 12/242,638, Helen S. Raizen, et al., filed Sep. 30, 2008 file from Mar. 10, 2009 through Nov. 2, 2011, 395 pages, Part22.
U.S. Appl. No. 12/242,638, Helen S. Raizen, et al., filed Sep. 30, 2008 file from Mar. 10, 2009 through Nov. 2, 2011, 270 pages, Part23.
U.S. Appl. No. 12/242,638, Helen S. Raizen, et al., filed Sep. 30, 2008 file from Mar. 10, 2009 through Nov. 2, 2011, 269 pages, Part24.
U.S. Appl. No. 12/242,638, Helen S. Raizen, et al., filed Sep. 30, 2008 file from Mar. 10, 2009 through Nov. 2, 2011, 272 pages, Part25.
U.S. Appl. No. 12/242,638, Helen S. Raizen, et al., filed Sep. 30, 2008 file from Mar. 10, 2009 through Nov. 2, 2011, 562 pages, Part26.
U.S. Appl. No. 12/242,638, Helen S. Raizen, et al., filed Sep. 30, 2008 file from Mar. 10, 2009 through Nov. 2, 2011, 215 pages, Part27(a).
U.S. Appl. No. 12/242,638, Helen S. Raizen, et al., filed Sep. 30, 2008 file from Mar. 10, 2009 through Nov. 2, 2011, 226 pages, Part27(b).
U.S. Appl. No. 12/242,638, Helen S. Raizen, et al., filed Sep. 30, 2008 file from Mar. 10, 2009 through Nov. 2, 2011, 272 pages, Part28.
U.S. Appl. No. 12/242,638, Helen S. Raizen, et al., filed Sep. 30, 2008 file from Mar. 10, 2009 through Nov. 2, 2011, 269 pages, Part29.
U.S. Appl. No. 12/242,638, Helen S. Raizen, et al., filed Sep. 30, 2008 file from Mar. 10, 2009 through Nov. 2, 2011, 306 pages, Part30.
U.S. Appl. No. 12/642,071, filed Dec. 18, 2009, file through Oct. 18, 2011, 173 pages, Part1.
U.S. Appl. No. 12/642,071, filed Dec. 18, 2009, file through Oct. 18, 2011, 174 pages, Part2.
U.S. Appl. No. 12/642,071, filed Dec. 18, 2009, file through Oct. 18, 2011, 174 pages, Part3.
U.S. Appl. No. 12/642,109, filed Dec. 18, 2009, file through Oct. 18, 2011, 169 pages, Part1.
U.S. Appl. No. 12/642,109, filed Dec. 18, 2009, file through Oct. 18, 2011, 169 pages, Part2.
U.S. Appl. No. 12/642,109, filed Dec. 18, 2009, file through Oct. 18, 2011, 170 pages, Part3.
Press Release, EMC Expands Data Deduplication Capabilities to Industry's Broadest Backup Portfolio, http://www.emc.com/about/news/press/2009/20090519-01.htm, dated Oct. 19, 2009, 3 pages.
Lauren Whitehouse, Data Backup Tips: Backup and Recovery, Data Deduplication Methods Block-level versus byte-level dedupe, http://searchdatabackup.techtarget.com/tip/0,289483,sid187_gci1335090,000.html, dated Oct. 19, 2009, 3 pages.
Joe Spurr, Data Center News: Deduping: an essential backup tool in the data center?, http://searchdatacenter.techtarget.com/news/article/0,289142,sid80_gci1192939,00.html, dated Oct. 19, 2009, 3 pages.
BitWacki™ —Data Deduplication for Microsoft Windows Servers, Hardware-Assisted Data Deduplication and Compression with Thin Provisioning, Plug and Play Deduplication, HIFN, www.hifn.com, 2009, 2 pages.
Deduping Your Way to Storage Efficiency, Data Deduplication Cuts Down on Repeated Data, Processor, Cover Focus Articles, General Information Jan. 26, 2007, vol. 29, Issue 4, http://www.processsor.com/editorial/PrntArticle.asp?prnt=1&article=aricles%2FP2904%2F21p04%2F2, Oct. 24, 2009 4 pages.
IDC White Paper, Data Deduplication for Backup: Accelerating Efficiency and Driving Down IT Costs, Sponsored by EMC Corporation, Laura DuBois, May 2009, www.idc.com, 16 pages.
EMC White Paper, Optimized Backup and Recovery for Vmware Infrastructure with EMC Avamar, Vmware, Inc. www.vmware.com, Revision 2007, 11 pages.
EMC White Paper, Data Sheet, EMC CLARiion CX4: the Best Energy Efficiency in Midrange Storage, "EMC CLARiiON Virtual Provisioning", Applied Technology, Sep. 2009, www.emc.com, 23 pages.
EMC White Paper, EMC Perspective, An EMC Perspective on Data De-Duplication for Backup, www.emc.com, 2008, 11 pages.
EMC White Paper, Implementing Virtual Provisioning on EMC CLARiiON and Celerra with Vmware Infrastructure, Applied Technology, Feb. 2009, 49 pages.
EMC White Paper, Optimized Vmware Backup and Recovery with EMC Avamar and EMC CLARiiON Replication Technology, Applied Technology, Dec. 2008, 15 pages.
EMC White Paper, Data Sheet, Next-generation backup and recovery with global, source data deduplication, www.EMC.com, 2007, 2009, 4 pages.
EMC Avamar—Backup and Recovery Product—EMC, www.emc.com/products/detail/software/avamar.htm, Oct. 19, 2009, 3 pages.
EMC Avamar, ESG Lab Validation Report, Revolutionizing Backup and Recovery, by Brian Garrett, May, 2008, 21 pages.
EMC White Paper, ESG, Disk Backup and EMC: Addressing Today's Business Problems by Heidi Biggar, May 2008, 9 pages.

EMC White Paper, Virtual Provisioning Options for EMC Unified Storage Platforms, A Detailed Review, Sep. 2009, 20 pages.

Dell/EMC CX4 Virtual Provisioning Overview, Dell Inc., www.Dell.com, Aug. 2008, 14 pages.

EMC White Paper, EMC Centera, Optimizing Archive Efficiency, by Terri McClure with Brian Garrett, Jan. 2009, 11 pages.

EMC White Paper, Implementing Virtual Provisioning on EMC Symmetrix DMX with Vmware Virtual Infrastructure, Vmware, Inc., www.vmware.com, 2008, 30 pages.

RCE and Response to Final OA filed Jan. 20, 2012, for U.S. Appl. No. 12/242,638, filed Sep. 30, 2008, 16 pages.

* cited by examiner

FIG. 18A

| | | Device Encryption States | | | | |
|---|---|---|---|---|---|---|
| | | UNENCRYPTED | ENCRYPTED | WAITING FOR KEY | NO KEY (10) Startup Mode / Post-Startup Mode | UNKNOWN |
| IO | Device State Check (1) | Track | Track | Track | Track | Track |
| | Open, Close | Pass Through | Pass Through | Pass Through | Pass Through | Pass Through |
| Direct/Pass-Thru SCSI Commands — Read SCSI Read (2) | Unencrypted Region | Pass Through | Pass Through | Pass Through | Pass Through | Fail |
| | Encrypted Region | n/a | Track-Decrypt on completion | Pend | Fail | Fail |
| Write SCSI Write (3) | Unencrypted Region | Pass Through | Track | Pend | Fail | Fail |
| | Encrypted Region | n/a | Encrypt on dispatch-track | Pend | Fail | Fail |
| Other SCSI CDBs | Non-destructive (6) | Pass Through | Pass Through | Pass Through | Pass Through | Pass Through or fail (4) |
| | Destructive | n/a | Track-decrypt on completion | Pend | Fail | Fail |
| Ioctl | Reset, Reset All | Pass Through | Track or Pass Through (5) | Pend | Fail | Fail |
| | Non-destructive Non-SCSI (6) | n/a | Encrypt on dispatch-track | Pend | Fail | Fail |
| | Destructive | Pass Through | Pass Through | Pass Through | Pass Through or fail (7) / Pass Through | Pass Through |
| | | Pass Through | Pass Through | Pend | Fail | Pass Through or fail (8) |
| | | Pass Through | Pass Through | Pass Through | Pass Through | Pass Through |
| | | Pass Through | Track or Pass Through (9) | Pend | Fail | Fail |

| | |
|---|---|
| Notes: | |
| Track means to allow the IO and appropriate action on the IO completion. | |
| Pass through means to allow the IO without any special processing and do not monitor IO completion, for asynchronous IO. IO is dispatched down. | |
| Fail means to return the IO with an appropriate error immediately. | |
| Pend means to hold or suspend the IO until either a) or b) happens: a) Receive response to key ID lookup request from user space daemon, where upon the IO is re-evaluated based on the result of the lookup and Device Encryption State is transitioned to ENCRYPTED (successful lookup) or NO_KEY (unsuccessful lookup). b) Timeout period expires, where upon the Device Encryption State is transitioned to NO_KEY and the IO is re-evaluated as based on NO_KEY state. | |
| 1) | Device State Check is a generalized mechanism that signals software components in the stack to detect and react to possible device state changes. Change includes anything related to the device state, attribute such as device size, and identity. Device State Checks are performed based on platform requirements. For example, an open may be a trigger. |
| 2) | SCSI Read CDB, for example, Read6 or Read10. |
| 3) | SCSI write CDB, for example, Write6 or Write10. |
| 4) | Pass-through read IO to ares known to be encrypted. For example, block 0 for some operating systems are always unencrypted (despite Device Encryption State). Fail all other reads. |
| 5) | Track those writes that potentially change encrypted regions of the device. For example, writes to block 0 for some operating systems can potentially alter the encrypted areas of a device. Pass-through all other writes. |
| 6) | Non-destructive - generally defined as any operation that 'gets' data or state from a device or about the device. General read IO for example as well as direct or pass-through SCSI operations like Inquiry, Mode Sense, and Reads. Destructive is conversely defined as anything not 'non-destructive' or anything that can potentially change device data or state. |
| 7) | Pass-through SCSI Inquiry CDBs. Fail all other SCSI CDBs. |
| 8) | Pass-through a subset of SCSI commands that can bring about desired device state change from UNKNOWN to something else, for example Advanced Array Set (AAS) SCSI CDB. Fail all other destructive SCSI CDBs. |
| 9) | Track destructive IOCTLs that can potentially change encrypted regions of the device. This is operating system specific, but examples would be IOCTLs that format or partition a device. Pass-through all other IOCTLs. |
| 10) | Startup Mode and Post-Startup Mode refer to an internal state in the Xcrypt Manager 64, where the initial state is Startup Mode. The transition from Startup Mode to Post-Startup Mode occurs when the encryption userspace daemon 102 sends its first message to the Xcrypt Manager 64. In effect, the Startup Mode/Post-Startup Mode state describes the Xcrypt Manger 64 knowledge on whether the userspace daemon 102 is running and responding to lookup requests. The timing of the transition during the boot cycle is platform dependent and on some platforms affects how IO is handled. |
| IOs that straddle Encrypted and Unencrypted regions are treated as 'Encrypted Region' with caveat that the data on the unencrypted portion of the IO is not enencrypted/ decrypted as part of IO processing. | |

*FIG. 18B*

SELECTIVE I/O TO LOGICAL UNIT WHEN ENCRYPTED, BUT KEY IS NOT AVAILABLE OR WHEN ENCRYPTION STATUS IS UNKNOWN

FIELD OF THE INVENTION

Embodiments of the invention generally relate to devices, systems, and methods for data storage in computer systems. More particularly, the invention relates to systems and methods to provide selective input and output to an encrypted logical unit when the encryption key is not available or when it is not known whether or not the logical unit is encrypted.

BACKGROUND OF THE INVENTION

Organizations have many options for securing data at rest, including authentication controls, logical separation, physical security, and encryption of information. Although each option has advantages and disadvantages, when extremely large amounts of data are involved, encryption can provide the most workable solution. Encryption of data, as is well known, involves converting data to an unintelligible form called ciphertext, which cannot be read unless a key is used to decrypt the data (in some types of encryption the same key also is used to encrypt the data). Encryption also can be an important way to protect data at rest in other situations, including the electronic and physical movement of data for backup, data recovery, and/or maintenance. In addition, encryption helps to limit exposure to security breaches, so even if someone is able to access the storage media, the data is still protected to prevent unauthorized access to sensitive information on the storage media.

The best place to implement encryption in a computer system, especially a networked or enterprise computer system, can vary depending on the use case and/or the customer. For example, in an enterprise-level computer system, encryption can be provided at the application level, the host or operating system level, within the network, and/or at the level where the physical device resides.

Encrypting at the application level allows for a significant amount of control over the encryption process, because application users can dictate how to classify information, who can access it, and when. In addition, application level encryption allows for granular, specific information to be secured as it leaves the application. However, encrypting at the application level has several disadvantages. For example, one disadvantage of application based encryption is that it requires modification of the application, which can be costly, time consuming, and difficult to implement, especially if lots of legacy data that needs to be encrypted is involved.

Another disadvantage is that application-based encryption does not take into account the impact of the encryption it provides on replicated data (especially backed up or mirrored data, data stored for disaster recovery purposes, etc.). This makes some use cases of replication more difficult. For example, data that is written by one application and encrypted cannot be used by another application without the first application also decrypting the data or providing a consistent encryption/key management interface for applications to share data. Also, for Disaster Recovery, an application may have to be configured to use the same key(s) on both sites, resulting in an extra management step Network-based encryption may be appropriate when network or storage level threats are a concern to the organization, and network-based encryption offloads the cost of encryption from the host. Here, a network appliance can be used to present an unencrypted side and an encrypted side to the network. Network-based encryption also presents challenges when coupled with storage-based functionality such as replication. In particular, network-level encryption doesn't take into account its impact on replicated data. Any locally replicated information in storage (e.g., a mirror or clone) does not have visibility into the network device management and the keys, and the network device does not have visibility into the replication process. Key management can become more complex and require more manual intervention, as well as coordination between the security and storage domains, which is time consuming and more expensive.

Encryption done where the physical device resides, such as encryption on intelligent arrays, includes encryption of storage media such as arrays, disks, or tapes, which protects sensitive information residing on the storage media. Data written to the physical device is encrypted and stored as such and is decrypted when read from the device. Encryption done where the physical device resides is application and host independent and can be transport-independent, as well. This type of encryption can be advantageous when theft of the storage media is a concern. However, because data is decrypted immediately off the storage media when accessed, security breaches can occur throughout the network, on the host and at the application. Keys can be acquired at the disk or tape level.

Organizations have sometimes been reluctant to deploy encryption of data at rest for various reasons. Some reasons include the complexity of managing many keys, the need to add extra steps to existing processes for data storage (which can be difficult and time consuming, especially if existing management scripts for replication need to be modified), the expense, the time, and (for some implementations), the need to add one or more appliances to a network. Other issues with deployment of encryption include management complexity (the cost and complexity associated with deploying and managing multiple encryption technologies and key manager); scalability across an enterprise (many "point' solutions for encryption do not scale across application types or infrastructure elements) and disruption to service levels (installing encryption technologies and appliances may require a network outage and/or reconfiguration).

Encrypting in the host below the applications (or encrypting in the network or encrypting on the array) is simpler to deploy than techniques such as application level encryption, because applications don't have to be modified and the same encryption deployment can benefit multiple applications. Other advantages include that implementation can be immediate and non-disruptive, requiring no application or hardware modifications. Host-based encryption involves encrypting information on host-based systems, and host-based encryption can be used to encrypt data on the host, before the data is sent to the storage systems. Host-based encryption can be done in software using host processing resources and encryption keys stored in host memory. Alternatively, the host can be configured to offload encryption to specialized hardware. For example, a host bus adaptor (HBA) resident on the host can dedicate encryption to a particular transport connection from the host, such as Fibre Channel.

With host-based encryption, encryption can be performed at the file level for all applications running on a host. In some instances, implementations of host-based encryption can be implemented to encrypt any data leaving the host as files, blocks, or objects. For example, a host-based implementation operating on a logical unit, at the block level can be implemented by providing the encryption as part of an operating system (OS) independent input/output (I/O) filter system with I/O filter driver, such as is done with the EMC POWERPATH ENCRYPTION with RSA product, available from EMC Corporation of Hopkinton, Mass.

If the encryption is implemented using an OS independent I/O filter system (including, an I/O filter driver) running on a host, as is described for at least some embodiments herein, the host-based encryption can support multiple operating systems running on enterprise servers or across a domain. Another advantage is that this type of host-based encryption can be storage and array independent, for example, to support legacy storage systems without requiring new hardware. Still another advantage is that host-based encryption can support multiple applications and multiple arrays.

SUMMARY OF THE INVENTION

Some problems can occur with systems such as the aforementioned POWERPATH ENCRYPTION with RSA (and other systems that use host-based encryption, such as systems that use or work with an I/O filter driver within a host operating system to encrypt data on one or more logical units of storage). One problem that occurs happens in the situation where it is necessary to be able to read or write to an encrypted device, where a data encryption key must be securely obtained every time the host restarts. For this situation, however, in some implementations, key lookup at reboot requires certain libraries and code access that aren't available in early boot—thus, in the early stages of booting up a host, the data encryption key (DEK) is not available. As will be described further herein, at least some embodiments of the invention help to address this problem.

Note that the situation where a key is unavailable during early boot is not the only situation where at least some embodiments of the invention may be advantageous. Other situations include (but are not limited to) situations such as when a device is in an unknown state because device metadata cannot be read (which, can, for example, occur if a device is not turned on), as well as situations where it is not possible to access the key server to get an encryption key (e.g., for a new device).

One type of problem occurs when the encryption key is not available, but access to at least a portion of the encrypted logical unit is required for other programs to run. For example, some code may execute above the "encryption" I/O filter driver (such as a volume manager or cluster software) and may try to access an encrypted device (e.g., an encrypted logical unit (LU)) before the DEK is available. Until the DEK is available, I/O to the encrypted logical unit must either be failed or pended. However, failing or pending that I/O while waiting for the key to be looked up can cause failures in certain higher layers of code. For example, when all I/O is failed or pended before the DEK is available, higher software layers, such as volume managers or cluster software, can have failures or other malfunctions that can be unworkable enough to cause significant delays, system hangs, and potentially other system problems One solution to this problem is to make key lookup happen much earlier during the host restart process, but this solution is not always simple to implement in existing systems that incorporate encryption management code that was not originally designed to execute in early boot or from the kernel of an operating system.

In accordance with at least some embodiments of the invention described herein, the inventors have discovered that certain types of I/O requests directed to an encrypted device can be allowable I/O requests even if the DEK is not available.

One example of types of I/O requests that the inventors have discovered can be allowable includes I/O requests (e.g., from higher level processes), that do not actually require access to encrypted data itself, but instead involve performance of actions such as I/O control functions, opening or closing devices, checking device status, configuring devices, etc. In addition, the inventors have discovered that other types of I/O requests from higher level processes may also be allowable, such as "get" requests and reads to known fixed unencrypted regions of the device, because such requests are non-destructive to a given encrypted logical unit (the meaning of "non-destructive" is more fully explained further herein in connection with FIGS. 18A, 18B and. 19-21).

Furthermore, the inventors have discovered that certain types of I/O requests (e.g., "set" requests such as the Advanced Array Set (AAS) SCSI CDB (Command Descriptor Block)) can be allowed to occur even if such requests have the potential for "destructive" action on the encrypted device. What happens with such an I/O request is that a change caused by the I/O request might create a condition that would lead to a device that currently cannot be used/read/written in encrypted regions to become usable, because the change in the condition allows the encryption key (which currently is not available for the device) to be obtained. One change in the condition, for example, might be a transition from an UNKNOWN state to a known state (e.g., one of NO KEY, WAITING FOR KEY, ENCRYPTED, or UNENCRYPTED, each of which is explained further herein)

Thus, in accordance with at least some embodiments of the invention, the problem of having to pend I/O to higher layers of code because a data encryption key is not available is solved by determining, using the inventive processes described herein, which requests and actions are allowable to an encrypted device without the DEK, and failing or pending all other I/O requests until the DEK is available. In one embodiment, to enable allowance of some types of I/O requests, it has been found that the behavior of the "encryption" I/O filter driver can be carefully orchestrated to allow such I/Os that don't actually require the DEK (i.e., don't require the encryption function to work) while either failing or pending those I/Os (such as reads and writes to encrypted areas) that require the data encryption key to execute.

Solving the problem of code that that needs to access an encrypted logical unit before the key is available, by providing selective I/O as described in the embodiments described herein, provides several advantages. For example, this solution allows better interoperability with volume managers, cluster software and other such codes that execute above the block-level I/O encryption driver in the kernel or that execute in userspace.

As is explained further herein, the embodiments of invention are not limited to use with systems providing an I/O filter system with an I/O filter driver as part of a host-based implementation; those of skill in the art will recognize that at least some of the embodiments of the invention described herein are applicable in many different environments, including but not limited to environments where I/O filtering is or can be used, including but not limited to in a switch, in a virtualization appliance, in a network, and in an intelligent array of storage. In addition, at least some embodiments of the invention are applicable to any environment where access is required to an encrypted file and/or an encrypted device, but the encryption key is not yet available. Further, at least some embodiments of the invention have applicability in an environment where access is required to a file and/or device, but it is not known whether or not the file or device is encrypted (e.g., the state of the file and/or device is unknown).

Advantageously, at least some embodiments of the invention described herein simultaneously help to keep applications and processes operating at a level in the I/O stack above the I/O filter driver working correctly, protect and keep correct encrypted data on an encrypted device, and protect and keep correct metadata used to virtualize a logical unit (LUN), all of these goals being accomplished under at least either of the following conditions: (a) it is not known whether or not a given device is encrypted: or (b) it is known that the device is encrypted but the key is not available (or not yet available).

In one aspect, the invention provides a method of controlling I/O request access to an encrypted storage device when the encryption key for the encrypted storage device is not available. The method comprises the unordered steps of: providing an I/O filter driver in operable communication with an encrypted storage device, such that all I/O requests to the encrypted storage device are processed first through the I/O filter driver; receiving at the I/O filter driver an I/O request to the encrypted storage device; determining, for each I/O request, the type of the I/O request and, if the I/O request comprises a read, SCSI read, write, or SCSI write, determining a location on the storage device to which the I/O request is directed; determining, in a processor, whether a time period for obtaining the encryption key is still running; and, based on at least one of the I/O request type, whether the time period for obtaining the encryption key is still running, and, if applicable, the location on the device to which the I/O is requested, determining, in a processor, whether the I/O request to the encrypted storage device will be allowed.

In an embodiment of this aspect, the method further comprises the unordered step of allowing the I/O request to be processed if the I/O request comprises at least one of an Open, Close, SCSI Reset, SCSI Reset All, or non-destructive non-SCSI IOCTL. In a further embodiment, the method further comprises the unordered step of tracking the I/O request if the I/O request comprises a Device State Check, wherein the Device State Check represents a check as to a state of the encrypted device and whether the state of the encrypted device has changed.

In at least some embodiments, the state provides an indication as to whether or not a given device is encrypted and, if a given device is encrypted, whether the key is available or may become available, or whether a device's state cannot be determined. In at least some embodiments, the determination of whether the I/O request to the storage device will be allowed is further based at least in part on whether allowing the I/O request enables an entity that sent the I/O request to avoid a malfunction in its operation. The entity can, for example, comprise a software component that executes above the I/O filter driver in an I/O stack that includes the entity, the I/O filter driver, and the encrypted storage device, where the encrypted storage device is below the I/O filter driver in the I/O stack.

In further embodiments, the determination of whether the I/O request to the storage device will be allowed is further based at least in part on whether allowing the I/O request could allow access to encrypted information on the encrypted storage device without the key, or change, damage, destroy, or otherwise alter any portion of encrypted information stored on the encrypted storage device.

The encrypted storage device can, in some embodiments, further comprise at least a first location that is unencrypted and a second location that is encrypted. For example, the encrypted storage device can further comprise a first unencrypted region, the first unencrypted region having a location and size and storing therein unencrypted metadata relating to the encryption of the encrypted device, and wherein the determination of whether the I/O request to the encrypted storage device will be allowed is further based at least in part on whether allowing the I/O request could damage, destroy, change, provide access to, or otherwise alter any portion of any one or more of: the first unencrypted region, the location of the first unencrypted region, the size of the first unencrypted region, the location of the first unencrypted region, and the metadata stored in the first unencrypted region.

In another embodiment, the method further comprises the unordered steps of: (a) determining, in a processor, if the encrypted device is in a Startup Mode and the encryption key still is not available; (b) allowing, if the encrypted storage device is in the Startup Mode and the encryption key still is not available, an Inquiry SCSI CDB request, I/O requests that comprise reads to unencrypted regions of the device, I/O requests that comprise SCSI CDB reads to unencrypted regions of the device, and I/O requests that comprise one of Open, Close, SCSI Reset, and SCSI Reset All; and (c) failing all other I/O requests while the encrypted device is in a Startup Mode.

In a further embodiment, if the time period for obtaining the encryption key has ended or has been cancelled, and the encryption key still is not available, the method further comprises the unordered steps of: (a) determining, in a processor, if the I/O request is directed to an encrypted location on the encrypted device; (b) determining, in a processor, if the I/O request comprises a read or SCSI CDB read to an unencrypted area on the encrypted device; (c) determining, in a processor, if the encrypted device is in a Post-Startup Mode; (d) allowing, if the encrypted storage device is in Post-Startup Mode, I/O requests that comprise reads or SCSI CDB reads if the I/O request is not directed to any encrypted locations on the encrypted storage device; (e) allowing, if the encrypted device is in Post-Startup Mode, I/O requests that comprise non-destructive SCSI CDBs; and (h) failing, if the encrypted device is in Post-Startup Mode, all other I/O requests that are not one of (d) through (e) above or that do not comprise one of Open, Close, SCSI Reset, and SCSI Reset All.

In a still further embodiment, if a key lookup fails and the encryption key still is not available, the method further comprises the unordered steps of: (a) determining, in a processor, if the I/O request is directed to an encrypted location on the encrypted device; (b) determining, in a processor, if the I/O request comprises a read or SCSI CDB read to an unencrypted area on the encrypted device; (c) determining, in a processor, if the encrypted device is in a Post-Startup mode; (d) allowing, if the encrypted storage device is in Post-Startup Mode, I/O requests that comprise reads or SCSI CDB reads if the I/O request is not directed to any encrypted locations on the encrypted storage device; (e) allowing, if the encrypted device is in Post-Startup mode, I/O requests that comprise non-destructive SCSI CDBs; and (h) failing, if the encrypted device is in Post-Startup mode, all other I/O requests that are not one of (d) through (e) above or that do not comprise one of Open, Close, SCSI Reset, and SCSI Reset All.

In yet another embodiment, if the time period for obtaining the encryption key has not ended or has been cancelled, and the encryption key still has not been retrieved, the method further comprises the unordered steps of: (a) determining, in a processor, whether the location on the device to which the I/O request is directed includes any encrypted locations on the device; (b) determining, in a processor, if the I/O request comprises a read or SCSI CDB read to an unencrypted area; (c) allowing I/O requests that comprise reads or SCSI CDB reads if the I/O request is not directed to any encrypted locations on the device; (d) allowing I/O requests determined to comprise non-destructive IOCTLS, non-destructive non- SCSI IOCTLs, or non-destructive SCSI CDBs; and (e) pending all other I/O requests that are not one of (c) or (d) above or that do not comprise one of Open, Close, SCSI Reset, and SCSI Reset All.

In a further aspect, the invention provides a method of controlling I/O request access to a storage device when it is not known if the storage device is encrypted. The method comprising the unordered steps of: providing an I/O filter driver in operable communication with a storage device, such that all I/O requests to the storage device are processed first through the I/O filter driver; receiving at the I/O filter driver an I/O request to the storage device; determining, for each I/O request, the type of the I/O request and, if the I/O request comprises a SCSI read, determining a location on the storage device to which the I/O request is directed; and based on at least one of the I/O request type and, if applicable, the location on the device to which the I/O is requested, determining, in a processor, whether the I/O request to the storage device will be allowed.

The method can further comprise the unordered step of tracking the I/O request if the I/O request comprises a Device State Check, wherein the device state check represents a check as to the state of the device and whether the state of the device has changed. In a further embodiment, the state provides an indication as to whether or not a given device is encrypted and, if a given device is encrypted, whether the key is available or may become available, or whether a device's state cannot be determined.

In still another embodiment, the method can further comprise the unordered steps of: (a) allowing the I/O request to be processed if the I/O request comprises at least one of an Open, Close, SCSI Reset, SCSI Reset All, or a non-destructive non-SCSI IOCTL; (b) allowing the I/O request if the I/O request comprises a SCSI CDB read to a known unencrypted location on the device; (c) allowing the I/O requests if the I/O request comprises a non-destructive SCSI CDB; (d) allowing the I/O request if the I/O request comprises a destructive SCSI CDB that is capable of enabling a determination as to whether or not the device is at least one of unencrypted and encrypted; and (e) failing all I/O requests that aren't one of (a) through (d).

In still another aspect, the invention provides a method of controlling I/O request access to an encrypted storage device when the encryption key for the encrypted storage device is available, the method comprising the unordered steps of: providing an I/O filter driver in operable communication with an encrypted storage device, such that all I/O requests to the encrypted storage device are processed first through the I/O filter driver; receiving at the I/O filter driver an I/O request to the encrypted storage device; determining, for each I/O request, the type of the I/O request and, if the I/O request comprises a read, SCSI read, write, or SCSI write, determining a location on the storage device to which the I/O request is directed; and based on at least one of the I/O request type and the location on the device to which the I/O is requested, determining, in a processor, whether the I/O request to the encrypted storage device will be tracked.

In some embodiments, wherein the determination of whether the I/O request to the storage device will be tracked is further based at least in part on whether allowing the I/O request could change or otherwise alter any portion of encrypted or unencrypted information stored on the encrypted storage device. In still further embodiments, the determination of whether the I/O request to the storage device will be tracked is further based at least in part on whether allowing the I/O request could change or otherwise alter any portion of encrypted or unencrypted information stored on the encrypted storage device.

The above summary is intended to present a simplified summary in order to provide a basic understanding of one or more aspects of the invention. This summary is not an extensive overview of the invention, and is neither intended to identify key or critical elements of the invention, nor to delineate the scope thereof. Rather, the primary purpose of the summary is to present some concepts of the invention in a simplified form as a prelude to the more detailed description that is presented later.

Details relating to this and other embodiments of the invention are described more fully herein.

BRIEF DESCRIPTION OF THE FIGURES

The advantages and aspects of the present invention will be more fully understood in conjunction with the following detailed description and accompanying drawings, wherein:

FIG. 12 or FIG. 13 are completed and also a method of performing I/O done processing for any I/O that is being tracked (including Device State Check processing);

FIG. 18A is a table describing how input/output (I/O) requests are handled in various device states with regard to encryption, in accordance with one embodiment of the invention;

FIG. 18B is a legend for the table of FIG. 18A;

The drawings are not necessarily to scale, emphasis instead generally being placed upon illustrating the principles of the invention. In the Figures, like numbers denote like elements.

DETAILED DESCRIPTION

Before discussing the details of the invention, a preliminary discussion is provided giving an overview of the type of computing environment in which at least some embodiments of the invention are realized, followed by a brief overview of operation of one embodiment of the invention. The methods and apparatus of at least some embodiments of the invention may take the form, at least partially, of program code (i.e., instructions) embodied in tangible media, such as floppy diskettes, CD-ROMs, hard drives, universal serial bus (USB) memory devices, memory cards, random access or read only-memory, or any other machine-readable storage medium, including a transmission medium. When the program code is loaded into and executed by a machine, such as a computer, the machine becomes an apparatus for practicing the invention. The methods and apparatus of the invention also may be embodied in the form of program code that is transmitted over some transmission medium, such as over electrical wiring or cabling, through fiber optics, or via any other form of transmission. When implemented on a general-purpose processor, the program code combines with the processor to provide a unique apparatus that operates analogously to specific logic circuits. The program code (software-based logic) for carrying out the method is embodied as part of the system described below.

Systems and methods in accordance with at least some embodiments of the invention can be implemented using any type of general purpose computer system, including but not limited to a personal computer (PC), laptop computer, client, network appliance, server, workstation, personal digital assistant (PDA), mobile communications device, interconnected group of general purpose computers, host computer systems, enterprise computer system, etc., running any one of a variety of operating systems. The general purpose computer system advantageously includes and/or is capable of communicating with storage devices or systems (including enterprise storage systems, remote storage systems, intelligent storage systems, disaster recovery systems, etc.) that store data and/or computer programs used by the general purpose computer system. An example of a system 10 that includes a general-purpose computer system 1 and storage systems 3, 4, usable with at least one embodiment of the invention is shown in FIG. 1.

Figure 1:
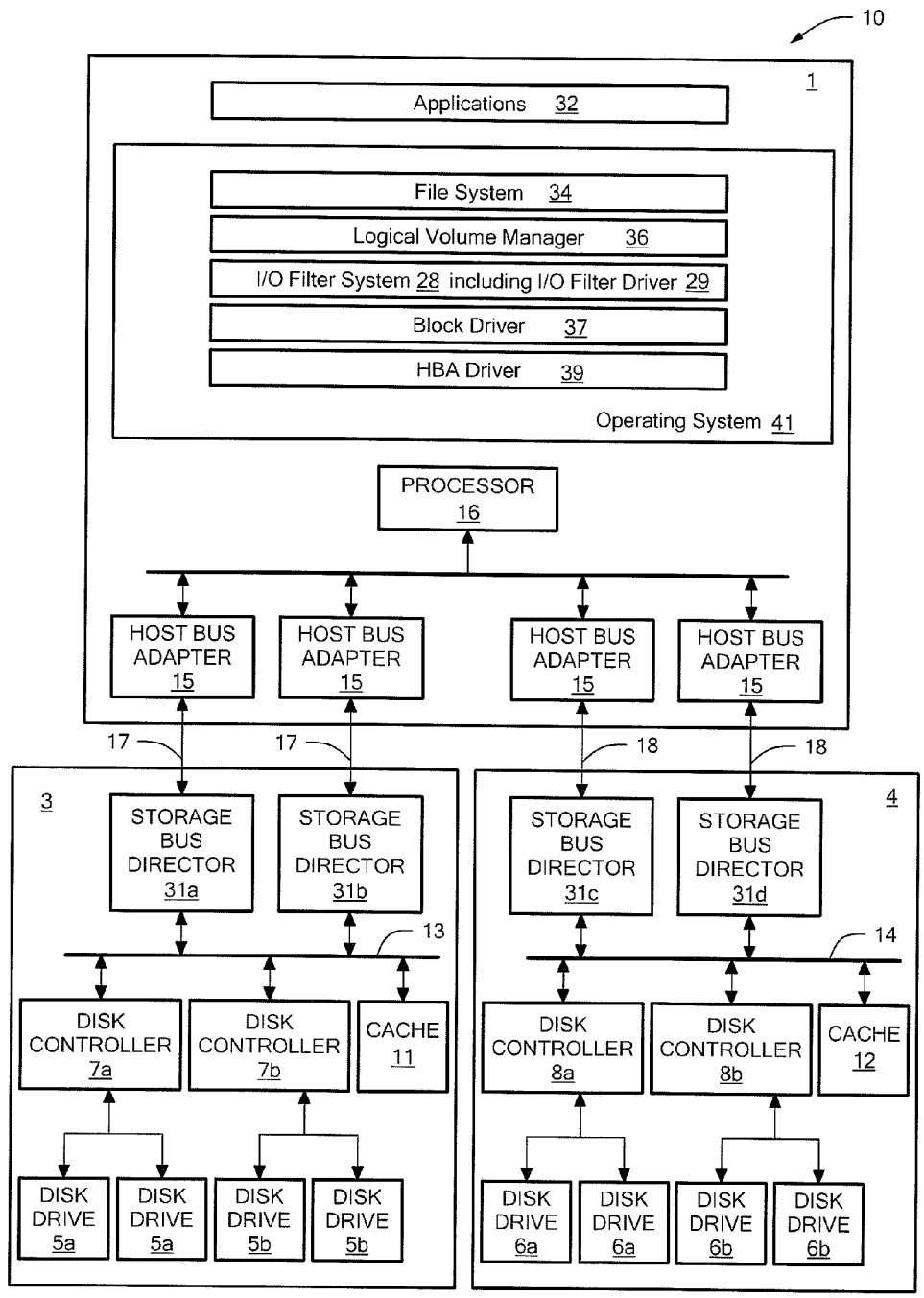
FIG. 1 is an illustration of an exemplary computer system in which at least one embodiment of the present invention can be embodied.

Referring now to FIG. 1, the host computer 1 (also referred to herein as a general purpose computer 1) includes a processor 16 (which can include one or more central processing unit (CPU) chips) and one or more host bus adapters 15 that each controls communication between the processor 16 and one of the storage systems 3, 4 via a corresponding one of the communication buses 17, 18. Each bus 17, 18 can be any of a number of different types of communication links, with the host bus adapter 15 and storage bus directors 31a-31d being adapted to communicate using an appropriate protocol via the communication buses 17, 18 coupled there between. For example, each of the communication buses 17, 18 can be implemented as a SCSI bus with the directors 31a-31b and adapters 15 each being a SCSI driver. Alternatively, communication between the host computer 1 and the storage systems 3, 4 can be performed over a Fibre Channel fabric. In still another alternative embodiment, communication between the host computer 1 and the storage systems 3, 4 can be performed in accordance with standards for the Internet-Small Computer System Interface (iSCSI) or the Fibre Channel over Ethernet (FCoE). Other implementations are, of course, possible.

In addition, those of skill in the art who are familiar with such general purpose computer systems 1 know that such systems can include elements not explicitly illustrated in FIG. 1, such as random access memory (RAM) for storing programs and/or data, an input/output (I/O) controller, a network interface, a display device, one or more input devices, and, optionally, one or more removable storage devices, including but not limited to a CD/DVD drive unit, a floppy disk drive unit, a tape drive unit, a PCMCIA or other card drive, a USB-based flash drive unit, and the like, and a data bus coupling these components to allow communication therebetween.

The CPU can be any type of microprocessor, such as a PENTIUM processor, made by Intel of Santa Clara, Calif. The display device can be any type of display, such as a liquid crystal display (LCD), cathode ray tube display (CRT), light emitting diode (LED), and the like, capable of displaying, in whole or in part, any outputs generated in accordance with the systems and methods of the invention. The input device can be any type of device capable of providing the inputs described herein, such as keyboards, numeric keypads, touch screens, pointing devices, switches, styluses, and light pens. The network interface can be any type of a device, card, adapter, or connector that provides the computer system with network access to a computer or other device, such as a printer, a computer network, a storage area network, etc.

In at least some embodiments of the invention, one or more computer programs (such as applications 32 and an operating system 41) define the operational capabilities of the computer system 1. Operating systems usable with at least some embodiments of the invention include (but are not limited to) systems available from Sun Microsystems, and running the Solaris operating system (a version of Unix), HP-UX (a Hewlett-Packard operating system, running a Hewlett-Packard version of the Unix operating system), available from Hewlett-Packard Corporation, AIX (an IBM version of Unix), available from IBM Corporation, and/or any other operating system such as LINUX, WINDOWS VISTA, WINDOWS XP, or WINDOWS NT (the latter three are available from Microsoft Corporation). These programs can be loaded into the computer system 1 in many ways, including but not limited to a hard disk drive, a CD/DVD drive, and the network interface. Alternatively, the programs can reside in a permanent memory portion (e.g., a read-only-memory (ROM)) chip) of the main computer system 1 memory. Further, those of skill in the art will recognize that the computer system 1 can include specially designed, dedicated, hard-wired electronic circuits that perform all functions described herein without the need for instructions from computer programs.

The I/O filter system 28 includes an I/O filter driver 29. The I/O filter driver 29 portion of the I/O filter system 28 facilitates the sending of I/O requests from applications 32 running on the computer system 1 (which can, for example, be a host) to the data storage subsystem 3, 4. For example, in at least some embodiments, the I/O filter driver 29 queues I/O requests from the computer system 1 directed to data storage subsystems 3, 4, 9 (note that data storage subsystem 9 is illustrated further in FIGS. 2A-2C as comprising a combination of primary storage systems 3 and replica storage systems 4). In addition, in some embodiments, the I/O filter driver 29 implements algorithms to decide which I/O requests to send, how many I/O requests to send, and the speed at which to send I/O requests. The I/O filter driver 29, in some embodiments, keeps a record of I/O requests that are sent to data storage subsystems 3, 4 until the I/O request is processed by data storage subsystems 3,4. An exemplary host I/O filter system 28 that includes an I/O filter driver 29 is the POWERPATH ENCRYPTION WITH RSA software, available from EMC Corp.

At least some embodiments of the systems, methods, and apparatuses of the invention described herein are intended for use in connection with storage area networks (SANs) that include data storage systems, such as the SYMMETRIX Integrated Cache Disk Array System or the CLARIION Disk Array System available from EMC Corporation of Hopkinton, Mass., as well those provided by vendors other than EMC Corporation, especially SANs including arrays where replication takes place, such as by using array or switch facilities.

The storage systems 3, 4 (which can be logical units) make storage resources available to the host computer for assignment to entities therein, such as a file system 34, a database manager (not shown), a logical volume manager 36, an I/O filter system with driver 28, a block driver 37, and an HBA driver 39. If the storage systems are so-called "dumb" storage systems, the storage resources that are made available to the host computer will correspond in a one-to-one relationship to physical storage devices within the storage systems. However, when the storage systems are intelligent storage systems, they will present logical units of storage to the host computer 1 that need not necessarily correspond in a one-to-one relationship to any physical storage devices within the storage system. Instead, the intelligent storage systems may map each logical unit of storage presented to the host across one or more physical storage devices.

One environment in which the storage systems 3, 4 of FIG. 1 may be used is as part of an enterprise storage system. Enterprise storage systems store data in large-scale environments and differ from consumer storage systems in both the size of the environment and the types of technologies that store and manage the data. SANs are commonly used in enterprise storage systems to transfer data between computer systems and storage devices. An exemplary SAN provides a communication infrastructure, including physical connections between computer systems, storage devices, and a management layer, which organizes the connections, storage devices, and computer systems.

In a SAN environment, computer systems, typically referred to as hosts, connect to the SAN via one or more host bus adapters. The SAN itself may include thousands of different inter-related logical and physical entities. In the case of a Fibre Channel SAN, these entities, which comprise the connections between hosts and storage devices may include Fibre Channel host bus adapters, Fibre Channel switches, Fibre Channel routers, and the like. The entities may be physically connected through the use of twisted-pair copper wire, optical fiber, or any other means of signal transmission.

As shown in FIG. 1, storage devices 3, 4 may include multiple disk drives 5, 6 that combine to form a disk array. A typical disk array includes a disk array controller, a cache, disk enclosures, and a power supply. Examples of disk arrays include the SYMMETRIX Integrated Cache Disk Array System and the CLARIION Disk Array System, both available from EMC Corporation of Hopkinton, Mass. Such a data storage device system and its implementation is fully described in U.S. Pat. No. 6,101,497 issued Aug. 8, 2000, and also in U.S. Pat. No. 5,206,939 issued Apr. 27, 1993, each of which is assigned to EMC (the assignee of this invention) and each of which is hereby incorporated by reference. Consequently, the discussion herein makes only general references to the operation of such systems.

The disk array controller 7, 8 cooperates with the storage bus director 31*a*-31*d*, which helps to provide storage services to computer systems that access the disk array. The disk array controller 7 may attach to a number of disk drives 5 that are located in the disk enclosures. For example, the disk drives 5 may be organized into RAID groups for efficient performance and data protection. RAID (redundant array of inexpensive disks) is a system that uses multiple disk drives that share or replicate data among the drives. Accordingly, in a RAID system, instead of identifying several different hard drives, an operating system will identify all of the disk drives as if they are a single disk drive. The storage systems 3, 4 also include internal buses 13, 14 over which storage bus directors 31a-31d, disk controllers 7a, 7b, 8a, 8b and caches 11, 12 communicate The storage bus director 31a-31d helps to couple the disk array controller 7 to a SAN (or directly to a host, as is shown in FIG. 1) via a port. A port serves as an interface between the disk array controller 7 and other devices, such as the hosts, in the SAN. Each storage bus director 31 typically includes two or more ports. A storage bus director 31 may communicate with other devices using various protocols, such as the SCSI (Small Computer System Interface) command protocol over a Fibre Channel link to the SAN. In the SCSI command protocol, each device is assigned a unique numerical identifier, which is referred to as a logical unit number (LUN). Further, communication using the SCSI protocol is said to occur between an "initiator" (e.g., a host) and a "target" (e.g., a storage device) via a path. For example, a path may include a host bus adapter, an associated SCSI bus or Fibre Channel cabling, and a single port of a disk array controller. For example, the aforementioned path management software (e.g., EMC POWERPATH) can be used to manage the paths used to communicate data in the SANs and, among other things, can detect load imbalances for disk array controllers in a SAN and can select alternate paths through which to route data.

Several definitions of terms referenced herein are now provided. A physical disk is formatted into a "physical volume" as presented by the storage device for use by management software (such as Logical Volume Manager (LVM) software available from EMC). Each physical volume is split up into discrete chunks, called physical partitions or physical extents. A "logical volume" consists of some number of physical partitions/extents, which can be treated as one large storage area. A logical volume may also be referred to as a logical unit (LU). An identifier of a logical volume, also called a logical volume identifier, includes information specific to the logical volume it identifies. One example of a logical volume identifier is the Fibre Channel World Wide Names (WWN) of the logical volume. Another example of a logical volume identifier is information that was assigned by the array manufacturer and that is provided in response to a SCSI inquiry. Still another logical volume identifier is the world wide name (WWN) which also can be provided in response to a SCSI inquiry. Note also that, as used herein, a device is a generic term for any number or kind of logical unit, especially used for storage.

In addition, an I/O request, as used herein, is a term that includes (but is not limited to), read requests, write requests, I/O commands, SCSI reads, SCSI writes, SCSI CDBs, IO controls (IOCTLs), Device State Checks, device opens, device closes, SCSI resets, SCSI reset all, and both destructive and non-destructive IOCTLs. Non-destructive is generally defined herein as any operation that gets data or state from a device or about a device. Conversely, destructive is generally defined herein as anything that is not "non-destructive" or anything that potentially can change device data or state. More definitions are provided as part of the legend for the table of FIG. 18A, which legend is in the table of FIG. 18B; each of these is described further herein.

In one embodiment, the I/O filter system 28 is implemented to use pseudodevices to represent devices that it is managing. The pseudodevice is a logical representation of the device that assigns it a name chosen by the filter driver 29 instead of the name assigned it by the operating system 41. Use of pseudodevices to represent devices that the I/O filter system 28 is managing is advantageous when the filter driver 29 is transforming those devices in some way, such as using a part of the device to write metadata.

As is understood in the art, a pseudodevice is a special type of port, located in the kernel of an operating system, that acts like a device but does not correspond to any actual hardware and doesn't interface to a hardware device; instead, the pseudodevice interfaces to a managing device driver that maps it to one or more underlying hardware devices. Thus, a host interacting with a pseudodevice treats the pseudodevice as sort of a "forwarding mechanism" through which a physical device can be reached, such that the host treats a pseudodevice as if it were a physical I/O device even though it is not. With some embodiments of the invention (which can use multipathing) the I/O filter system 28 of the invention, a pseudodevice represents a single logical device, as defined by I/O filter system 28, and the path set leading to it, which can contain any number of physical paths. In at least some further embodiments of the invention, a pseudodevice (explained further herein) is used to represent the eVLU (which has a hidden private region of metadata that is only available to the filter driver 29). A pseudoname is the name used to identify the pseudodevice.

In at least one embodiment of the invention, the computer system 1 of FIG. 1 is networked to other devices, such as in a client-server or peer to peer system. This is illustrated and described in greater detail in connection with FIGS. 2A-5 herein, which include example embodiments showing first and second computer systems 1A, 1B networked to each other via a host interconnect network 22 (which can, for example be a local area network (LAN) or a wide area network (WAN)), as well as embodiments showing a host computer 1 running a client application that communicates with a remote server application running at a remote host. The network 22 could be an internet protocol (IP) network, but many other types of networks are usable, as will be appreciated by those of skill in the art. The computer system 1 thus includes elements that can act as a client system, a server system, or a peer system, and the entire computer system 1 likewise can act as a client, server, or peer. It should be noted, however, that although the computer/host 1 can act as a server in a general sense, the key manager server 26 is a very specific and particular type of server (as explained elsewhere herein) and will not necessarily have the same behavior as when the host 1 acts as a server.

As will be explained further herein, the client can be any entity, such as a the system, host computer 1, and/or or specific components thereof (e.g., terminal, personal computer, mainframe computer, workstation, hand-held device, electronic book, personal digital assistant, peripheral, etc.), or a software program (e.g., an I/O filter driver system 28 program) running on a computer directly or indirectly connected or connectable in any known or later-developed manner to any type of computer network, such as the Internet. A client may also be a notebook computer, a handheld computing device (e.g., a PDA), an Internet appliance, a switch, a mobile communications device, a telephone, an electronic reader device, and/or any other such device capable of connecting to a computer network or a storage network.

Of course, those skilled in the art will appreciate that computer systems 1 embodying the invention need not include every one of the aforementioned elements and that equivalents to each of the elements are intended to be included within the spirit and scope of the invention.

A brief summary of the overall operations of one embodiment of the invention is now provided, followed by detailed descriptions of the various aspects, components, and processes of embodiments of the invention.

In one aspect, the invention provides an I/O filter system 28 that provides an information-centric protection mechanism for data (e.g., user data) stored on logical units (LUs). The I/O filter system 28 encrypts and decrypts all data (although not necessarily operating system (OS) metadata or the I/O filter system 28 metadata) on an encrypted, virtualized logical unit (eVLU), where the virtualization is done by the I/O filter system 28. Data on such an LU is encrypted and decrypted transparently by the I/O filter system 28—no application changes are required. This also means, however, that data on such an LU is encrypted and thus accessible only through I/O filter system 28, (note that backup applications that run on plaintext data above the I/O filter system 28 are backing up plaintext, and not ciphertext, and thus such applications are accessible independent of the I/O filter system 28)

A user is able to encrypt existing data by copying it from a plaintext LU to an eVLU using a data migration or data copying tool (one example of such a tool usable with at least some embodiments of the invention is the POWERPATH MIGRATION ENABLER (PPME) product, available from EMC Corporation of Hopkinton, Mass.) These features also enable protection of data on storage devices (e.g., drives) that are removed from arrays. Because metadata on the LU stores information, in plaintext, that can be used to obtain the key for the data on the LU, given permission to obtain the key it is possible for replicas to be made of a logical unit where the replica keeps intact the encryption and also includes in the replica the information necessary to obtain a key for decryption.

In a further aspect of the invention, to protect an entire drive's contents, all the LUs that are using the physical drive are encrypted. However, in another embodiment, if it is desired to protect only some of the content on an LU (e.g., to protect only the sensitive and/or confidential data on an LU, but not necessarily all data), it may be sufficient for only those LUs that contain such data to be encrypted on a particular physical drive. The I/O filter system 28 described herein also is useful to prevent unauthorized access to a volume's content on a per-host basis.

In one embodiment, the I/O filter system 28 provides a command line interface (CLI) to perform various actions needed to manage the eVLU. For example, the CLI allows an administrator to designate a particular LU to be encrypted, which renders any previously existing user data on the LU inaccessible through the I/O filter system 28. When an LU is designated to be encrypted, it will be converted to an eVLU and a key will be provisioned for it and cached in the I/O filter system 28 kernel. At the same time, a key_identifier (key_id), associated with that key is stored in the I/O filter system 28's metadata region 46 (see FIG. 3A) on the LU. In some embodiments of the invention (for example, some embodiments that use the RSA Key Manager as the key manager), the key_id is a globally unique key_id. In at least some other embodiments (e.g., some embodiments that use a key manager other than the RSA Key Manager), the key_id is unique within a given domain, but not necessarily globally unique. In still further embodiments, the key_id need not be unique Once the key_id is stored in metadata, all writes to the eVLU are encrypted and all subsequent reads are decrypted. The device can then be put into service as a new LU or it can be used as the target, e.g., of a PPME migration, where the source is an LU with existing data. Note that when migrating from an existing LU, for some of the embodiments of the invention, the target may need to be slightly larger in order to accommodate the I/O filter system 28 metadata required for a virtualized LU.

When the I/O filter system 28 starts up after a host boot, the I/O filter system 28 detects all encrypted, virtualized LUs. Reads and writes to encrypted parts of the VLU will be disabled to these devices until the key is looked up and cached in the kernel. The I/O filter system 28 gets the key for each eVLU, based on information stored in the I/O filter system 28 metadata which is in a private region of the LU.

Advantageously, in the I/O filter system 28, data at rest encryption is built on top of VLUs to enable the I/O filter system 28 to detect and properly handle replicas, such as replicas created by products such as EMC Symmetrix Remote Data Facility (SRDF), EMC MirrorView, EMC Snapview, EMC Timefinder, as well as other mirroring, disaster recovery, and/or replication products. An eVLU contains metadata that enables the I/O filter system 28 to identify the LU as virtualized and as encrypted. In the case of a replica, the I/O filter system 28 metadata ensures that the key associated with the eVLU is the same as the key of the source eVLU for the replica.

As those of skill in the art will appreciate, embodiments of the invention can greatly simplify making replicas of encrypted storage devices and managing the associated encryption keys. In prior art systems, a manual operation is needed to associate each replica with the key that was provisioned for the primary device. Thus, without the advantages provided in the embodiments of the present invention, every time a device being used as a replica is re-purposed, another manual operation is required.

Having described the environment of the invention and provided a brief overview of one embodiment of the invention, including its advantages for replication, the details of at least some embodiments of the invention are now provided.

Figure 2A:
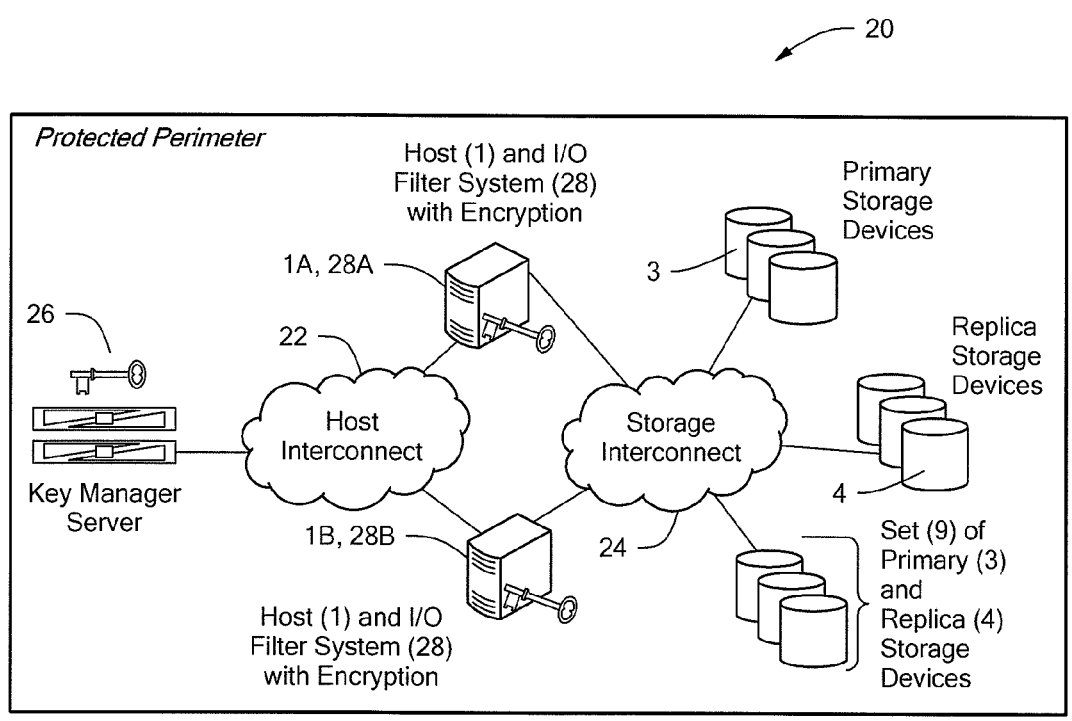
FIG. 2A is an illustration showing a first protected perimeter configuration, in accordance with one embodiment of the invention.

FIG. 2A is an illustration showing a first protected perimeter configuration 20, in accordance with one embodiment of the invention. By "protected" it is meant that the perimeter covers the domain that the I/O filter driver is protecting. The protected perimeter 20 is a collection of hosts 1A, 1B, storage devices 3, 4, 9, and one or more key manager servers 26 that are trusted in a single environment; that is, all components inside the protected perimeter 20 are considered to be trusted relative to each other. In some instances, the protected perimeter 20 corresponds to a physically secure area within a data center, but it should be understood that not all components in a protected perimeter need to be physically present in the same place or location. Some components, such as key manager servers 26, storage devices 3,4, 9, etc., can be remotely located (which can be advantageous and even necessary for disaster recovery, for example).

Figure 2B:
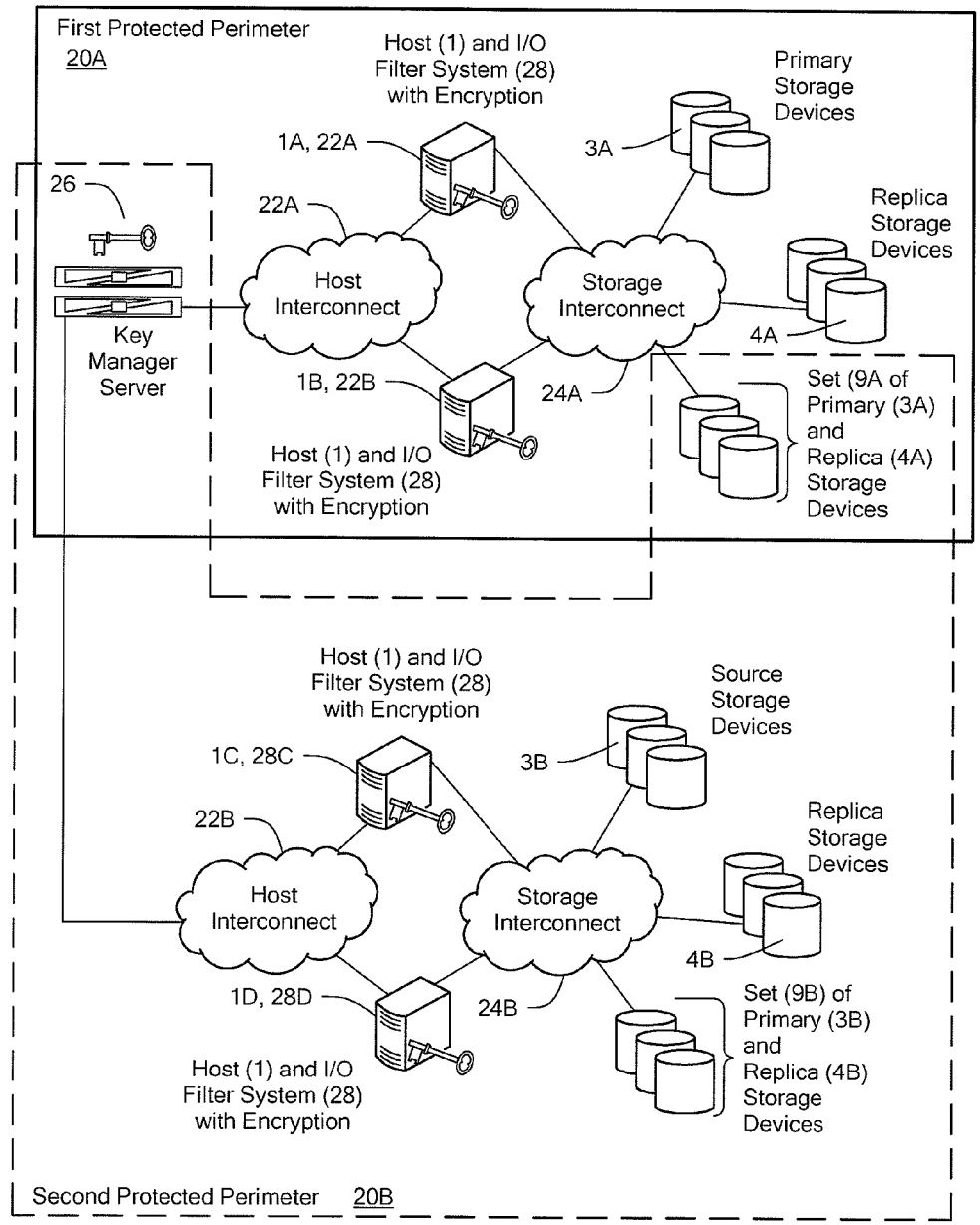
FIG. 2B is an illustration showing a second protected perimeter configuration, in which two protected perimeters share the same key manager server, in accordance with one embodiment of the invention.

Note also that two separate protected perimeters can share selected elements (i.e., have elements in common). Consider, for example, FIG. 2B, which is an illustration showing a second protected perimeter configuration, in which two protected perimeters 20A, 20B share both a key manager server 26 and a set 9A that includes primary storage devices 3A and replica storage devices 4A. It should be understood that protected perimeters that share components are not required to share any or all of the shared components specifically shown in FIG. 2B. The specifically illustrated shared components in FIG. 2B are provided by way of illustration only and are not limiting. In other embodiments, for example, the storage interconnect 24 could be the shared component. Generally, however, the host 1 and I/O filter system 28 are not shared between protected perimeters 20.

A pair of protected perimeters also can be in communication over a network and arranged so that a first protected perimeter 20A serves as a primary protected perimeter and a second protected perimeter 20B serves as a replica of the primary protected perimeter 20A. Together, the interconnected protected perimeters 20A, 20B can form a third protected perimeter 20C. Consider, for example, FIG. 2C, which is an illustration showing a third protected perimeter configuration 20C that consists of first protected perimeter 20A and a second protected perimeter 20B connected via a remote network 21, in which there is a key manager server 26 for each of the primary and replica logical units, in accordance with one embodiment of the invention. The embodiment and configuration of FIG. 2C can be especially useful for disaster recovery applications. For example, the configuration of FIG. 2C can be used with replication for disaster recovery, where the arrays of the storage devices 3A, 4A, 9A of protected perimeter 20A are replicated into the arrays of the storage devices 3B, 4B, 9B, respectively of protected perimeter 20B, and where the replica key manager server 26B is a replica of primary key manager server 26A In a disaster recovery application (e.g., SRDF), the replica key manager server 26B is a disaster recovery replica of primary key manager server 26A, primary storage device 3B is a disaster recovery replica of primary storage device 3A, and the primary portion of replica set 9B is a disaster recover replica of the primary portion of replica set 9A. Thus, for disaster recovery, all the primary storage of protected perimeter 20A is replicated in protected perimeter 20B. In some embodiments, however, local replicas within a protected perimeter 20 (e.g., the replica 4A of perimeter 20A) has a remote replica in protected perimeter 20C, as those of skill in the art will appreciate.

Figure 2C:
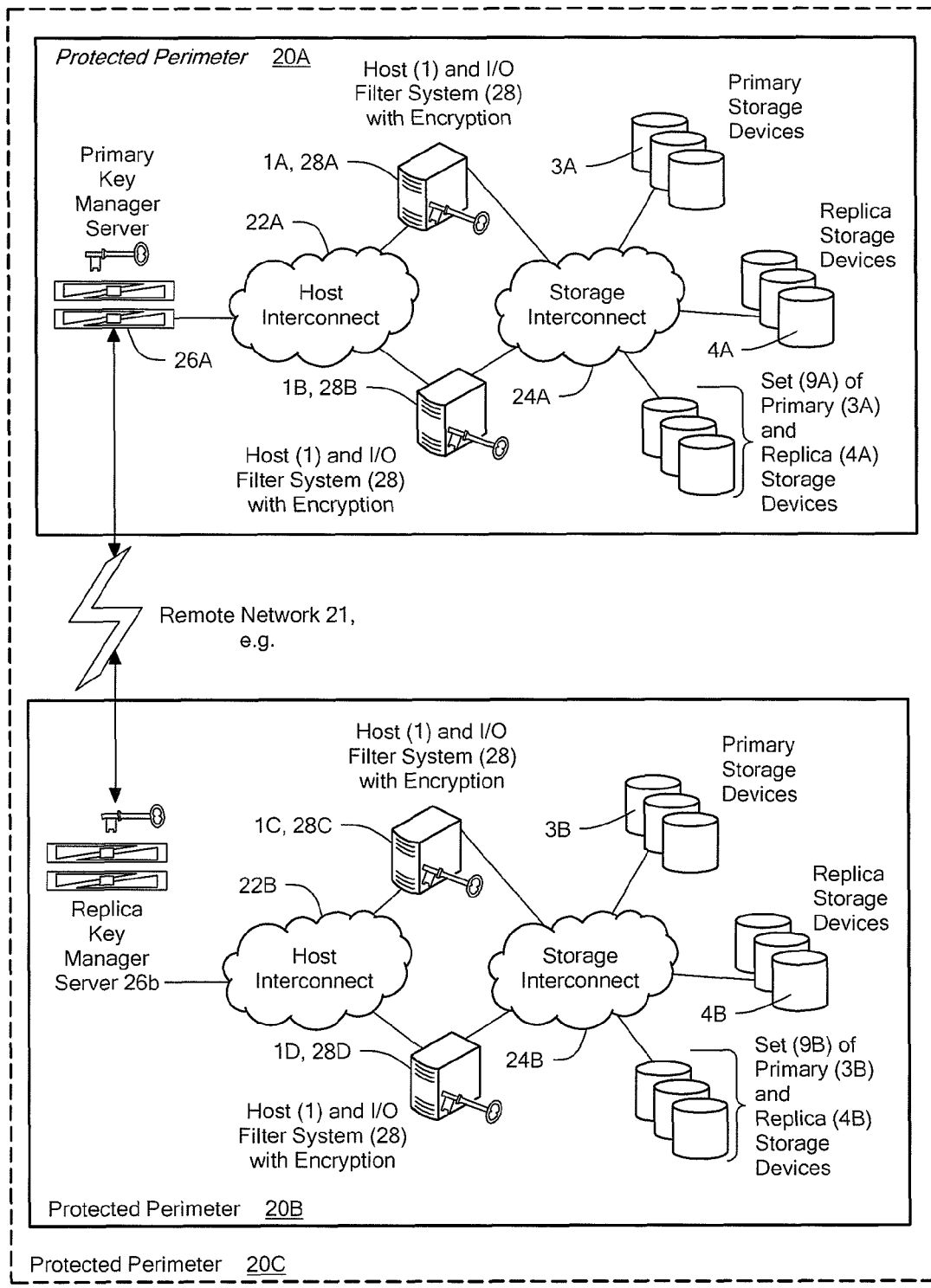
FIG. 2C is an illustration showing a third protected perimeter configuration, in which there is a key manager server for each of the primary and replica logical units, in accordance with one embodiment of the invention.

Referring now to FIGS. 2A-2C, each protected perimeter 20 also illustrates some components used to implement at least one embodiment of the invention, including a pair of host computers, 1A, 1B (similar to the computer 1 of FIG. 1), each host computer 1A, 1B having a respective I/O filter system with encryption 28A, 28B. The host computers 1A, 1B in this embodiment are shown for illustrative purposes to be in operable communication with each other (but it should be noted that the host computers 1A, 1B being in operable communication is entirely optional, so long as each host computer 1 is in communication with the key manager server 26). The host computers 1A, 1B communicate with the external key manager server 26 via a host interconnect 22. In addition, the host computers 1A, 1B communicate via a storage interconnect 24 with a plurality of primary storage devices 3, replica storage devices 4, and a set 9 that includes both primary 3 and replica 4 storage devices.

A host computer 1 that is initialized and configured with the I/O filter system 28 with encryption (which can, for example, be provided as the EMC POWERPATH ENCRYPTION with RSA product) are considered to be within the protected perimeter 20. As will be explained further herein, using the I/O filter system 28 with encryption helps to ensure that if any storage devices 3, 4, 9 within the protected perimeter are physically removed from the protected perimeter, the data contained on the storage devices will be encrypted so as to maintain confidentiality.

The storage interconnect 24 of FIG. 2A can be any type of network capable of interconnecting storage devices with host computers. In some embodiments, the storage devices and host computers are interconnected in a manner such that, to the operating systems running on the host computers 1A, 1B, the storage devices appear as locally attached, but this is not required for the invention. The storage interconnect 24 provides communications between the various entities in the protected perimeter 20, such as the host computers 1A, 1B and storage devices 3, 4, 9. The storage interconnect 24 may be a shared, public, or private network and encompasses a wide area or local area and can be implemented through any suitable combination of wired and/or wireless communication networks. Furthermore, the storage interconnect 24 may include a local area network (LAN), a wide area network (WAN), an intranet, or the Internet. For example, in one embodiment, the storage interconnect 24 works with Fibre Channel connectivity and is implemented via a SAN. In another embodiment, the storage interconnect 24 works with internet protocol (IP) connectivity and is implemented via an Internet-Small Computer System Interface (iSCSI) (for Fibre Channel). Those of skill in the art will recognize that other implementations are, of course, possible.

Figure 5:
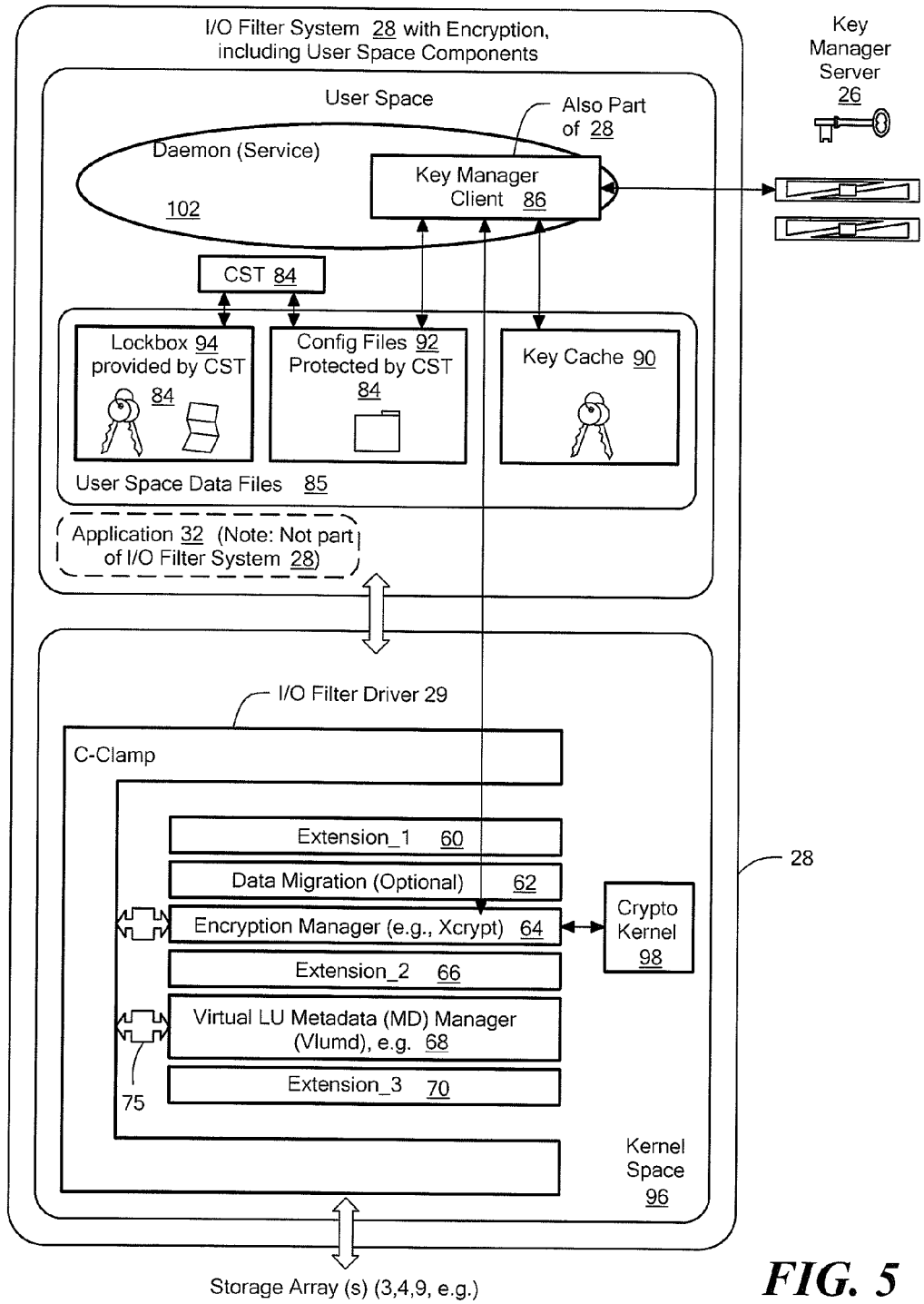
FIG. 5 is a block diagram showing information and I/O flow during unattended operation of the I/O server of FIG. 1, in accordance with one embodiment of the invention.
Figure 6:
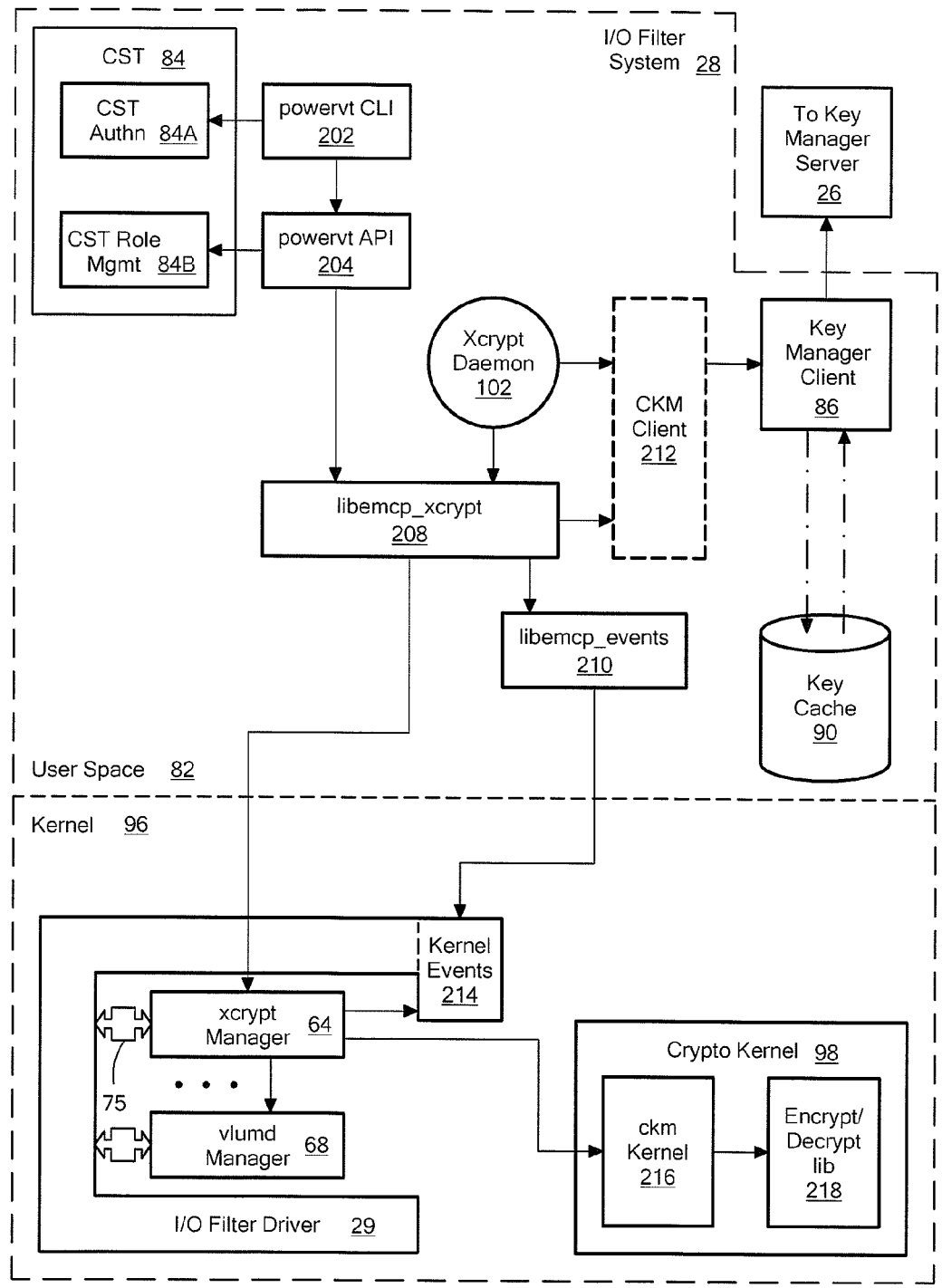
FIG. 6 is an architectural diagram showing components of a system for creating an encrypted virtual logical unit (eVLU), using an eVLU, replicating an eVLU, and removing the encryption property of an eVLU, in accordance with one embodiment of the invention.

The key manager server 26 provides key manager functionality, and the key manager server 26 communicates and cooperates with a key manager client 86 running at each host 1A, 1B (for simplicity, the key manager client 86 is not shown in FIG. 2A but is illustrated in FIGS. 5 and 6). The key manager server 26 is, in one embodiment, a server appliance that includes all components required to be a key manager for the datacenter within the protected perimeter 20 and which is capable of looking up a globally unique identifier. An illustrative example of a key manager server 26 usable with at least some embodiments of the invention is the RSA KEY MANAGER appliance manufactured by EMC Corporation of Hopkinton, Mass.; however, the invention is not, of course, limited to use of the RSA KEY MANAGER.

The key manager server 26, in cooperation with the key manager client 86 (which operates remotely and in concert with the key manager server 26) running at the host, controls the generation, protection, storage, replacement, and elimination of encryption keys. In particular, the key manager server 26 creates encryption keys and also creates the key_id (an identifier that is associated with the encryption key and can be used to obtain the encryption key, provided that all permissions and credentials are in place) and is responsible for that association and for allowing lookup of an encryption key using the key_id. (Note that the key_id, in some embodiments (e.g., those using the RSA KEY MANAGER), is globally unique. In some embodiments, the key_id is unique within a domain. In other embodiments, the key_id might not necessarily be unique.) Thus, one role of the key manager server 26 in FIG. 2A is to securely create, store and return keys to authorized entities, such as the I/O filter system 28 with I/O filter driver 29 of FIG. 2A (e.g., such as EMC POWERPATH ENCRYPTION WITH RSA). It should be understood, however, that the key_id could instead be created at the host 1. It is more advantageous to create the key_id at the key manager server 26 as this results in fewer process steps overall.

Figure 3A:
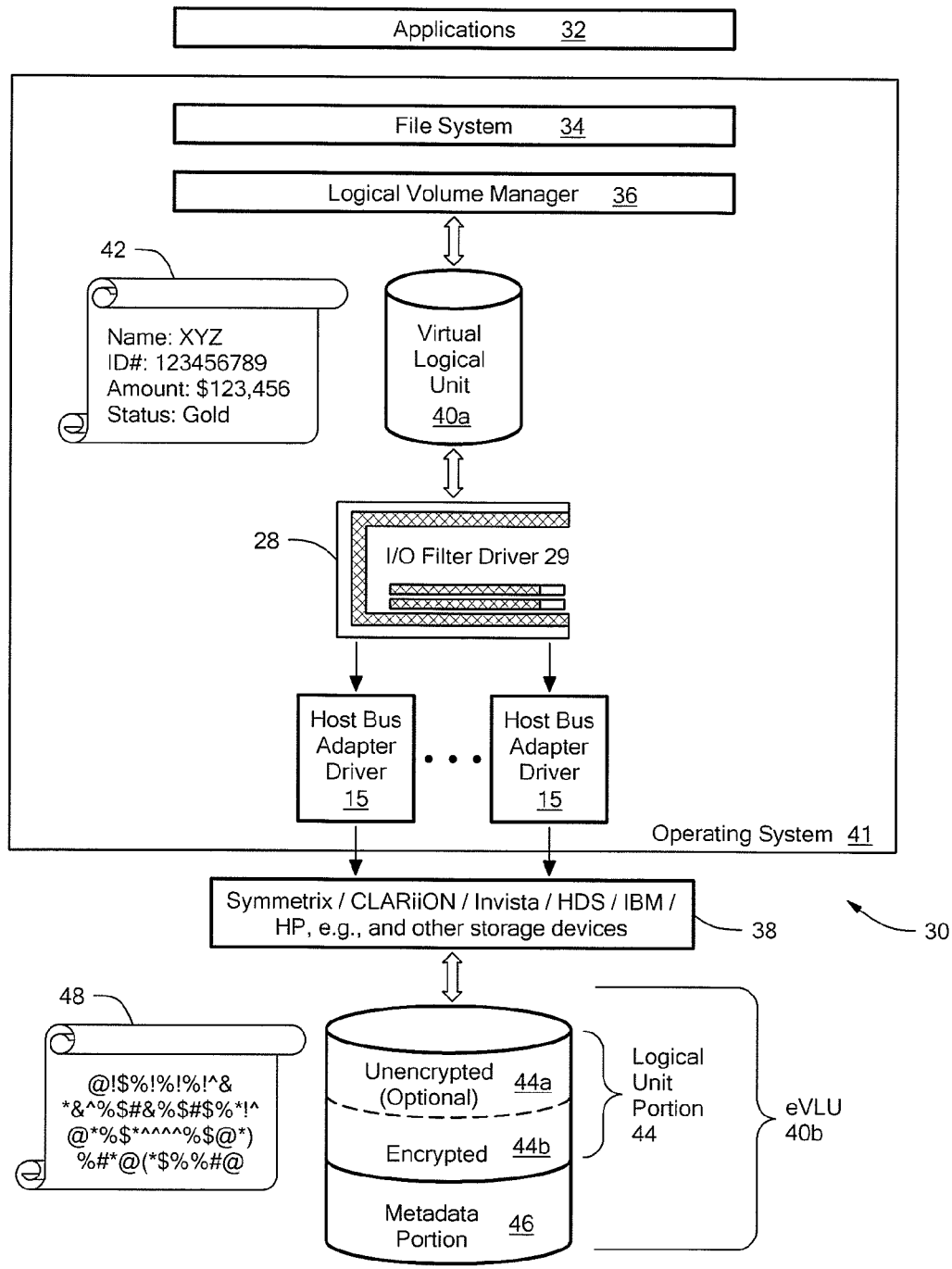
FIG. 3A is a block diagram illustrating a first input/output (I/O) stack configuration, illustrating the location of the I/O filter system with driver, in accordance with one embodiment of the invention.

As will be explained in greater detail herein, plaintext data (e.g., data generated by an application running at the host 1) transmitted from a host system 1 to a storage device 3, 4, 9 is encrypted using an encryption key provided by the key manager server 26. As will also be explained in greater detail herein, the encrypted data is stored on an encrypted virtual logical unit (eVLU) 40B on one or more of the storage devices 3, 4, 9, along with the key_id, which is later used to get an encryption/decryption key from the key manager server 26. An eVLU 40B (also known as a ciphertext logical unit) is a logical unit with encryption turned on. Note that all eVLUs are also virtual LUs. FIG. 3A is a first block diagram illustrating a first input/output (I/O) stack configuration 30, illustrating the location of the I/O filter driver 29 of the I/O filter system 28 (of FIGS. 1-2C), relative to other components in the stack, in accordance with one embodiment of the invention, and FIG. 3B is a block diagram illustrating a second input/output (I/O) stack configuration 30 that includes a SCSI driver in the stack and illustrates the location of the I/O filter driver 29 of the I/O filter system 28, relative to other components in the stack, in accordance with one embodiment of the invention FIGS. 3A and 3B also provides a schematic representation of a number of mapping layers that exist in exemplary embodiments of the computer system 1 of FIG. 1, as well as schematic illustrations of an eVLU 40B.

Figure 3B:
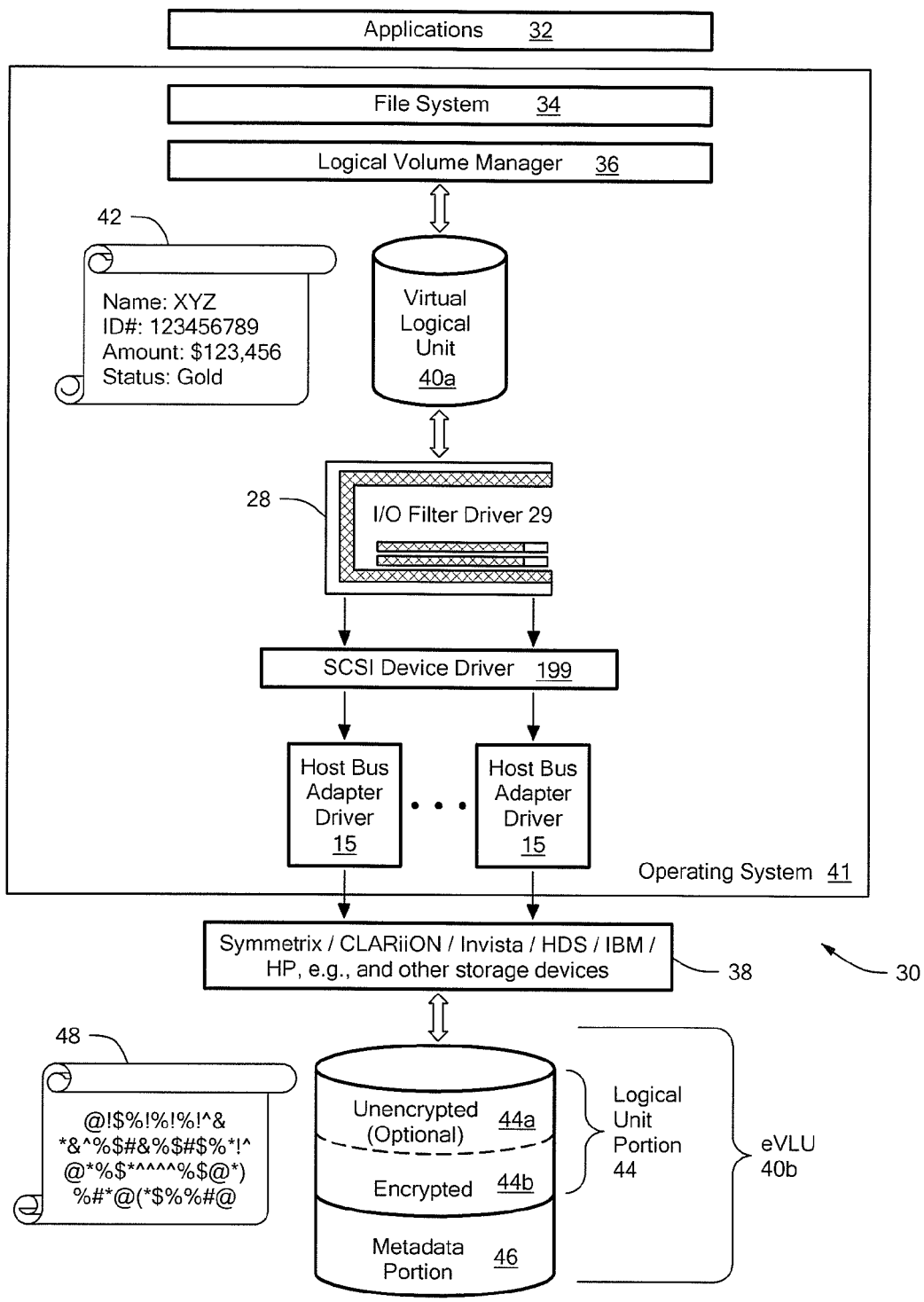
FIG. 3B is a block diagram illustrating a second input/output (I/O) stack configuration that includes a SCSI driver, illustrating the location of the I/O filter system with driver, in accordance with one embodiment of the invention.

Referring to FIGS. 3A and 3B, the I/O stack configuration 30 includes an application layer 32 which includes application programs executing on the processor 16 of the host computer 1. The application layer 32 generally will refer to storage locations used thereby with a label or identifier such as a file name, and will have no knowledge about where the file is physically stored on the storage system 3, 4, (FIG. 1). Below the application layer 32 is the file system 34 layer, followed by the logical volume manager (LVM) layer 36. The LVM layer 36 presents a logical volume to the file system layer 34. The LVM layer 36 maps that logical volume to what appears to be a physical volume to the LVM 36, but, which may be another logical construct presented by a layer lower in the stack. In the illustration of FIGS. 3A and 3B, for example, the LVM 36 maps to the logical unit (LU) 40B (also referred to herein as a virtual logical unit, when the LU has been virtualized).

In the embodiments of the invention, both the file system layer 34 and the LVM layer 36 are optional layers. An optional database manager layer also could be implemented in connection with the embodiments of the invention, and the database manager layer would be outside the kernel at the same level or below the application layer 32. Of course, one of skill in the art will recognize any particular application can make use of none, some, or all of the layers described herein and/or illustrated in FIG. 3.

The virtual logical unit (VLU) 40A represents a device presented by the I/O filter driver 29 to the layers above it. In contrast, an LU 40 represents the VLU 40A as seen without virtualization. The VLU 40A as illustrated in FIGS. 3A and 3B is shown as containing plaintext data 42 (also referred to as clear text). A virtualized LU 40A represents what any entity above the I/O filter driver 29 gets when accessing the eVLU 40B—that is, the entity gets the plaintext version of the data; the VLU 40A is a logical representation of the eVLU 40B as seen by entities above the I/O filter driver 29. The plaintext data 42 will be encrypted via the I/O filter driver 29, and written to the storage device 3, represented by the eVLU 40B. The eVLU 40B is used in the same manner as any other logical unit: that is, the eVLU 40B can be used for raw access, file systems can be mounted on it, and it can be placed under control of the LVM 36. Encrypted Data 48 on the eVLU 40B (excepting the metadata 46, which is unencrypted) is returned as cipher-text to any application 32 or other entity/user that accesses the data without going through the I/O filter system 28. For example, if a database is configured to read the native device corresponding to a device containing an eVLU 40B, and the database does not go through the I/O filter driver 29, the database retrieves cipher-text.

In the embodiments of FIGS. 3A and 3B, the I/O filter driver 29, which is part of I/O filter system 28 (not shown), sits below the applications 32, file system 34, and LVM 36 in the I/O stack 30. Note that the invention does not require that the I/O filter driver 29 be implemented below the LVM 36 or file system 34 in the I/O stack 30. In the particular embodiment illustrated in FIG. 3B, the OS 41 includes an I/O filter driver 29 that sits above a SCSI device driver 199. For some embodiments of the invention that include the SCSI device driver 199, the LU 40 that happens to be an eVLU 40B is read by portions of the OS that live below the I/O filter driver 29 or execute before the I/O filter driver 29 is loaded, such as the SCSI device driver 199. As explained further herein, in connection with certain embodiment of the invention, if the eVLU 40B can be read by portions of the OS 41 that live below the I/O filter driver 29 or execute before the I/O filter driver 29 is loaded, then the I/O filter driver 29 stores information indicating the portions of the eVLU 40B that can be read by those portions of the OS 41, so that the portions read by the OS can be left unencrypted. The information can be stored, for example, in the metadata of the eVLU 40B, but that location is not limiting. Those of skill in the art will appreciate that information designating unencrypted regions can be stored in many different structures in other embodiments (e.g., tables, the actual code itself, etc.).

In general, in accordance with one embodiment of the invention, the I/O filter driver 29 can be situated above or below any component in the I/O stack 30 except that preferably the I/O filter driver is not situated below the HBA driver 15. The I/O filter system 28 in which the I/O filter driver 29 resides includes functionality to act as an encryption manager in the I/O stack 30. As described previously, the I/O filter system 28, in one embodiment, is the EMC POWERPATH ENCRYPTION with RSA system.

Figure 4:
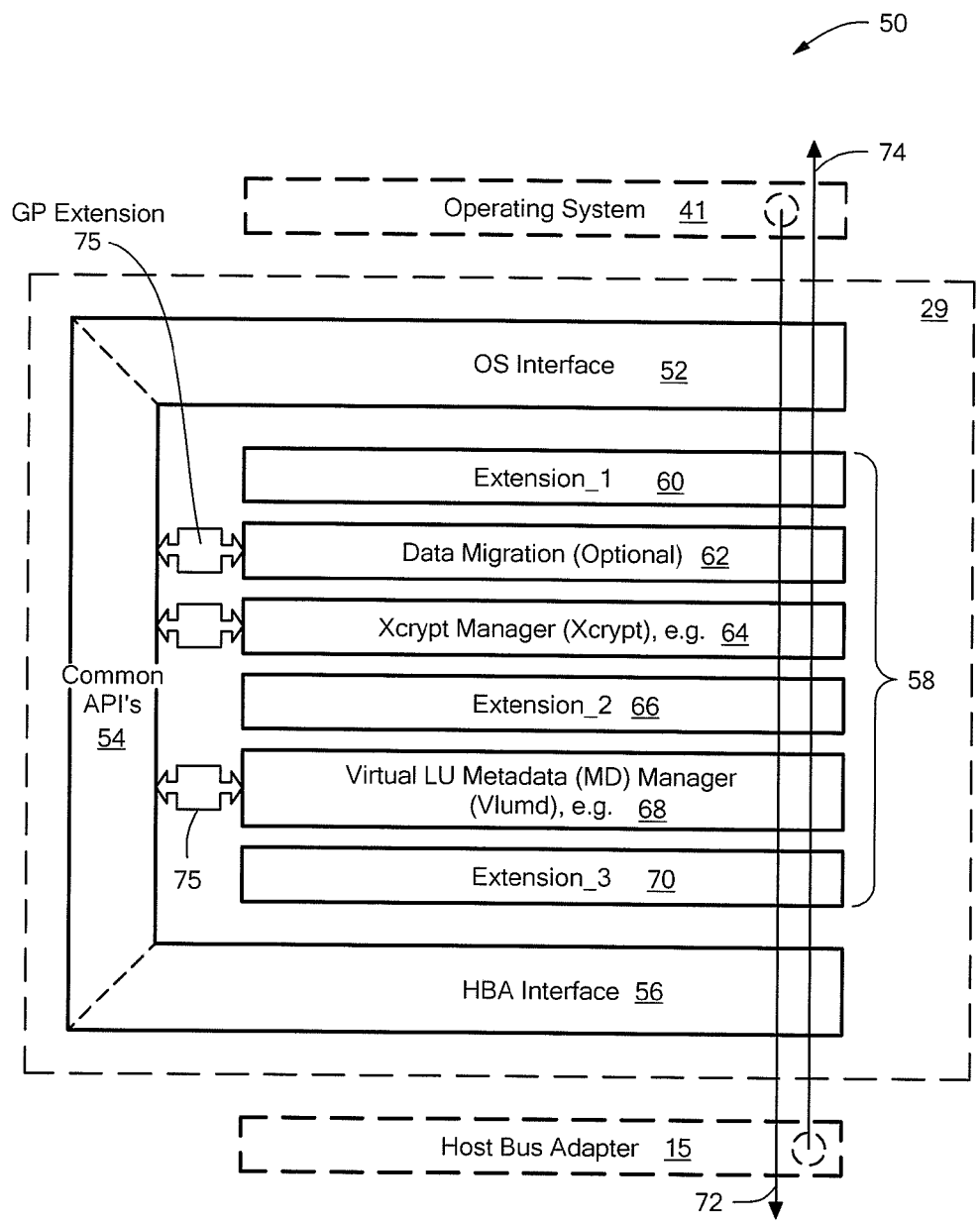
FIG. 4 is exemplary software architecture for of the I/O filter driver portion of the I/O filter system of FIG. 1, showing architectural elements to handle encryption and decryption of I/O requests and architectural elements that provide support for replication of encrypted virtualized logical units (VLUs), in accordance with one embodiment of the invention.

The I/O filter driver 29 creates a virtualized LUN designating some space in the LUN to store its metadata and the key_id in that metadata space. For example, a given storage device 3, 4, 9 is virtualized into a Virtual Logic Unit (VLU) 40A and at least one metadata storage space 46 is allocated in the physical space of the device, where the key_id is stored in the metadata storage space 46, so as to indicate that the LU is encrypted (i.e., the LU becomes an eVLU 40B; see FIG. 3). For example, a primary eVLU 3 can be replicated to a replica eVLU 4, where the replica eVLU 4 contains the same key_id as the primary eVLU 3 (indicating that the replica eVLU 4 is encrypted with the same key as the primary eVLU 3). FIGS. 4 through 6, described further below, provide more details about the components of the I/O filter system 28 itself.

Referring again to FIGS. 3A and 3B, anything executing "above" the I/O filter driver 29 (e.g., user applications 32, databases, file systems 34, logical volume managers 36, etc.) but that is using the I/O filter driver 29, sees data stored on the LU 40 as plaintext and cannot see the metadata 46 region on the underlying logical unit. That is, an application 32 or other component executing above the I/O filter driver 29 sees only a virtualized LUN, minus the metadata 46 (the metadata 46 is "invisible" to the component above the I/O filter driver 29.)

In at least some embodiments of the invention, the virtualizing of the LUN is more of a host-based virtualization than a switch-based or array-based virtualization. With at least some embodiments of the invention, the virtualization of the LUN is a generalized facility added to the I/O filter system 28 that allows for storing metadata (or properties) on a device for any reason. The Xcrypt Manager extension 64 (described further below in connection with FIG. 4) uses this abstraction layer to store the key_id information for an encrypted device. The presence of the key metadata (or key property) on a device indicates the device is encrypted and should be treated by the Xcrypt Manager 64 as such. It should be understood, however, that the actual encryption key is not stored in the metadata 46, as this would violate security requirements. Rather, as explained herein, what is stored in the metadata 46 is information about the key that allows lookup of the key from the Key Manager server 26, assuming the requester is allowed access to that key.

With the eVLU 40B and metadata 46 herein, the metadata 46 is created during virtualization, where the virtualization driver I/O filter driver 29 (which can be accomplished using many techniques known to those of skill in the art) ensures that code running "above" the I/O filter driver 29 can see only the virtualized logical unit portion 44 of the eVLU 40B, without ever knowing that the metadata 46 is there. In one embodiment, this virtualization is accomplished using size spoofing of the LU, where the size spoofing involves showing the code running above the I/O filter driver 29 that the size of the device (e.g., LU 40) is the size minus the size of the metadata area 46, which has the effect that no entity other than the I/O filter system 28 (and I/O filter driver 29) is able to access the metadata region 46.

In a still further embodiment, areas of the LU that need to remain unencrypted, such as the metadata and OS-specific areas, can be put into a partition not used for data and/or put in some other area of the storage device and protected from unwanted access by the I/O filter driver 29.

The metadata 46 itself is not encrypted. Note also that the metadata 46 can, in at least some embodiments, be used to implement functions (such as mirroring and/or partitioning) in addition to providing a location on the eVLU 40B for storage of the key_id. In certain embodiments, the metadata stores information about regions of the eVLU 40B that are to be left as plaintext. In addition, note that, although only a single metadata region 46 is illustrated in FIGS. 3A and 3B, in some implementations, there can be more than one metadata region 46.

Referring again to FIGS. 3A and 3B, the eVLU 40B includes a logical unit portion 44, which stores the encrypted data 48, as well as a metadata portion 46, which stores metadata (which itself is unencrypted). In at least one embodiment of the invention, the logical unit portion 44 includes at least a section 44A that stores unencrypted data and a section 44B that stores encrypted data, and the I/O filter system 28 keeps track of these sections. The order of the sections shown is not limiting (that is, the first section need not be the one that stores unencrypted data; it could, for example, store encrypted data). The sections storing encrypted and unencrypted data can be anywhere in the eVLU 40B, and there can be more than one section of each type.

In one embodiment, described further herein, the metadata portion 46 includes information about which regions in the logical unit portion are designated plaintext (unencrypted) regions. The metadata 46 provides enough identification information (but not the actual encryption key itself) to enable a host 1 miming the I/O filter system 28 and in communication with the eVLU 40B to get the actual encryption key from the key manager server 26, as is described further in connection with FIGS. 2A-2C and 11A-11B.

Providing a key_id in metadata 46, where the key_id is presented to a key manager server 26 to get a key, provides advantages, especially for replication, that would not be available with other arrangements. Consider, for example, an alternate arrangement where, instead of a key manager server 26 storing a database that associates a key_id with a key (as is done with the present invention), the key manager server 26 instead stored a database associating a given key with the unique identifier associated with a source LUN itself (e.g., a device_id). On the one hand, because every LUN has its own unique device_id, such an arrangement would provide a way to get an encryption key for a given LUN from a key manager server 26 based only on the device_id of a given LUN, and, furthermore, this alternative arrangement would not even require an area of metadata on a LUN. However, this alternate arrangement might not be as optimal for situations where replicas are made of a LUN, because the replica, being a different device, would have its own device_id, and the replica device_id that would not be the same as the device_id of the source from which it was replicated.

Thus if a source LUN in this alternately considered arrangement were encrypted with a given key (stored at a key manager server), and the key manager server stored info linking just the source LUN device_id with the encryption key, a replica LUN made of the source LUN would not be able to access the appropriate encryption key at the key manager server, because the replica is on a LUN with a different device_id. Thus, extra steps would be required for the replica to obtain the device_id of the source LUN and to present the source device_id to the key manager, so that the key could be obtained. This would require considerable extra steps as compared to the implementations of the invention described herein. Replication also could require extra steps, potentially requiring changes in existing scripts for replication. Further, this alternate arrangement would not permit replication, writing data, reading data, etc., to be transparent, as it is with the embodiments of the invention described herein.

In contrast, in accordance with embodiments of the invention described herein, providing a metadata area 46 that stores an identifier that can be used to acquire an encryption key helps to ensure that creating and reading encrypted replica eVLUs is transparent and requires no additional steps beyond a regular replication process (assuming security requirements are met). The information needed for decryption is inherently made part of any replica made with any replication method, in accordance with the embodiments of the invention. Furthermore, a replica eVLU, created in accordance with embodiments of the invention described herein, will still be subject to the protections that the key manager server 26 provides as to unauthorized access. Even if an unauthorized entity gains custody of a replica eVLU, the unauthorized entity still will not be able to access data because the key manager will fail any unauthorized attempts to look up the key; that is, the security checks on the key manager (see FIG. 11B) will not be met.

The invention can be implemented in many alternative embodiments, as well. For example, in one alternative embodiment, the device_id of a replica eVLU is registered in the Key Manager server 26 and is associated in some way there with the key of the source eVLU. In still another alternative embodiment, the device_id of the primary eVLU is written in metadata and then used to look up the key.

Referring again to FIGS. 3A and 3B, the key_id in metadata 46 also serves as identifier of sorts for the eVLU 40B, to help the kernel 96 (see FIG. 5) of an operating system running on the host recognize that a given LU 40 is, in fact, an eVLU (this is discussed in more detail in connection with FIG. 11A). That is, when the I/O filter driver 29 is running and encounters a "new" logical unit, the I/O filter driver 29 can check first to see if the metadata region 46 is present and can be read, and second, to see if the metadata includes a key_id, which indicates that the logical unit 40 contains encrypted data (which tells the I/O filter driver 29 that the LU 40 is an eVLU 40B and that it needs to get the encryption key from the key manager server 26) (this process is described more fully in connection with FIGS. 11A-11B). Another advantage of writing the key_id in metadata 46 is with replication: any host 1 that has permissions to communicate with the key manager server 26 (and which meets all security requirements) can access every replica made of an eVLU 40B and get the key and decrypt the replica. In addition, in at least some embodiments of the invention, there are two or more separate pieces of information stored in the metadata, such as one that says the LU 40 is encrypted and another that gives information used to look up the key.

Accordingly, whatever protections a key manager server 26 has in place for restricting a host 1 from obtaining the key for an eVLU 40B are likewise in place for replicas of the eVLU 40B. Thus, even if an unauthorized entity physically takes a storage device containing a replica of an eVLU 40B and mounts it to a different, unauthorized host, the unauthorized entity won't be able to access the data on the replica because unauthorized host will not be able to meet the security requirements of the key manager server 26 and therefore will not be successful in obtaining the key. Further, this requires no extra steps or added management scripts to implement. These and other processes are explained in greater detail in connection with the flow charts of 7-17 herein.

In the eVLU 40B, the location of the metadata 46 is platform specific and may depend further on the formatting of the device on that platform. Its illustration in FIGS. 3A and 3B as being at the "end" of the eVLU 40B is not limiting, although it is applicable for at least some embodiments of the invention.

In at least one embodiment of the invention, the eVLU 40B includes two copies of metadata, referred to as the primary and alternate copies. The primary and alternate copies need not be in contiguous segments, but could be in separate segments (such as at the beginning and the end). A valid primary copy of metadata 46 is always the authoritative copy as metadata updates are always performed on the primary copy first (more below). The alternate copy of metadata is for robustness to rollback to previous metadata state as appropriate. A copy of metadata is composed of two parts: header and data areas. The metadata header is a single block (512 bytes) in size, but this size is not limiting. The metadata data area is a variable length list of property name, property value pairs. Each property name is also variable length. In one embodiment, the key_id stored in the data portion of the metadata 46 has a size of 16 bytes, and this size is illustrative and not limiting.

In addition, in at least some embodiments of the invention, the processes that perform encryption have predetermined knowledge that certain blocks or other regions in the LU 40 should be kept as plaintext (e.g., region 44A of FIG. 3) and not be encrypted. For example, with certain operating systems, the first block in a volume corresponds to the volume table of contents (VTOC) and must be kept as plaintext; in addition, the VTOC can include information identifying the location of the beginning of alternate cylinders, where all data from that point on is to be kept as plaintext. The point is that any OS metadata that is accessed below the I/O filter driver 29 or prior to the loading of the I/O filter driver 29 at startup of the host 1 must be kept in plaintext, because, for OS metadata that is accessed below the I/O filter driver 29, the data is accessed without use of the I/O filter driver 29, and, for OS metadata that is accessed prior to the loading of the I/O filter driver 29, the I/O filter driver 29 has not yet been loaded to decrypt it. However, only OS metadata (not any application data) is accessed in this way.

As an example, in one embodiment, the eVLU 40B can be implemented where some areas of the eVLU 40B other than the metadata 46 are left unencrypted (that is, the entire logical unit portion 44 is not encrypted, but is divided into unencrypted region 44A and encrypted region 44B, as shown in FIGS. 3A and 3B). This helps to support the needs of certain operating systems 41 to access their own metadata when it is accessed at different places (e.g., "lower") in the I/O stack 30 than where the I/O filter driver 29 metadata resides and/or at different times (e.g., startup) than the I/O filter driver 29 is running. For example, when using the IBM AIX OS, sector 0 in a logical unit cannot be encrypted. For WINDOWS, the device signature (written to the logical unit) is accessed below I/O filter driver 29 or before I/O filter driver 29 is loaded and must be kept in plaintext.

In another example, on THE SUN SOLARIS OS, VTOC formatted devices hold the label, VTOC, and geometry information in the first block (block 0). This block is not encrypted so that the kernel layers below the I/O filter driver 29 that need to access this information can do so without use of the Xcrypt Manager 64 (see FIG. 4). Access to this information does not in itself constitute a security violation. Another unencrypted region for VTOC formatted devices are areas known as the alternate cylinders. Other platforms may be different based on device format and operating system specifics.

Leaving certain areas 44A of the eVLU 40B unencrypted other than the metadata areas 46 helps to prevent the I/O filter system 28 from encrypting operating system metadata stored on the eVLU 40B. In one embodiment, the I/O filter driver 29 of the I/O filter system 28 determines whether a request to write data is to a portion of the eVLU 40B used by the operating system 41. In such instances, the I/O filter driver 29 keeps certain data unencrypted that an operating system 41 accesses below the level of the I/O filter driver 29. In one embodiment, this is accomplished by recording in code, a data structure, a map, a table, or in the metadata 46 itself the block ranges that are and/or must be in plaintext. The block ranges that are left as plaintext depend on the operating system, as will be appreciated by those of skill in the art.

FIG. 4 is an exemplary software architecture for the I/O filter driver 29 portion of the I/O filter system 28 of FIGS. 1-2, showing architectural elements to handle and provide support for encryption and decryption of I/O requests and replication of encrypted virtualized logical units (eVLUs) 40B, in accordance with one embodiment of the invention. The I/O filter driver 29 of FIG. 4 may be thought of conceptually as having the form of a "C" clamp with a top horizontal arm (labeled as the OS Interface 52), a bottom horizontal arm (labeled as the HBA Interface 56), and a vertical connector (labeled as the Common APIs 54) between the top and bottom horizontal aims, as well as one or more extensions (which are shown in FIG. 4 as the horizontal arms extending in parallel between the top horizontal arm and the bottom horizontal arm, including all the extensions from 60-70, as well as the general purpose (GP) extension 75). Note that the extensions other than the Xcrypt Manager 64 and the vlumd manager 68 are all external to the embodiments of the invention and are provided by way of illustration only.

The C-clamp I/O filter driver 29 supports components for providing platform independent functionality for the I/O filter driver system 28 (see FIGS. 1-3) and also supports various platform dependent components for supporting specific operating systems.

Referring again to FIG. 4, the OS interface 52 may be, for example, an interface to any operating system, such as Sun's SOLARIS, IBM AIX, HPUX, LINUX, and/or Microsoft's WINDOWS NT. The HBA interface 56 includes platform-dependent code comprising an interface to relevant host bus adapters. The Common APIs 54 comprises a series of common Application Programming Interfaces (APIs). An advantage of the C-clamp configuration of FIG. 4 is that extensions can be written in a platform-independent manner because the OS Interface 52, HBA Interface 56, and Common APIs 54 translate all of the platform-dependent communications into more generic communications. Various extensions 60 through 70 are enveloped between the OS Interface 52 and the HBA Interface 56. Note that, although each extension is illustrated as a single extension, each extension could consist of a plurality of extensions.

The vertical line 72 in FIG. 4 running vertically from the operating system 41 through the host bus adapter 15 and pointing downward helps to indicate the direction and order that data takes from the operating system 41, through the I/O filter driver 29, and to an eVLU 40B and generally corresponds to the order in which the extensions are executed in response to an IO request. As those of skill of the art will appreciate, if a first extension needs processing or input provided by a second extension, then the second extension must be processed before the first extension in the I/O stack. For example, input to the I/O filter driver 29 from the operating system 41 is acted upon by the OS Interface 52, then the Xcrypt Manager 64, then the virtual LU metadata manager (vlumd) 68 before it passes out through the HBA interface 56 to the host bus adapter 15. Similarly, the vertical line 74 running upward from the host bus adapter 15 towards the operating system 41 indicates the direction of that data takes when it is output from an eVLU to the operating system 41. This is the direction of configuration of a device/LU (as will be described further in connection with FIGS. 7-17), as well.

In addition to a plurality of existing extensions (all are not illustrated, but the data migration extension 52 is illustrative), two new extensions are added in the embodiment of FIG. 4 to manage I/O requests and encryption and decryption, as well as a number of other features of the present invention. These extensions are explained below and further herein.

Figure 9:
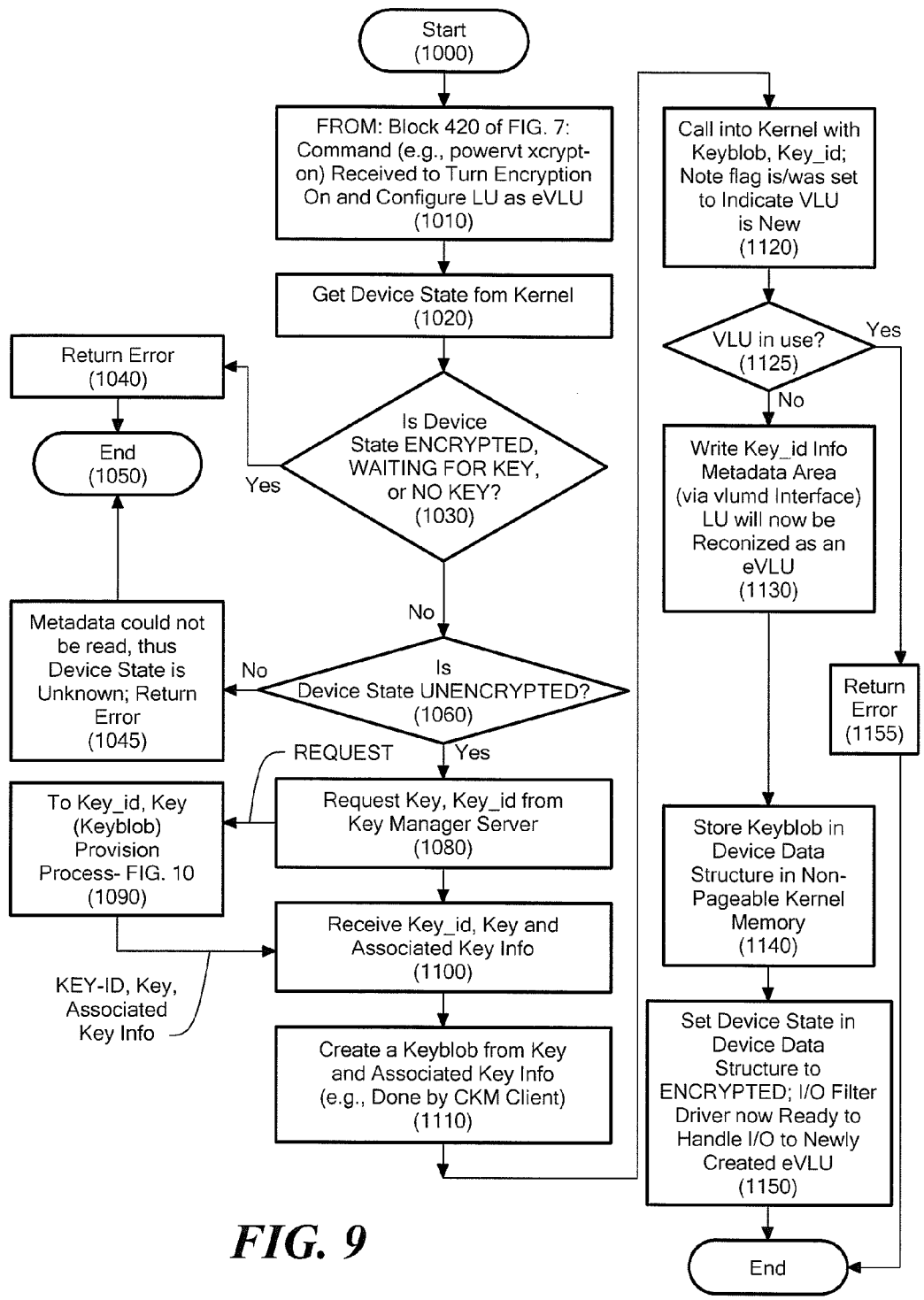
FIG. 9 is a flow chart of a method for configuring a new device as an encrypted VLU (eVLU), in accordance with one embodiment the invention.

The Xcrypt Manager extension 64 (xcrypt 64) is an extension that includes functionality to turn encryption on or off for a given logical unit, in response to a command from userspace. The Xcrypt Manager extension 64 is the only extension that interacts with the crypto kernel 98 (see FIGS. 5 and 6) and can interface with various userspace components (see FIGS. 5 and 6) using both kernel events mapped to the libemcp_events library 210 and IOCMDs (see FIG. 6) The Xcrypt Manager 64 supports several input-output commands (IOCMDs) that are used by a component called libemcp_xcrypt 208 (see FIG. 6) to communicate with it. The libemcp_xcrypt 208 component services user commands from the powervt API 204 component and coordinates the lookup key event in the kernel 96. These commands, which are explained more fully as part of the flowcharts of FIGS. 7-17 herein, do the following things:

Add the encryption property to a device (see, e.g., the flowchart of FIG. 9). This command also results in the provision of a key_id for the device and, optionally, other properties in addition to the key_id, if a given application requires it.

Figure 17:
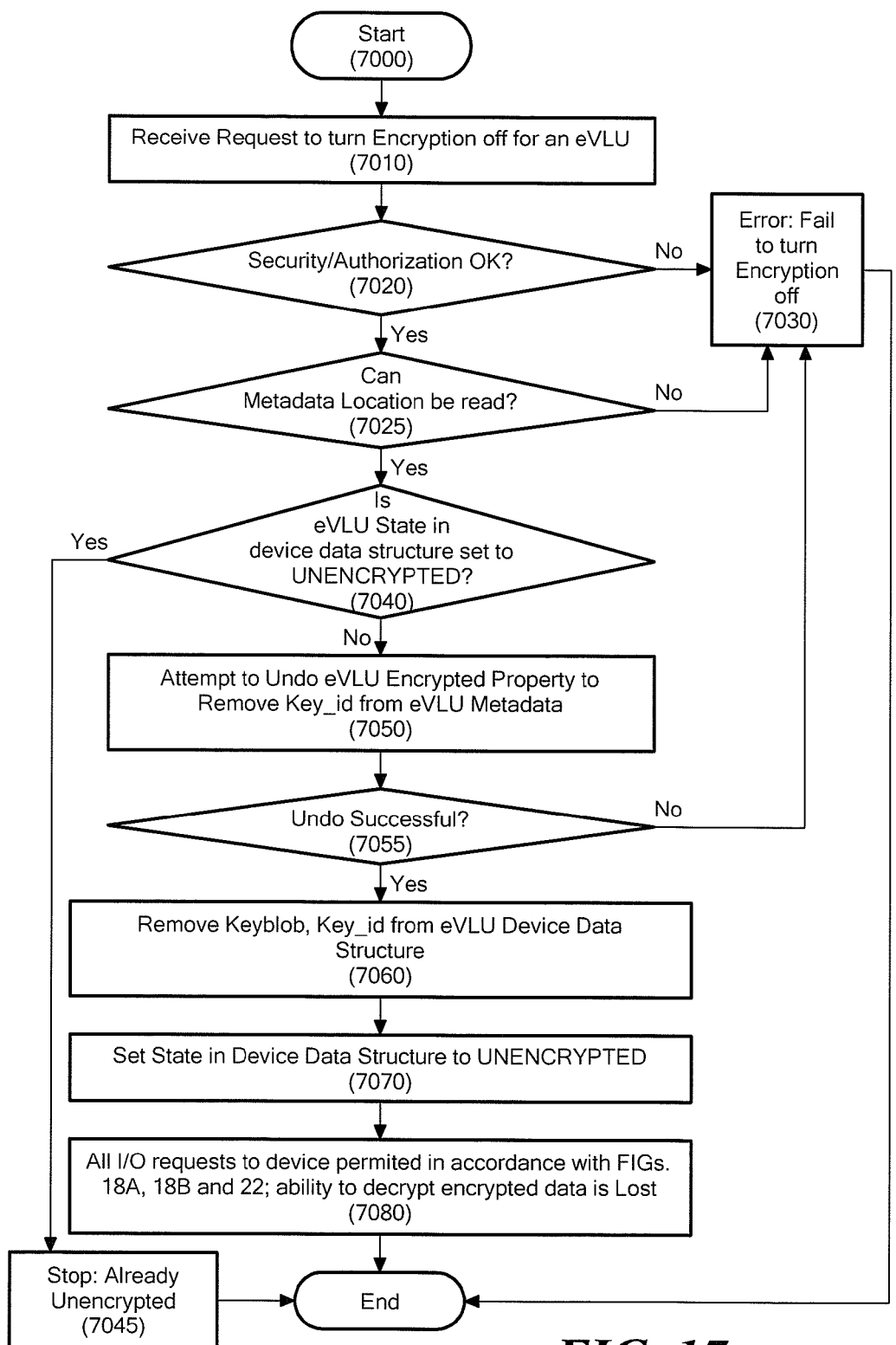
FIG. 17 is a flow chart showing a method for removing the encryption property of an eVLU, in accordance with one embodiment of the invention.

Remove the encryption property of a device (see flowchart of FIG. 17).

Push the keyblob (described further herein) to the Xcrypt Manager 64

Return information as to whether a device is encrypted or not (see, e.g., flowcharts of FIGS. 9, 11A, 12, 13, 16 and 17)

Update the Xcrypt Manager 64 internal device data structure for a particular device (whether it is encrypted or not)

Optionally, resize an encrypted device

Operationally, the Xcrypt Manager 64 itself also does the following:

On configuration of a device (for instance, at host startup), checks whether the device has the encryption property (which is indicated by having a key_id stored in its metadata 46). If a device has such a key_id, the Xcrypt Manager signals an event to lookup the keyblob (see FIGS. 11A-11B).

On every read of a device (see FIG. 13), decrypt the data on the way back to the user. In one embodiment, this step happens as part of I/O Done (see FIG. 14) and may be done in interrupt context or queued to a helper thread, depending on performance needs.

On every write of a device (see FIG. 12), encrypt the data before sending it down the I/O stack.

Whenever an eVLU 40B is encountered by the I/O filter driver 29 (usually at startup of the host 1), it is configured into the I/O filter system 28 by the Xcrypt Manager 64. At that point, the Xcrypt Manager 64 requests the key lookup of the encryption key by passing the key_id to a xcrypt (userspace) daemon (the xcrypt daemon 102—see FIGS. 5-6), where the xcrypt daemon 102 is running a key manager client 86 that communicates with the key manager server 26 to get the key (see the processes of FIGS. 11A-11B). Once the key lookup is accomplished, the xcrypt daemon 102 sends the encryption key to the Xcrypt Manager 64, which then has it available for doing I/O (see FIGS. 12-14). This request and response also contains a "device_id" which identifies the underlying LUN that is encrypted and is used to lookup the data structure where the encryption key is stored in the kernel. As further described in connection with FIGS. 12-14, both read and write operations require the Xcrypt Manager 64 to allocate an additional buffer to hold the encrypted data. The original buffer will always hold the plaintext version of the data.

The virtual logical unit metadata (MD) manager (vlumd) extension 68 takes care of establishing a metadata region 46 on a device, where the metadata region 46 can be unambiguously recognized, and provides controlled access to the metadata 46, protecting it from inappropriate access. The vlumd extension 68 also sets name value pairs into metadata 46 and gets the value back when presented with the name; it will be understood by those of skill in the art, however, that there are many other alternatives to the use of name/value pairs. The vlumd extension 68 provides a vlumd interface usable by the Xcrypt Manager extension 64. In one embodiment of the invention, the only user of the vlumd interface is the Xcrypt Manager extension 64. However, in other embodiments, the vlumd manager 68 is able to be extended to support other types of LU virtualization and LU functions, such as mirroring, striping, and thin provisioning.

The general purpose extension 75 is an intermediary between certain of the extensions (e.g., the xcrypt 64 extension, the data migration extension 62, and the vlumd 68 extension) and the C-clamp and provides more flexibility to the extensions by allowing dynamic loading.

FIG. 5 is a block diagram showing information and I/O flow during unattended operation of the I/O filter system 28 and computer system 1 of FIG. 1, in accordance with one embodiment of the invention, including many of the elements that are either part of the I/O filter system 28 or that interact with the I/O filter system 28. FIG. 6 is an architectural diagram showing, in greater detail, the I/O filter system components of FIG. 5 and illustrating, in accordance with one embodiment of the invention, a system for creating, using, and destroying encrypted virtual logical units (eVLUs) 40B. The architecture of FIGS. 5 and 6 may be implemented as part of the EMC POWERPATH ENCRYPTION with RSA product available from EMC Corporation of Hopkinton, Mass. The key manager server 26 can be, in one embodiment, the RSA KEY MANAGER product available from EMC Corporation. The Crypto Kernel 98 can be, in one embodiment, the BSAFE CRYPTO KERNEL available from EMC Corporation. In addition, as will be explained further herein, the system of FIGS. 5 and 6 can be used in cooperation with products that provide replication, such as SYMMETRIX REMOTE DATA FACILITY (SRDF) (available from EMC Corporation), TIMEFINDER (available from EMC Corporation), and MIRRORVIEW (available from EMC Corporation).

Referring now to FIGS. 5 and 6, the I/O filter system 28 includes components in both userspace 82 and kernel space 96. The I/O filter system 28 components in kernel space 96 are the ones that interact with the storage arrays 3, 4, 9. In kernel space 96, the I/O filter system 28 includes an I/O filter driver 29 having the previously described (in FIG. 4) "C-clamp" architecture that includes an Xcrypt Manager 64 and a vlumd manager 68, along with kernel events 214. The kernel space 96 portion of the I/O filter system 28 is in communication with a crypto kernel 98 (which is illustrated in FIG. 5 as the B-SAFE CRYPTO KERNEL 98 and in FIG. 6 by the combination of the cryptography key manager (CKM) kernel 216 and encryption/decryption library 218, which together form a crypto kernel 98). The crypto kernel 98 (including the CKM kernel 216 portion) is in communication with the Xcrypt Manager 64 of the I/O filter driver 29.

In one exemplary embodiment, the crypto kernel 98 is implemented using the B-SAFE CRYPTO KERNEL product, available from RSA Security, which is owned by EMC Corporation of Hopkinton, Mass., to provide a cryptographic foundation for other security products that interact with the I/O filter system 28, such as the key manager server 26. In one embodiment, the crypto kernel 98 provides a collection of cryptographic algorithm implementations, including, for example, at least one of Advanced Encryption Standard (AES) (also known as Rinjdael) cipher block chaining (AES_CBC) encryption (256 bit keys) and/or AES tweakable block ciphers encryption (two 128 bit keys). Other cipher key strengths (e.g., a 128-, 192-, 256- or 512-bit encryption key sizes) are also usable with embodiments of the invention.

Use of a symmetric encryption technique such as AES-based encryption is advantageous for embodiments of the invention where it is required that the size of the block remain the same after encryption as before (as those of skill in the art are aware, a number of encryption algorithms increase the size of a data block). As will be understood by those of skill in the art, the invention is not limited to only AES-based encryption algorithms. In certain embodiments, any encryption algorithm that does not change block size is usable. In at least some other embodiments, it may be possible to use encryption algorithms that do change the block size. Note that, in the embodiment of FIG. 5, the crypto kernel 98 protects its data via encryption using a data encryption key (DEK).

The kernel 96 provides abstraction layers for hardware, memory, processors, and input/output (I/O) and makes these tools available to the userspace 82 through system calls. The kernel events 214 support input/output commands (IOCMDs) such as waiting for an event, getting an event argument, and one call that any kernel extension can use to notify an event (that is put it on a queue for a userspace entity to retrieve through a wait.

Referring again to FIGS. 5 and 6, the userspace 82 components of the I/O filter system 28 include a common security toolkit (CST) 84, an xcrypt daemon 102 (which runs a key manager client 86), several userspace data files 85 (including a set of configuration files 92 (signed and made tamper-proof by CST 84), a lockbox 94 (also provided by CST 84) and a key cache 90), a powervt command line interface (CLI) 202, a powervt application programming interface (API) 204, a cryptographic key manager (CKM) client interface 212, a key manager client 86, a libemcp_xcrypt userspace library 208, and a libemcp_events userspace library 210. One or more applications 32 also run in userspace, but the applications 32 are not part of the I/O filter system 28. The I/O filter system 28 also includes several userspace 82 scripts, including the xcrypt_config script and the xcrypt_startup script. The xcrypt_config script is run only once, after the initial installation of the I/O filter system 28, to execute all the commands that configure all the I/O filter system 28 components for performing encryption functions, using the configuration files 92 (see, e.g., block 640 of the process of FIG. 8). The xcrypt_startup script is run to start the xcrypt daemon 102 after reboot of the host 1 and is also called from the xcrypt-_config script to start the xcrypt daemon 102 for the first time.

The key manager client 86 is a component of the key manager server 26 that operates remotely (incorporated into the 10 filter driver system 28 on host 1), and the key manager client 86 operates in concert with the key manager server 26 server. In the embodiment of FIGS. 5 and 6, keys are only provisioned by the key manager server by going through the key manager client 86. Referring again to FIGS. 5 and 6, provisioning happens starting in the powervt CLI 202 going through the powervt API 204, libemcp_xcrypt 208 to CKM client 212 through key manager client 86 (not going through the xcrypt daemon 102). It will be appreciated by those of skill in the art, however, that embodiments of the invention could be implemented where a different component provides keys to the key manager server 26, for provisioning to the I/O filter system 28 (that is, it is possible to generate keys outside of the key manager 26 itself, but later store the keys on the key manager 26).

The key manager client 86 can cache certain encrypted keys and therefore does maintain and obtain encryption keys, but only as a cache of what is on the key manager server 26 (which advantageously is the definitive source for encryption keys). The encryption keys include keys for encrypting and decrypting data. Note that there also are master keys for encrypting the encryption keys (i.e., key encryption keys (KEKs)), to provide further key security, but the KEKs are stored in the lockbox 94 and are used, in at least some embodiments of the invention (including but not limited to embodiments that are implemented in hardware based environments), to encrypt the data encryption keys (DEKs) stored in the client key cache 90. Only encrypted keys are stored in the key cache 90. Note that, in some embodiments the KEK is not used.

The I/O filter system 28 can be configured to work with various types of keys, such as 64, 128, or 256 bit keys, and with various encryption algorithms. In one embodiment, the key cache 90 is accessible only in userspace 82. In another embodiment, the key cache 90 grants read-only access to the kernel 96.

The CST 84 includes command line interfaces (CLIs), application programming interfaces (APIs) and libraries to help provide functions such as user authentication (e.g., via CST Authentication 84A), role management (authorization) (e.g., via CST role management 84B) account verification, security functionality, and password protection. In addition, the CST 84 includes a lockbox 94 to securely store security information, configurations and passwords, including a CST master key. Passwords are encrypted, using CST facilities and stored in the lock box 94, or in the configuration files 92 in the encrypted form. The Lockbox 94 keeps the key for these encryptions in a secure fashion. The CST 84 also stores configuration files 92 in a tamper-proof fashion by implementing configuration services to securely sign configuration files for the key manager client 86 (and the configuration files 92 are signed to detect tampering with configuration information). The CLI 202 uses the CST 84 to authenticate users of the CLI 202. Authorization happens in the API 204 using role management and the authentication token passed in to the API 204 from the CLI 202.

The key manager client 86 can cache encryption keys (also referred to as data encryption keys (DEK)) locally in the secure key cache 90, along with other key attribute information. Usually this is done at the time the encryption key is first created and sent to the key manager client 86 by the key manager server 26, as will be explained further herein. These locally cached data encryption keys in the key cache 90 are encrypted using a locally and automatically generated key encryption key (KEK) that is secured using a master key provided via lockbox 94 and the CST encryption function. In one embodiment, the key cache 90 is accessible only in userspace 82. In another embodiment, the key cache grants read-only access to the kernel 96. Note that the KEK is automatically generated at the time the host 1 is setup to use encryption services.

Communications between the I/O filter system 28 (including those of the key manager client 86) and key manager server 26 are protected in various ways, including use of trusted root and key manager server 26 certificates to prevent spoofing of the key manager server 26, and an encrypted secure sockets layer (SSL) protecting the communications themselves.

The CKM client 212 provides an abstract interface to the key manager client 86. For at least some embodiments of the invention, it is advantageous to abstract the interface to the key manager client 86 and key manager server components 26 so that other code providing these functions could be used in the future and to separate cryptography from the I/O control and operational paths. One concept for this abstraction is to create a context used by encrypt/decrypt in the kernel 96. The context includes a keyblob.

The keyblob is an abstraction that contains all the information stored by the key manager server 26 that is needed by the encrypt/decrypt code. None of the information stored internally in the keyblob is needed by the I/O filter system 28, so it is possible for the structure of the keyblob to be opaque to the I/O filter system 28. There is a unique keyblob for each logical unit, and, as explained further in the flowcharts of FIGS. 7-17 herein, the keyblob is looked up by key_id (a globally unique identifier) and provisioned by a policy, such as key class. A keyblob includes the actual encryption key plus other information used by a given encryption algorithm, provided in accordance with a class definition provided to the key manager server 26. The key class definition includes information relating to information stored in the keyblob, which include (but are not limited to): Key, key length, encryption algorithm, and mode of encryption algorithm. Note that although the keyblob is a data structure handled in both userspace 82 and the kernel 96, in at least some of the embodiments described herein, the keyblob is primarily used for encryption in the kernel 96, and the keyblob's handling in userspace 82 is primarily related to getting the keyblob to the kernel 96.

The xcrypt daemon 102 launches the key manager client 86 to look up keys (actually keyblobs) on behalf of the Xcrypt Manager 64 running in the kernel 96. The xcrypt daemon 102 calls into the library libemcp_xcrypt 208 (see FIG. 6) to wait for key lookup requests and once the xcrypt daemon 102 receives the request, the xcrypt daemon 102 looks up the keyblob (which may involve requesting it form the key manager server 26 or could involve getting it from the client cache and then pushing the keyblob back into the kernel). The xcrypt daemon 102 is launched when the one-time use script, xcrypt_config, is run and every time the host 1 is rebooted.

As shown in FIG. 6, the powervt CLI interface 202 is a command interface to the powervt API 204. In other implementations, a web-based interface (not shown) may be included in addition to, or in alternative to the powervt CLI interface 202. The powervt API 204 represents an implementation of an application program interface (API) that provides a set of routines in libraries for implementing encryption on logical units.

The libemcp_xcrypt library 208 is the userspace 82 interface to the Xcrypt Manager 64 running in the kernel. The xcrypt library 208 interfaces with the libemcp_events 210 event subsystem, the Xcrypt Manager 64 and the CKM client 212 and provides functions to do the following:

Wait for a lookup key request (called by xcrypt daemon 102)
Push keyblob into kernel 98 to Xcrypt Manager 64 (called by xcrypt daemon 102)
Add encryption property to a device by calling into kernel 98 to xcrypt manager 64
Remove encryption property from a device by calling into kernel 98 to xcrypt manger 64
Inquire as to the encryption information of a device by calling into kernel 98 to xcrypt manger 64

The libemcp_events 210 is a userspace 82 library that supports the events subsystem. The userspace calls go through this library to wait for events from the kernel events 214. Libemcp_events 210 is used by the xcrypt daemon 102 to wait for key lookup events posted by the Xcrypt Manager 64 through the kernel events subsystem 214.

Figure 7:
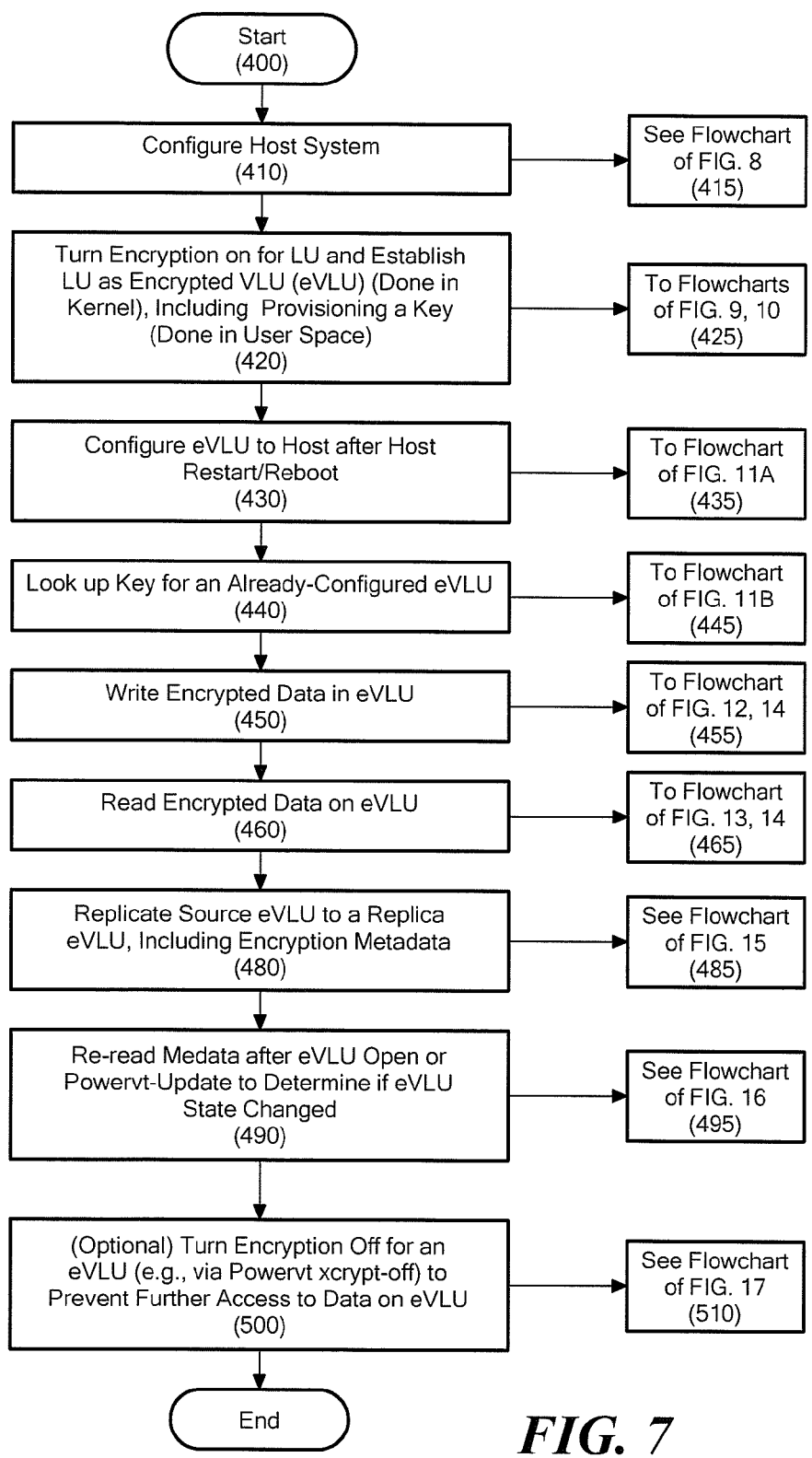
FIG. 7 is a high-level flow chart showing processes that can occur in the systems of FIGS. 1-6, in accordance with one embodiment of the invention.

FIG. 7 is a high-level flow chart showing processes that can occur in the system of FIG. 1, in which an I/O filter system 28 in accordance with one embodiment of the invention has been implemented. For the flowcharts of FIGS. 7-17, in many instances reference is made, as well, to components illustrated in FIGS. 1-6.

The processes of FIG. 7 are illustrated approximately in the order that they would occur. Note, however, that not every process shown in the blocks of FIG. 7 necessarily will occur for every I/O filter system 28. Initially, the host 1 is configured (block 410), using, e.g., the process of FIG. 8 (block 415). When configuration is done, encryption is turned on for a storage device 40 and the storage device 40 is established as an eVLU 40B (block 420), e.g. via the process of FIG. 9. Note that the VLU 40A represents a logical version of eVLU 40B, and the LU 40 is the combination of 40A and 40B together—the actual device. Block 420 includes provisioning a key, as well, via the process of FIG. 10. Another process that can occur is configuring the eVLU 40B to a host after the host has restarted or is rebooted (block 430), which process is discussed in greater detail in FIG. 11A (block 435).

Figure 11A:
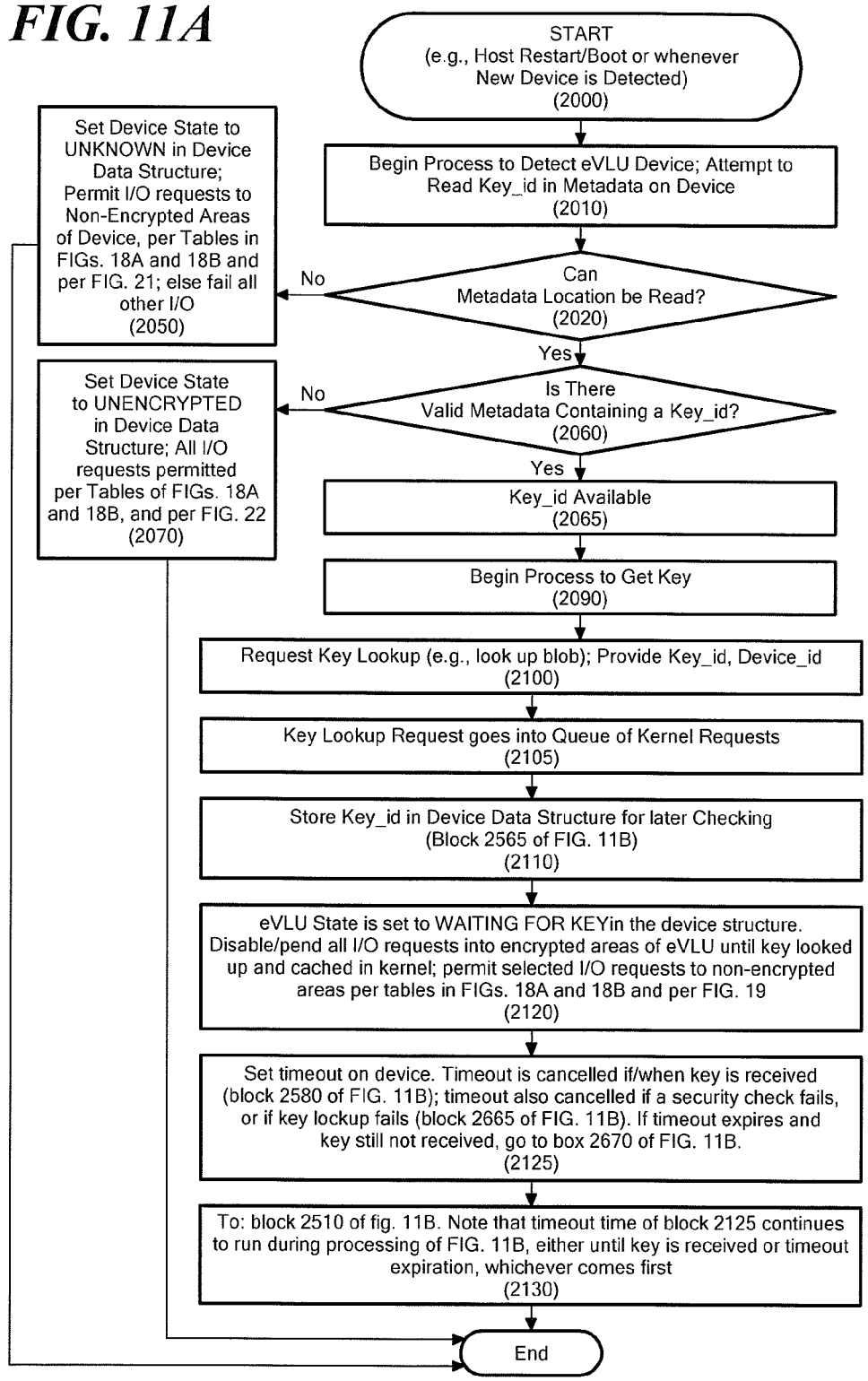
FIG. 11A is a flow chart showing a method for configuring a device to a host after a host restarts or whenever a new device is detected, in accordance with one embodiment of the invention.
Figure 11B:
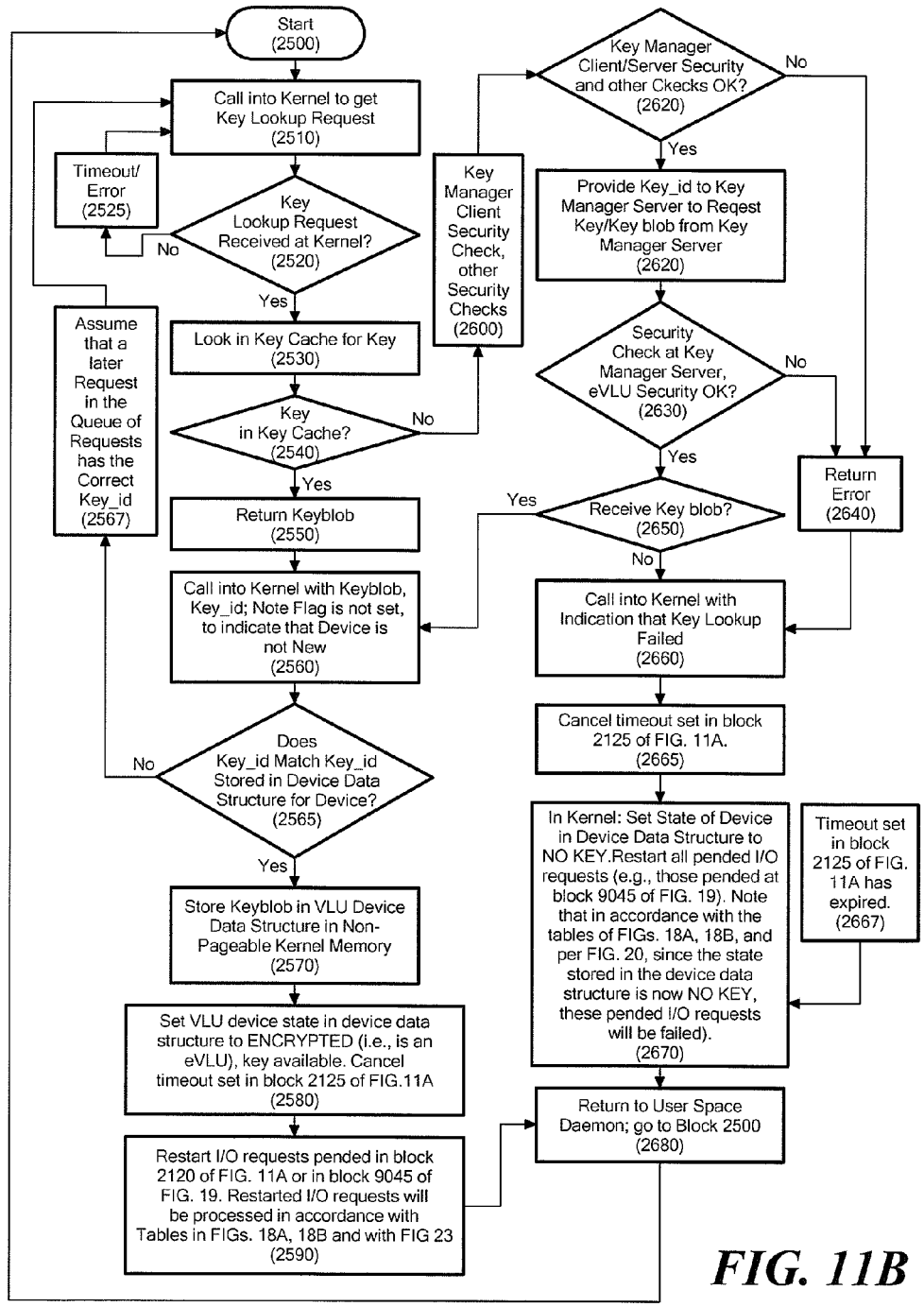
FIG. 11B is a flow chart continuing the method of FIG. 11A and further showing a method for getting a key for a device that is being configured to a host, in accordance with one embodiment of the invention.

A process for looking up a key for an already-configured eVLU 40B also can occur (block 440), as further shown in FIG. 11B (block 445). Processes for writing encrypted data to and reading encrypted data from an eVLU 40B (blocks 450, 460, respectively) also are provided, corresponding to the flowcharts of FIGS. 12-14. The source eVLU 40B can be replicated to a replica eVLU 40B (block 480), via the process of FIG. 15, and the metadata on an eVLU 40B can be re-read to determine if the state of an eVLU 40B has changed (block 490), via the process of FIG. 16. Finally, an optional process is provided for turning encryption off for an eVLU 40B (block 500), via the process of FIG. 17.

Figure 8:
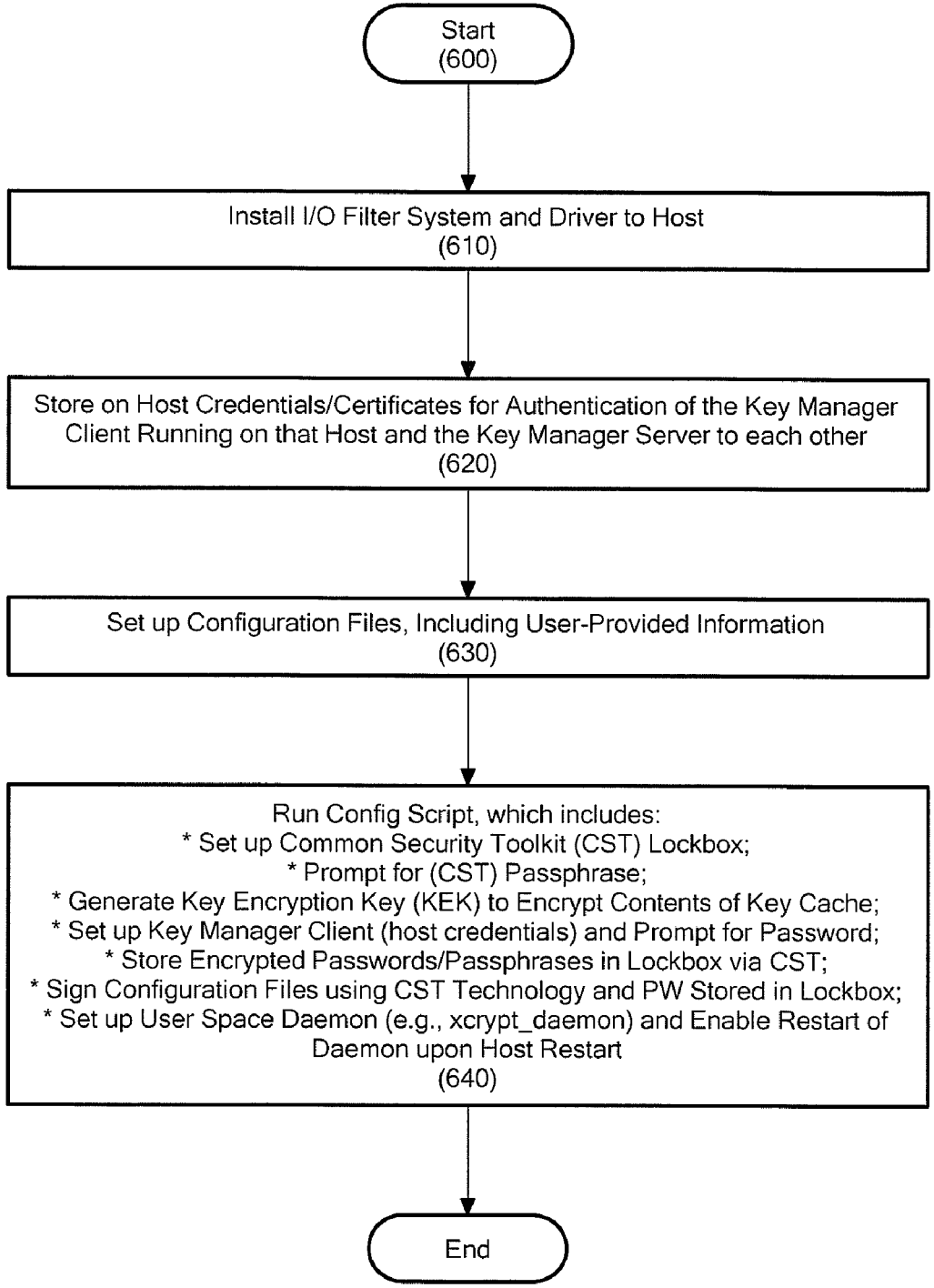
FIG. 8 is a flow chart of a method for configuring a host to use the I/O filter system and I/O filter driver system with encryption, in accordance with one embodiment of the invention.

FIG. 8 is a flow chart of a method for configuring a host to use the I/O filter driver system 28 with encryption, in accordance with one embodiment of the invention. The I/O filter system 28 and I/O filter driver 29 are installed to a host 1 (block 610), including installation of all host components and templates for configuration files. Credentials and/or certificates are stored on the host 1 (block 620) to authenticate the key manager client 86 and key manager server 26 to each other. Configuration files are set up (block 630) and configuration file templates are edited, e.g., by a user, to provide correct information. The file templates edited can include:

- templates relating to a transport service (e.g., the location of the key manager server 26, credentials for communicating with the key manager server 26 over SSL, and other properties of communication between the key manager server 26 and key manager client 86)
- templates relating to cache services, logging services, and key class Note that, in some embodiments of the invention, the host 1 must receive a license for the I/O filter system 28 (e.g., a license for EMC POWERPATH ENCRYPTION WITH RSA) before running the configuration script below.

In block 640, a configuration script (e.g., xcrypt_config, as described herein) is run to enable the host 1 for encryption. The xcrypt_config is run once and only once on a host 1. Running xcrypt_config implements a number of components and actions, including

- setting up the CST lockbox 94
- prompting for a CST passphrase to the CST lockbox 94
- prompting for a PKCS (Public Key Cryptography Standard) password, which is created at the same time as the client credential file and which goes with the certificate that authenticates a host 1 to the key manager server 26
- generating a key encryption key (KEK) to encrypt contents of the key cache 90
- Storing encrypted passwords and passphrases in the lockbox 94 via CST (Optionally, passwords/passphrases can be encrypted and stored with configuration files instead of in lockbox) 84
- Signing the configuration files using CST 84 and the password stored in the CST lockbox 94
- Setting up the userspace daemon 102 (e.g., xcrypt daemon 102) and enabling restart of the xcrypt daemon 102 upon restart of host 1.

FIG. 9 is a flow chart of a method for configuring a new device as an encrypted VLU (eVLU) 40B, in accordance with one embodiment the invention. Note that FIG. 9 presumes that a host 1 has been configured per FIG. 8 and also performs a check that the device to be configured is not already in use. When the I/O filter system 28 is installed to a host and a command is executed that turns encryption on (e.g., powervt xcrypt—on) (block 1010) for a given device 3, 5, 9 (e.g., LU 40), the I/O filter system 28 first gets the state of the device (LU 40) from the Xcrypt Manager 64 in kernel 96, e.g. via a call from libemcp_xcrypt 208 into the kernel (block 1020). For example, a command queries the Xcrypt Manager 64 as to "what is the state of this device/LU?" The Xcrypt Manager 64 stores the state of every device it connects to. In response to the query as to whether the device/LU 40 is encrypted, the Xcrypt Manager 64 will respond yes, no, or that the Xcrypt Manager 64 does not know.

If the Xcrypt Manager 64 indicates that the state of the device/LU 40 (also referred to herein as "device state") is already encrypted (i.e., a valid key_id already exists in the metadata 46), an error is returned (block 1040) and the process ends (block 1050). If the device state is not one of the following states: ENCRYPTED, WAITING FOR KEY, NO KEY, or UNENCRYPTED (also referred to herein as NOT ENCRYPTED), then the device state is UNKNOWN and an error also is returned (block 1045), and the process ends (block 1050). If, at block 1060, a device's state is returned as "UNENCRYPTED", a process begins to turn on encryption for the device (LU 40).

Figure 10:
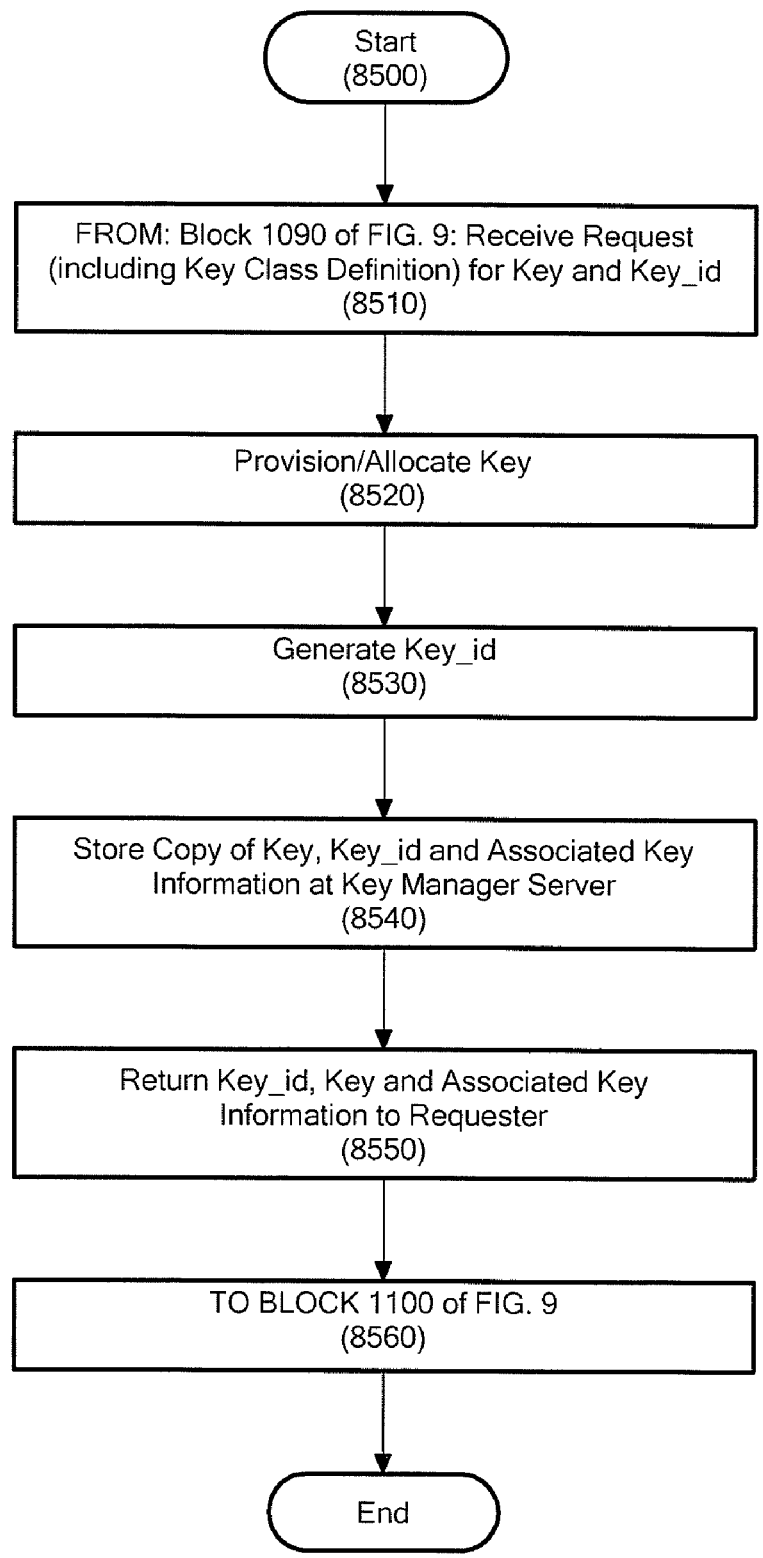
FIG. 10 is a flow chart showing a method of provisioning a key and key_id for a device configured in accordance with the process of FIG. 9, in accordance with one embodiment of the invention.

If the device (e.g., LU 40) state is UNENCRYPTED, the process begins to get a key. A key and key_id are requested from the key manager server 26 (blocks 1080 and 1090), in the context of a call into libemcp_xcrypt to turn encryption on for a particular LU 40. At this point, the code in libemcp_xcrypt calls into the key manager client 86 code through the CKM interface 212 to provision a key. Referring briefly now to FIG. 10, FIG. 10 is a flow chart showing a method of provisioning a key_id and key (keyblob) for a device configured in accordance with the process of FIG. 9, in accordance with one embodiment of the invention. The blocks of FIG. 10 are processed at and in cooperation with the key manager server 26, in one embodiment of the invention. When the request for a key and key_id are received (block 8510), an encryption key is provisioned (block 8520). A key_id also is generated (in one embodiment, the key_id is unique) (block 8530); note that generation of the key_id could take place at another entity other than the key manager server 26, and then be provided in response to the request of block 8510.

A copy of the key, key_id, and associated key information (which is used to accomplish encryption/decryption and which will later become part of a keyblob) is stored at the key manager server 26 (block 8540). The key_id, key, and associated key information also are returned (block 8550) to the requester. Note that the key lookup of FIG. 10 can, in one embodiment, be accomplished locally, via a lookup to the key cache 90 that the key manager client 86 keeps on the host 1 and/or in the host 1 file system, where the key cache 90 can be preloaded with a "new" key; however, in this alternate embodiment, the steps of FIG. 10 would be performed in advance of turning on encryption for a particular device/LU 40. Alternately, as described herein, the key can be obtained directly from the key manager server 26.

Referring again to FIG. 9, at block 1100, the key_id, key, and associated key information (e.g., key length, key algorithm) are received (block 1100) at the I/O filter system 28, into libemcp_xcrypt 208. A keyblob is created (e.g., by the CKM client 212) based on the received key and associated key information (block 1110). The libemcp_xcrypt 208 then calls into the kernel to push the keyblob into the kernel. The keyblob and key_id are sent to the Xcrypt Manager (64) through an IOCMD. In addition, a flag is set to indicate that the VLU is "new" (i.e., this is a device newly having encryption turned on). (block 1120)

After the keyblob and key_id are pushed, a check is made as to whether the VLU is in use (block 1125). If Yes, then an error is returned (block 1155). If no, then the Xcrypt Manager 64 writes the key_id into the metadata 46, via the vlumd manager 68 (block 1130), which allocates metadata space, writes a signature into metadata space, and writes the key_id into metadata space. After the completion of block 1130, the LU will be recognized by a host or other entities as an eVLU (because the key_id has been written into metadata). The Xcrypt Manager 64 stores the keyblob and key_id in a device data structure kept in non-pageable kernel memory (block 1140) which ensures that the keyblob and key_id are protected by the kernel 96 and never get written to a persistent storage device, like a disk. The device data structure on the eVLU also includes device identifier (device_id) information, where the device_id is used to identify the underlying LUN that is encrypted and is used to lookup the data structure where the encryption key is stored in the kernel. Once block 1140 is complete, the state of the eVLU is set to ENCRYPTED in the device data structure, and the device 3, 4, 9 is now an eVLU 40B. At this point, the I/O filter driver 29 is ready to handle I/O to the newly created eVLU 40B.

FIG. 11A is a flow chart showing a method for configuring a device to a host after a host restarts or reboots, and whenever a device is configured to a host after the host starts up, in accordance with one embodiment of the invention. Note that the entire process of FIG. 11A is repeated for each device that is detected upon restart or reboot. Upon restart or reboot of a host 1 that has been configured with the I/O filter system 28 of the invention, a process begins to detect and configure all devices connected to the host, including eVLU devices (block 2010). This detection begins with an attempt to see if there is a metadata region on the device and, if so, can the metadata be read.

Figure 21:
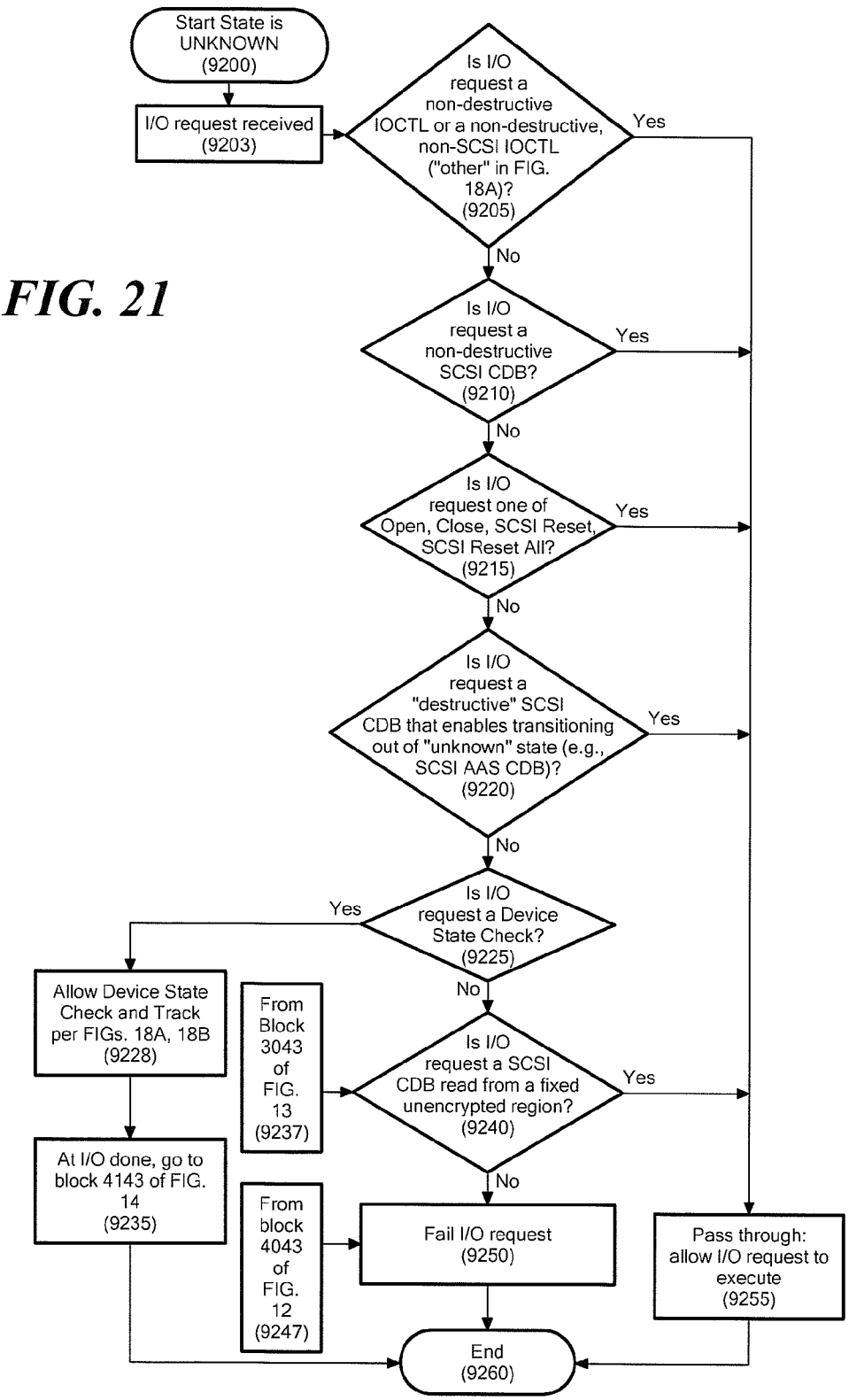
FIG. 21 is a flow chart showing a method for processing I/O requests for a device in an UNKNOWN state, in accordance with FIGS. 18A and 18B.

First, a determination is made as to whether metadata can be read (block 2020). For example, the Xcrypt Manager 64 attempts to read the key_id from the metadata 46, via the vlumd manager 68. If the metadata region cannot be read, it is presumed that the device state is UNKNOWN, and the device state is set to UNKNOWN in the device data structure (block 2050). If the device state is UNKNOWN, certain types of I/O requests are permitted. The types of I/O requests that are permitted when the device state is UNKNOWN are specified in the Tables of FIGS. 18A and 18B and in FIG. 21, which are discussed further herein. All other types of I/O requests that are not deemed allowable per the tables of FIG. 18A, 18B and/or per FIG. 21, are failed (block 2050). Note that, in at least some embodiments of the invention, the I/O filter system 28 keeps track of regions or blocks of a device that are kept in plaintext, even if the device is encrypted. For example, in the embodiments using the EMC POWERPATH ENCRYPTION with RSA, when the Xcrypt Manager 64 receives a Device State Check request, code in the Xcrypt Manager 64 tracks that I/O request to test whether the currently known encrypted regions have changed after the request has been processed in the lower layers of the I/O stack.

It also should be understood that, when a device state is UNKNOWN, then I/O requests that are not directed to a particular region of the device may be allowable, as will be discussed further in connection with FIGS. 18A, 18B, and 21.

Furthermore, in accordance with at least some embodiments of the invention, there are two types of regions that are unencrypted. Some regions are known to be unencrypted for any device (block 0 on Solaris or Windows or AIX, for instance). Other unencrypted regions are device dependent, stored in the metadata or can't be known at this point; the regions are known only after metadata can be read. So, I/O requests directed to a region that is known to always be unencrypted are allowable when the device is in an UNKNOWN state.

Referring again to block 2020 of FIG. 11A, if the metadata location 46 was able to be read (block 2020), a check is made as to whether there is valid metadata in the location and whether that metadata contains a key_id (block 2060). For example, in one embodiment, the Xcrypt Manager 64 of the I/O filter driver 29, checks whether there is valid metadata in the location. Note that a virtualized LUN could have a defined metadata region with metadata on it, but the metadata might not include a key_id. As those of skill in the art are aware, there are other types of metadata.

Figure 22:
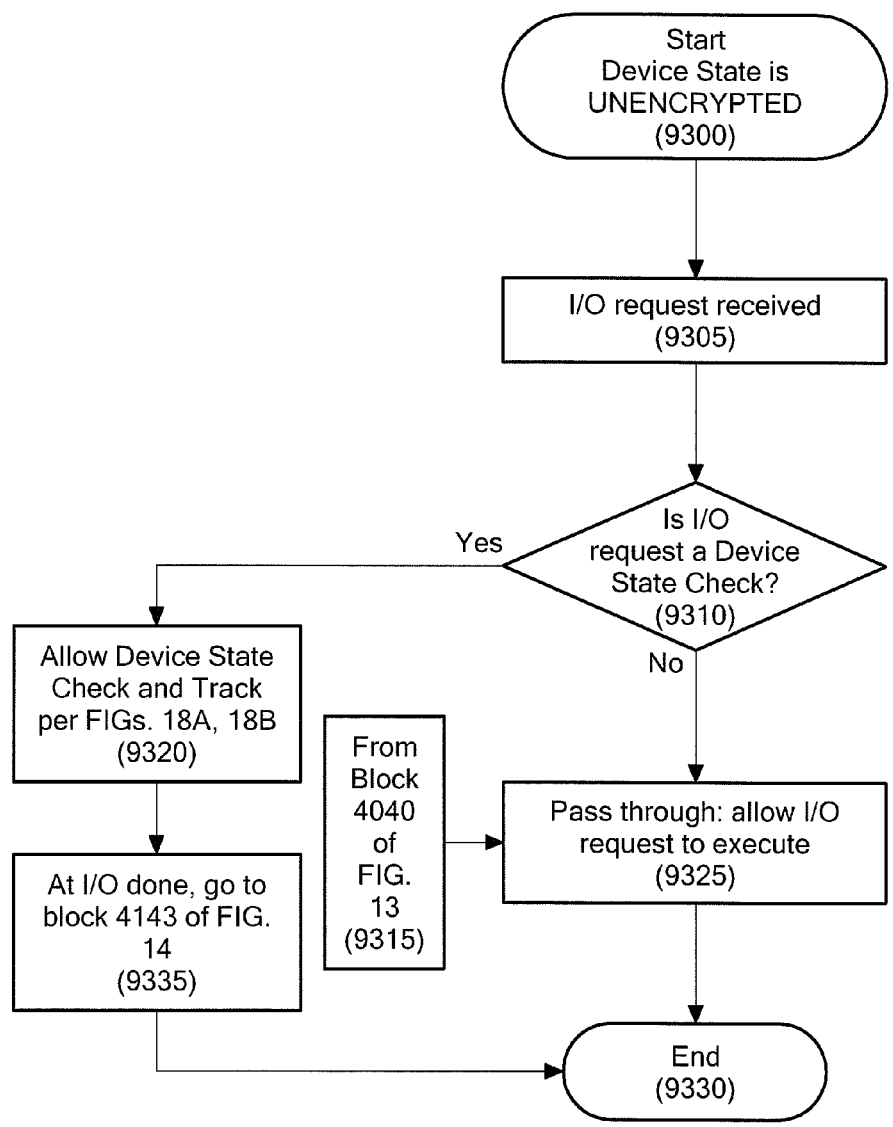
FIG. 22 is a flow chart showing a method for processing I/O requests for a device in an UNENCRYPTED state, in accordance with FIGS. 18A and 18B.

If the answer to either of those questions is no, then it is presumed that the device is unencrypted, the device state is set to UNENCRYPTED in the device data structure, and all I/O requests to all regions of the device are permitted (block 2070), in accordance with the Tables of FIGS. 18A and 18B and with FIG. 22, which are discussed further herein. Of course, the processing of the I/O requests will be consistent with the type of device (for example, if the device is read only, write I/O requests will not be processed. All I/O requests to all regions of the device are permitted by the Xcrypt Manager 64.

If the metadata region 46 contains a key_id (block 2065), then the key_id can be used to get a key for access to data on the eVLU 40B (block 2090). A request for key lookup is made to the key manager server 26, such as via the xcrypt daemon 102 (block 2100). The request includes the device_id and the key_id, which is provided for key lookup. The device_id, in one embodiment, is used to identify the underlying LUN that is encrypted and is used to lookup the data structure kept by the Xcrypt Manager 64 where the encryption key is going to be stored in the kernel 96. The key lookup request goes into a queue of kernel requests (block 2105), as part of the kernel events 214. Note that there is a queue of requests in the I/O filter driver 29, and this request is added to the queue. The userspace daemon 102 (e.g., xcrypt daemon 102) is constantly waiting for requests to be added to the queue in the I/O filter driver 29.

At the kernel 96 in the Xcrypt Manager 64, the Xcrypt Manager 64 stores the key_id in the device data structure for the device denoted by the device_id for later checks (i.e., lookups by the Xcrypt Manager 64) (block 2110). The state of the eVLU is set to WAITING FOR KEY in the device data structure (block 2120). In the WAITING FOR KEY state, for an eVLU, I/O requests to all encrypted areas are disabled and/or pended until the key is looked up and cached in the I/O filter driver 29 in Xcrypt Manager 64. Selected I/O requests are permitted, however, in the WAITING FOR KEY state, as discussed further herein in connection with FIGS. 18A, 18B and 19. For example, if there are device specific regions that are in plaintext, the device specific regions can also have I/O request access, because the metadata can be read to get this information as to the regions that are in plaintext. Note that the permitted I/O requests in the WAITING FOR KEY state include I/O requests that are not directed to specific encrypted or unencrypted regions, and, generally, more I/O requests are permitted in the WAITING FOR KEY state than in the UNKNOWN state.

As FIG. 11A illustrates, the state of each device also is stored in the device data structure; that is, the state as kept by the Xcrypt Manager 64 (which also keeps the device data structure). While the state of the eVLU 40B is set to WAITING FOR KEY (block 2120), a timeout is set on the device (block 2125) to provide a time period (e.g., a predetermined time period) to retrieve the key, which is done in the process of FIG. 11B (block 2130). If the timeout period expires before the key is retrieved (during the process of FIG. 11B. e.g. block 2667), then in the kernel, the state of the device is set in the device data structure to NO KEY (see block 2670 of FIG. 11B. In addition, certain conditions cause the timeout set in block 2125 to be cancelled, such as if the key is received (block 2580 of FIG. 11B), if a security check (block 2620) fails, or if the key lookup fails (blocks 2660 and 2665 of FIG. 11B).

Referring again to FIG. 11A, after the timeout is set in block 2125, processing moves (block 2130) to FIG. 11B, which is a flow chart that continues the method of FIG. 11A, further showing a method for getting a key for a device that is being configured to a host and has encryption turned on, in accordance with one embodiment of the invention. This process is executed by the xcrypt daemon 102.

Referring now to FIG. 11B, at block 2510, a call is made into the kernel 96 (into I/O filter driver 29) to wait for a key lookup request. If the key lookup request is not received at the kernel (block 2520) after a period of waiting, then a timeout occurs (block 2525), and the call is made again into the kernel, and the xcrypt daemon 102 waits in the kernel until either a key lookup request arrives or the timeout occurs. If the key lookup request is received by the xcrypt daemon 102, xcrypt daemon 102 goes through the key manager client 86 to request the key associated with the key_id in the request. The key manager client 86 first attempts to find the key in the key cache 90 (block 2540). If the key is in the key cache, then the keyblob is returned (block 2550) and a call is made into the kernel with the keyblob and key_id (block 2560). Note that, in this block, when the keyblob is pushed, a flag is not set (unlike block 1120 of FIG. 9) because the device in this block is not newly having encryption turned on.

A check is made (block 2565) as to whether the key_id provided in the IOCMD sending the keyblob into the kernel matches the key_id that was previously stored in the device data structure at the time the key lookup request was made (i.e., at block 2110 of FIG. 11A). For example, the IOCMD sending the keyblob into the kernel includes the key_id and device_id that were part of the key lookup request in block 2520. The Xcrypt Manager 64 uses the device_id to locate the device data structure and then matches the key_id. If there is no match (block 2567), it is assumed that a later request in the queue of requests will have the correct key_id, and the process returns to the xcrypt (userspace) daemon 102 running at block 2510 to wait for such a request.

If the key_id matches at block 2565, the keyblob is stored in the device data structure (block 2570) and the eVLU device state is set to ENCRYPTED (block 2580). Because the encryption key is available, pended I/O requests for this device are restarted that were previously disabled in block 2120 of FIG. 11A or in block 9045 of FIG. 19 (discussed further herein), (block 2590), in accordance with FIGS. 18A, 18B, and FIG. 23 (discussed further herein).

Figure 14:
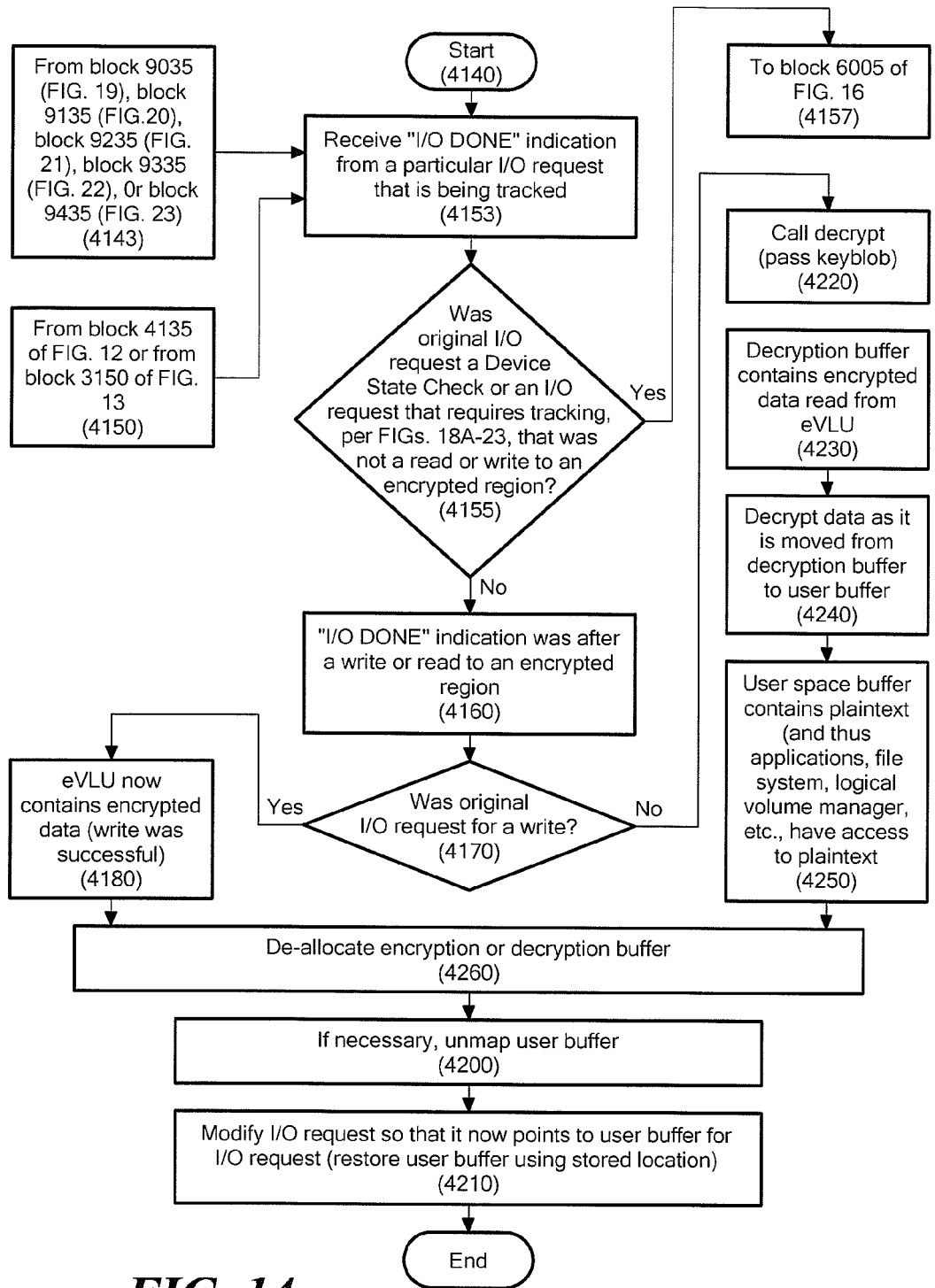
FIG. 14 is a flow chart showing a method of completing input/output and restoring the user buffer after the methods of either
Figure 23:
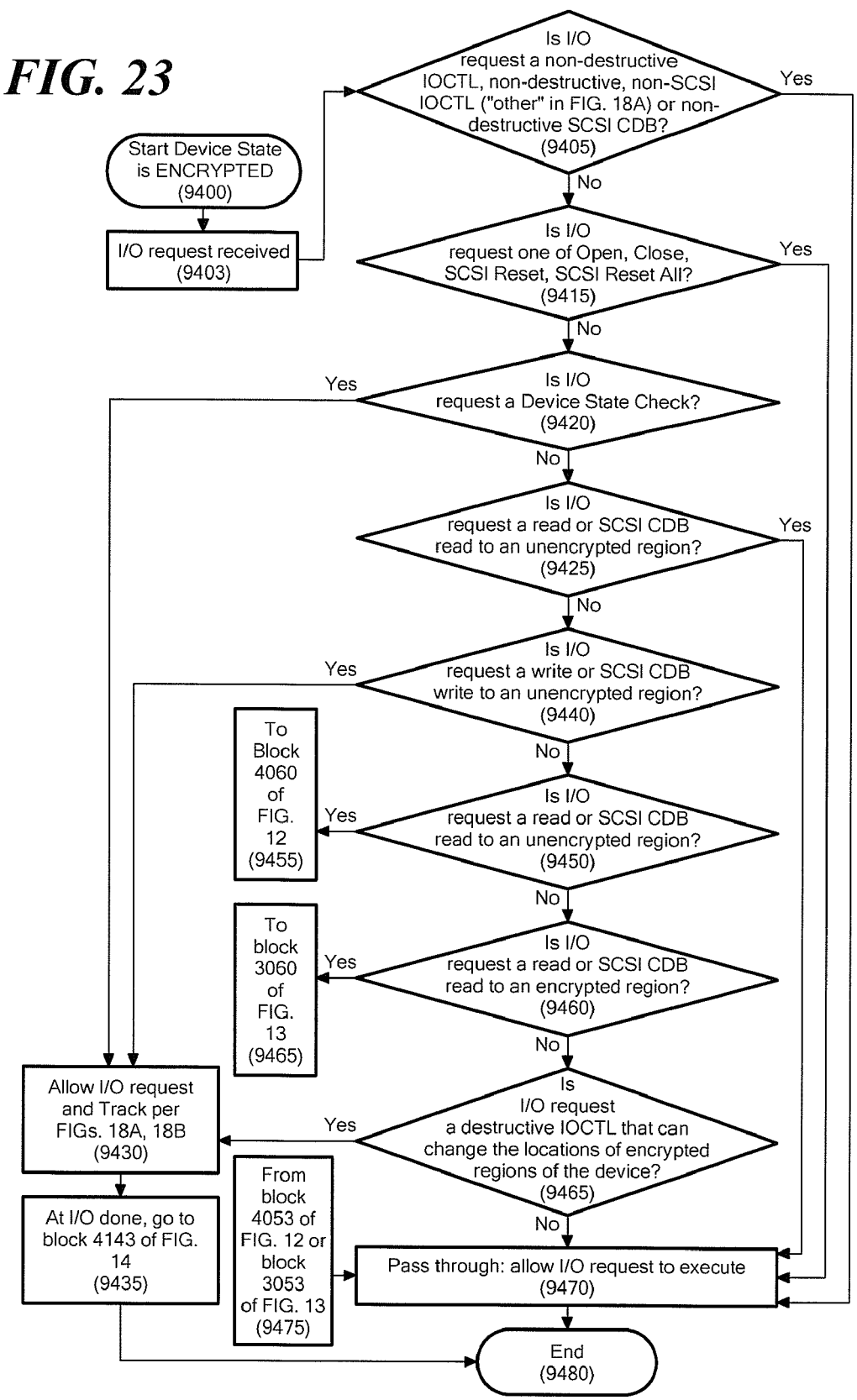
FIG. 23 is a flow chart showing a method for processing I/O requests for a device in the ENCRYPTED state, in accordance with FIGS. 18A and 18B.

Note that, per the processes and tables of FIGS. 18A, 18B, and FIG. 23, if the pended I/O request is of a type that affects the state of the device, or that affects subsequent I/O requests, slice layout, and/or the arrangement of encrypted and unencrypted areas, then, after the pended I/O request is complete (i.e., I/O Done), it is further tracked via the processes of FIG. 14 (discussed further herein). This tracking process, in one embodiment, re-reads the metadata and the state of the device. Note that I/O requests that access encrypted regions of the device also are processed according to FIG. 14, but do not cause the state of the device to be checked. After block 2590 is complete, the process of FIG. 11B returns to the xcrypt (userspace) daemon 102 running at block 2500 to wait for further key lookup requests.

If, at block 2540, the key was not in the key cache 90, then the key must be obtained from the key manager server 26. Note that, although not illustrated explicitly in FIG. 11B, if the key server is not found or cannot be connected to, an error can be returned, as would be expected by those of skill in the art. First, security checks are performed between the key manager client 86 and the key manager server 26, to verify that the host where the client is running is allowed access to the server and that the server is authentic (blocks 2600, 2620). If the security checks fail, an error is returned (block 2640), and the kernel (Xcrypt Manager 64) is informed that the key lookup failed (block 2660). The timeout set in block 2125 of FIG. 11A is cancelled, as well (block 2665). If security checks pass, then the key_id is provided to the key manager server 26 to request a key and keyblob related information from the key manager server 26 (block 2620). An additional security check is performed at the key manager server 26 (block 2630), to verify that the host where the client is running is allowed to access the key associated with the key_id. If the security is not OK, an error is returned (block 2640) indicating that key lookup failed (block 2660), and the timeout set in block 2125 of FIG. 11A is cancelled (block 2665). If the security is OK, however, a check is made as to whether the key manager server 26 has returned a keyblob (block 2650). If the keyblob was returned, aforementioned blocks 2560 through 2680 are performed, as discussed previously.

If the keyblob was not returned at block 2650, a call is made into the kernel 96 (Xcrypt Manager 64) to indicate that the key lookup failed (block 2660). The timeout set in block 2125 of FIG. 11A is cancelled (block 2665). In addition, when key lookup fails, the state of the device is set to NO KEY (block 2670). All pended I/O requests (e.g., those pended at block 9045 of FIG. 19, discussed later herein) are restarted. The state of the device also is set to NO KEY (block 2670) if the timeout set in block 2125 expires (block 2667). Note that, in accordance with the tables of FIGS. 18A 18B and with FIG. 20, since the state stored in the device data structure is now NO KEY, these pended I/O requests will be failed. Except in the case of the timeout set in block 2125 of FIG. 11A expiring, the process proceeds back to the xcrypt (userspace) daemon 102 and block 2500 (block 2680).

With the flowcharts of FIGS. 11A and 11B, it is still important to remember that having the key_id alone is not enough to get a key to decrypt data. It is still necessary to fulfill all other security requirements, including for replicas. These security requirements include (but are not limited to):

Using trusted root and key manager server certificates to prevent spoofing of the key manager server 26

Encryption of communications between the host 1 (including key manager client 86) and key manager server 26 with SSL Signed configuration files (see FIG. 8) to enable detection of tampering with configuration information Use of host credentials to prevent unauthorized host access to the encryption key Requiring a user operating on a host 1 to have root access and/or administrator access Users interacting with the key manager client 86 and/or key manager server 26 must meet whatever security requirements are in place by the vendor of the key manager server, if applicable Of course, those of skill in the art will appreciate that many different security techniques and implementations are usable with one or more embodiments of the invention.

Figure 12:
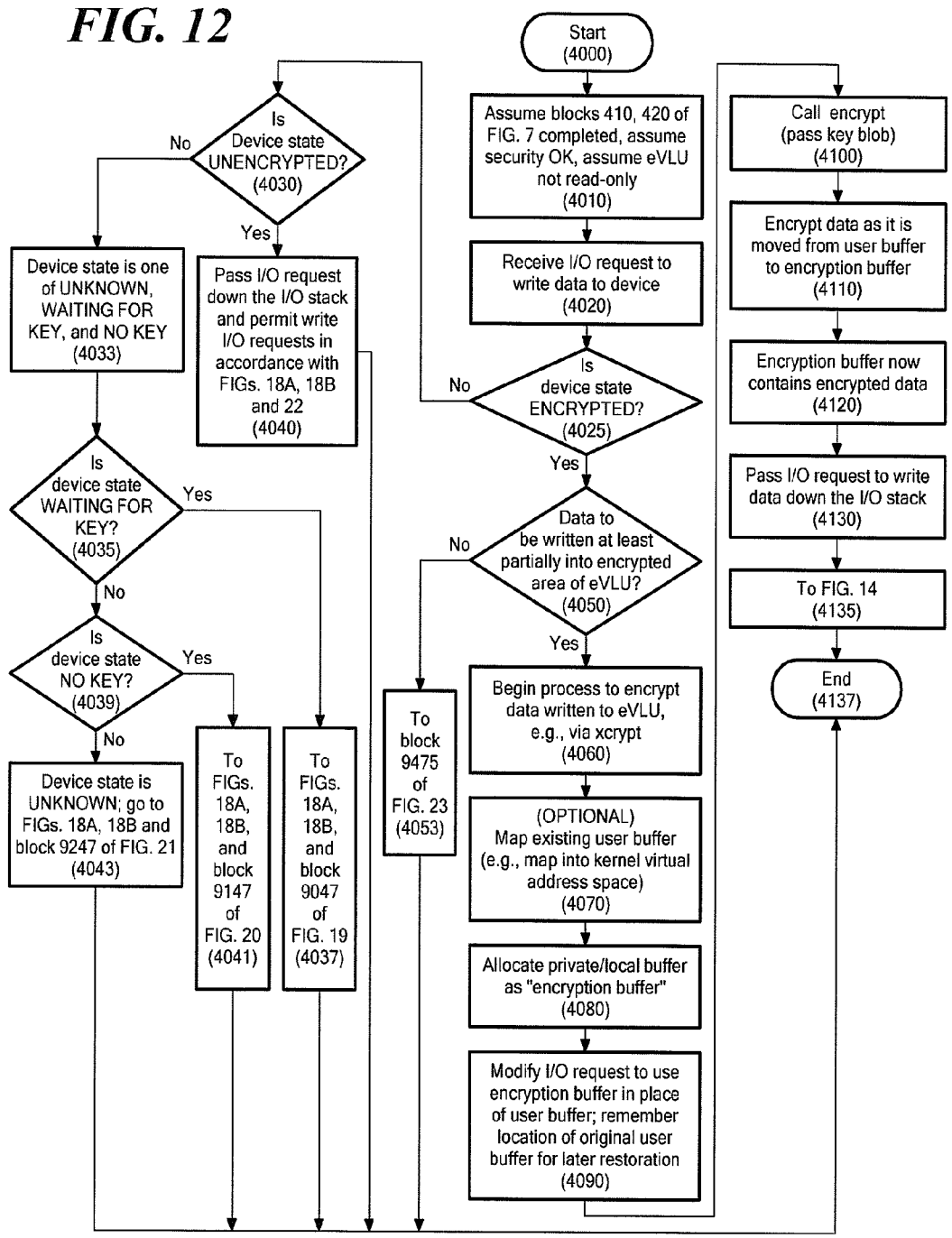
FIG. 12 is a flow chart showing a method of writing data to an eVLU, in accordance with one embodiment of the invention.

FIG. 12 is a flow chart showing a method of writing data to an eVLU 40B, in accordance with one embodiment of the invention. Referring to FIG. 12, it is assumed (block 4010) that the host system 1 associated with the eVLU has been configured per FIG. 8 and that the eVLU 40B has been configured to a host (with encryption turned on and a key provisioned, etc.), per. FIGS. 9 and 10. When an I/O request to write data to a device is received (block 4020), the Xcrypt Manager 64 within the I/O filter driver 29 checks whether the device state stored in the device data structure is set to ENCRYPTED (block 4025). If the device state stored in the device data structure is not set to ENCRYPTED, a check is made as to whether that state is set to UNENCRYPTED (block 4030). If the state of the device is set to UNENCRYPTED, then the I/O request is passed down the I/O stack, and write I/O requests are permitted in accordance with FIGS. 18A, 18B, and 22 (block 4040).

If, at block 4030, the answer is NO, then the device state is one of UNKNOWN, WAITING FOR KEY, and NO KEY (block 4033). A check is made whether the device state is WAITING FOR KEY (block 4035). If the answer is Yes (block 4037), then the processing jumps to block 9047 of FIG. 19, which is a flowchart that processes the I/O request for the WAITING FOR KEY device state, in accordance with the tables of FIGS. 18A and 18B, discussed further herein.

If, at block 4035, the answer is No, then the device state is checked to determine if it is NO KEY (block 4039). If the answer is Yes (block 4041), then the processing jumps to block 9147 of FIG. 20, which is a flowchart that processes the I/O request for the NO KEY state in accordance with the tables of FIGS. 18A and 18B, discussed further herein. If, at block 4039, the answer is No (block 4043), then the device state is UNKNOWN, and the processing jumps to block 9247 of FIG. 21, which is a flowchart that processes the I/O request for the UNKNOWN state in accordance with the tables of FIGS. 18A and 18B, discussed further herein.

Referring again to block 4025 of FIG. 12, if the device state is ENCRYPTED, an optional check is made as to whether the request to write data involves writing data at least partially to an encrypted area of the eVLU 40B (block 4050). Note that, I/O requests that "straddle" encrypted and unencrypted regions of a device are treated the same as writes that are directed only to an encrypted region of a device, with the caveat that the data on the unencrypted portion of the I/O request is not encrypted as part of I/O request processing. Recall that, in some embodiments, the eVLU 40B can be configured so as to have, in addition to the metadata region 46, an unencrypted area 44A and an encrypted area 44B. If the eVLU 40B is configured such that all areas of it (excepting the metadata 46) are encrypted, then the optional check at block 4050 may not be necessary.

Referring again to FIG. 12, if the device state is ENCRYPTED at block 4025 but the I/O request is to write data to an unencrypted area or block of the eVLU 40B (that is, the answer at block 4050 is NO), then, per block 4053 of FIG. 12, processing proceeds to block 9475 of FIG. 23, where the I/O request is allowed (block 9470 of FIG. 23). If the device state is ENCRYPTED and the I/O request is to write data to an encrypted area of the eVLU 40B (whether by default—because the entire eVLU 40B is encrypted, or because the Xcrypt Manager 64 in the I/O filter driver 29 is aware that the blocks to be written to are encrypted blocks), then the process to encrypt data written to the eVLU 40B is begun (block 4060). The Xcrypt Manager 64 is used to accomplish this, as well as the other steps of FIG. 12, except for the encrypt call itself (block 4100), which is made from the Xcrypt Manager 64 to the crypto kernel 98 module/code.

Optionally, the existing user buffer is mapped into the kernel virtual address space in order to make it accessible from the kernel (block 4070). The Xcrypt Manager 64 allocates a private/local buffer as an "encryption buffer," to hold the encrypted data before it is written to the eVLU 40B (block 4080). To ensure that the data to be written is going to be encrypted before being written, the I/O request is modified so as to (temporarily) use the encryption buffer in place of the user buffer (block 4090). The location of the original user buffer is retained for later restoration.

The Xcrypt Manager 64 calls encrypt by passing the device specific keyblob to the CKM kernel 216 of the crypto kernel 98, and the CKM kernel 216 passes the keyblob to the encrypt/decrypt lib 218 of the crypto kernel 98. The crypto kernel 98 uses the keyblob to encrypt data as it is moved from the user buffer to the encryption buffer (block 4110). The encryption buffer now contains encrypted data (block 4120). The I/O request to write data is passed down the I/O stack (block 4130). I/O then passes through its normal places in the I/O stack (e.g., as partially shown in FIGS. 3 and 4), eventually passing through the HBA 15 and to the storage device. Processing at this point proceeds to the process of FIG. 14 (block 4135).

Figure 13:
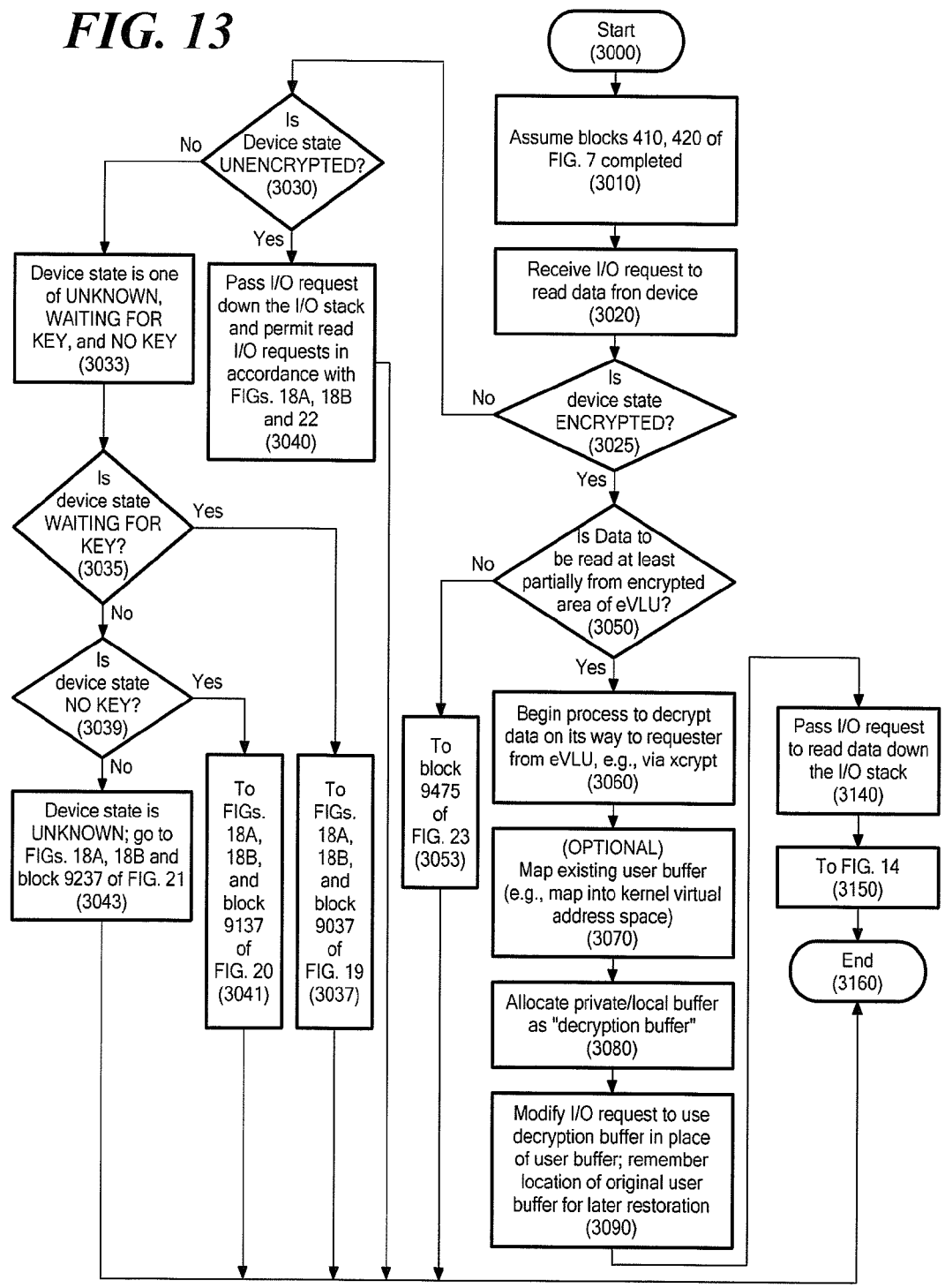
FIG. 13 is a flow chart showing a method of reading data from an eVLU, in accordance with one embodiment of the invention.

FIG. 13 is a flow chart showing a method of reading a device, in accordance with one embodiment of the invention. In many respects, the method of reading data is quite similar to the method of writing data of FIG. 12, except that decryption (for the read) is done after the I/O request returns from the disk. Referring to FIG. 13, it is assumed (block 3010) that the host system 1 associated with the device has been configured per FIG. 8 and that the eVLU 40B has been configured to a host (with encryption turned on and a key provisioned, etc.), per. FIGS. 9 and 10. It is advantageous, although not required, for the eVLU 40B to actually contain data written to it since encryption was turned on. If an attempt is made to read an encrypted eVLU 40B where the eVLU 40B contains no data written since encryption was turned on, then the read will return "garbage" or "nonsense" data, because it will use the key associated with this device to decrypt whatever the contents at the read location is.

When an I/O request to read data from a device is received (block 3020), the Xcrypt Manager 64 within the I/O filter driver 29 checks whether the device state stored in the device data structure is ENCRYPTED (block 3025). If the device state isn't ENCRYPTED, then processing proceeds to block 3030.

If the device state stored in the device data structure is not set to ENCRYPTED, a check is made as to whether that state is set to UNENCRYPTED (block 3030). If the state of the device is set to UNENCRYPTED (block 3040), then the I/O request is passed down the I/O stack, and read I/O requests are permitted in accordance with FIGS. 18A, 18B, and 22 (block 3040).

If, at block 3030, the answer is NO, then the device state is one of UNKNOWN, WAITING FOR KEY, and NO KEY (block 3033). A check is made whether the device state is WAITING FOR KEY (block 3035). If the answer is Yes (block 3037), then the processing jumps to block 9037 of FIG. 19, which is a flowchart that processes the I/O request for the WAITING FOR KEY device state, in accordance with the tables of FIGS. 18A and 18B, discussed further herein.

If, at block 3035, the answer is No, then the device state is checked to determine if it is NO KEY (block 3039). If the answer is Yes (block 3041), then the processing jumps to block 9137 of FIG. 20, which is a flowchart that processes the I/O request for the NO KEY state in accordance with the tables of FIGS. 18A and 18B, discussed further herein. If, at block 3039, the answer is No (block 3043), then the device state is UNKNOWN, and the processing jumps to block 9237 of FIG. 21, which is a flowchart that processes the I/O request for the UNKNOWN state in accordance with the tables of FIGS. 18A and 18B, discussed further herein.

As was true for the method for writing data to a device of FIG. 12, for I/O requests that involve reading data from a device, I/O requests that "straddle" encrypted and unencrypted regions of a device are treated the same as reads to an encrypted region of a device, with the caveat that the data on the unencrypted portion of the I/O request is not decrypted as part of I/O request processing. Referring again to block 3025 of FIG. 13, if the answer was YES (i.e., the device is ENCRYPTED, and is an eVLU 40B), a check is made as to whether the request to read data involves reading data at least partially from an encrypted area of the eVLU 40B (block 3050). Recall that, in some embodiments, the eVLU 40B can be configured so as to have, in addition to the metadata region 46, an unencrypted area 44A and an encrypted area 44B. If the eVLU 40B is configured such that all areas of it (excepting the metadata 46) are encrypted, then the optional check at block 3050 may not be necessary.

Referring again to FIG. 13, if the eVLU 40B is ENCRYPTED but the I/O request is to read data from an unencrypted area or block of the eVLU 40B, per block 3053 of FIG. 13, processing proceeds to block 9475 of FIG. 23, where the I/O request is allowed (block 9470 of FIG. 23). If the eVLU 40B is ENCRYPTED and the I/O request is to read data from an encrypted area of the eVLU 40B (whether by default—because the entire eVLU 40B is encrypted, or because the Xcrypt Manager 64, in the I/O filter driver 29, is aware that the blocks to be read from are encrypted blocks), then the process to decrypt data written to the eVLU 40 is begun (block 3060). The Xcrypt Manager 64 is used to accomplish this, as well as the other steps of FIG. 13, except for the decrypt call itself (block 4220 of FIG. 14), which is made from the Xcrypt Manager 64 to the crypto kernel 98 module/code.

Optionally, the existing user buffer is mapped into the kernel virtual address space in order to make it accessible from the kernel (block 3070). The Xcrypt Manager 64 allocates a private/local buffer as a "decryption buffer," to hold the encrypted data (ciphertext) when it is read from the eVLU 40B (block 3080). To ensure that the data to be read is going to be decrypted before being returned to the caller, the I/O request is modified so as to (temporarily) use the decryption buffer in place of the user buffer (block 3090). The location of the original user buffer is retained for later restoration. The I/O request to read data is then passed down the I/O stack (block 3140). I/O then passes through its normal places in the I/O stack (e.g., as partially shown in FIGS. 3 and 4). Processing at this point proceeds to the process of FIG. 14 (block 3150).

FIG. 14 is a flow chart showing a method of completing input/output requests and restoring the user buffer after the methods of either FIG. 12 or FIG. 13 are completed (e.g., as block 4150 of FIG. 14 show, after block 4135 of FIG. 12 is completed or after block 3150 of FIG. 13 is completed). FIG. 14 also provides a method of performing I/O done processing for any I/O that is being tracked (including Device State Check requests). FIG. 14 also provides a method of completing an I/O request after certain blocks of FIGS. 19-23 are executed, as shown in block 4143 of FIG. 14 (i.e., after the completion of block 9035 of FIG. 19, block 9135 of FIG. 20, block 9235 of FIG. 21, block 9335 of FIG. 22, or block 9435 of FIG. 23). Note that FIGS. 19-23 are discussed further herein.

Referring again to FIG. 14, during processing an I/O request to a logical unit (which can be an eVLU 40B, but need not be), in accordance with the processes of FIGS. 12, 13, and 19-23, for asynchronous I/O, as is known in the art, whenever data is sent, an acknowledgement such as an I/O Done interrupt is received (block 4153). Per block 4155, a check is made as whether the original I/O request is a Device State Check request, or whether the I/O request is an I/O request that requires tracking (per FIGS. 18A-23), where the original request was not a read or write to an encrypted region. If the answer at block 4155 is Yes, then, per block 4157 of FIG. 14, processing jumps to block 6005 of FIG. 16, which process if further described herein.

Referring again to block 4155, if the answer is No, then the I/O Done indication was received after a write or read to an encrypted region (block 4160). A check is made whether the original I/O request was for a write (block 4170). If the answer at block 4170 is Yes, then the eVLU 40B now contains encrypted data, and the write data request was successful (block 4180). It is possible that the I/O request will return I/O done whether or not the I/O request succeeded, and, as those of skill in the art are aware, it may be necessary to check for errors to determine if the I/O request was completed, as errors may mean that the action being requested (a write or a read) will not occur.

Referring again to FIG. 14, for the case where the original I/O was a write, after block 4180, the encryption buffer is de-allocated (block 4260). If necessary, the user buffer is unmapped from kernel (if such mapping occurred in block 4070 of FIG. 12) (4200). The I/O request is modified so that it again points to the user buffer (block 4210).

Referring again to block 4170 of FIG. 14, if the answer at block 4170 is No, then the original I/O request was not a request for a write, and is instead an I/O read request. If the original request was to read data (block 4170), and the I/O Done interrupt is received, then the Xcrypt Manager 64 calls decrypt by passing the device specific keyblob to the crypto kernel 98 (block 4220). The crypto kernel 98 decrypts data as it is moved from the decryption buffer to the user buffer (block 4240). The user buffer now contains plaintext (block 4250), and the read request was successful. The encryption buffer is de-allocated (block 4260). If necessary, the user buffer is unmapped (4200) (i.e., if such mapping was done at block 3070 of FIG. 13). The I/O request is modified so that it again points to the user buffer (block 4210).

Figure 15:
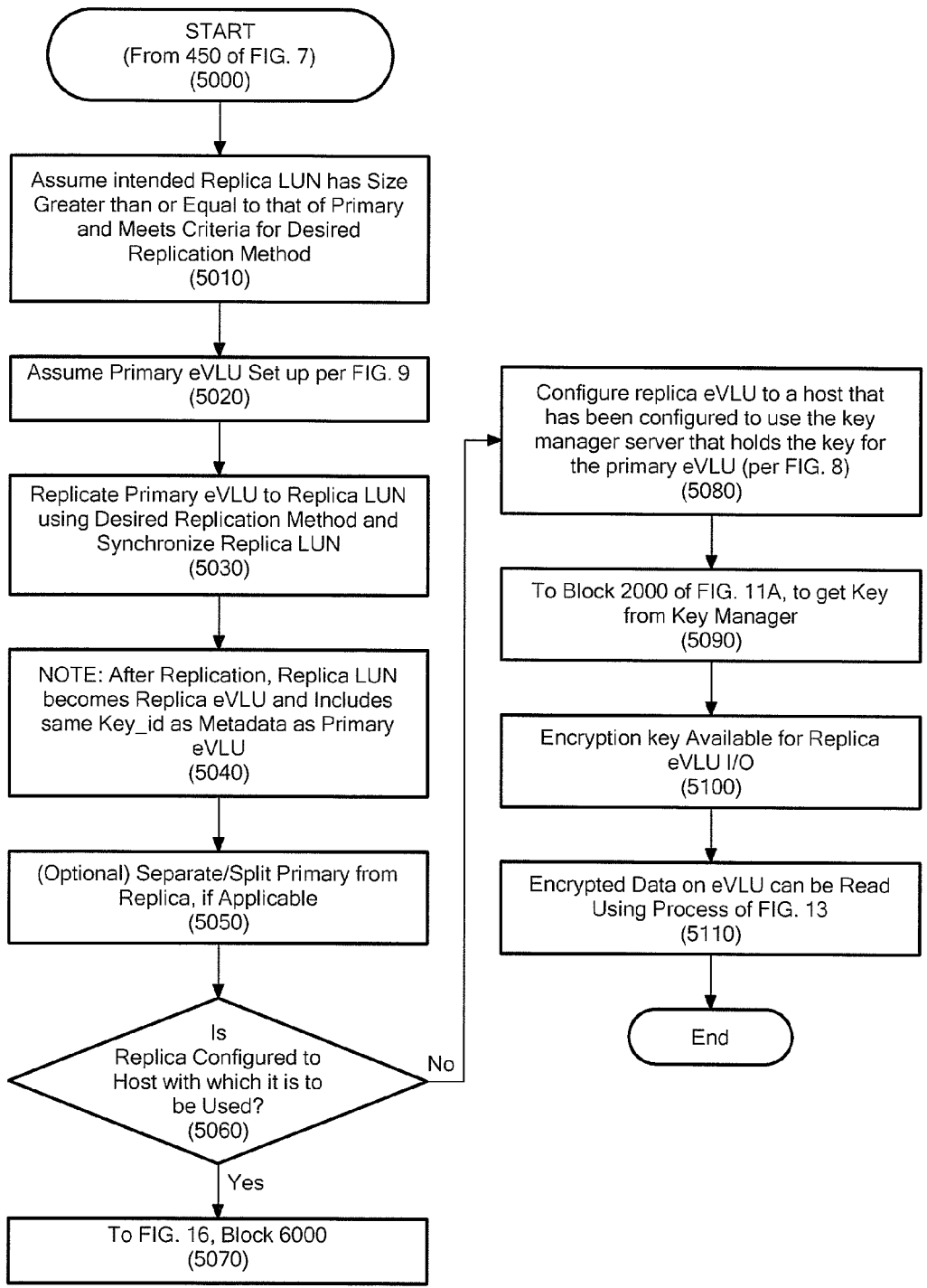
FIG. 15 is a flow chart showing a method of replicating an eVLU configured in accordance with the method of FIG. 9 and/or written to in accordance with the method of FIG. 12, in accordance with one embodiment of the invention.

FIG. 15 is a flow chart showing a method of replicating an eVLU 40B configured in accordance with the method of FIG. 9, where data may or may not have been written to the eVLU 40B in accordance with the method of FIG. 12, in accordance with one embodiment of the invention. At the start of the process of FIG. 15, it is assumed that the LUN to which a primary eVLU 40B is to be replicated has a size greater than or equal to the size of the primary (block 5010), so that there is sufficient room for a complete replica. Note that, in some embodiments (e.g., data migration situations where the size of the LU is being grown), the size of the replica eVLU can be larger than the size of the primary eVLU. In these embodiments, the location of the metadata in the replica may be different than its location in the primary, and a powervt resize command moves the metadata and adjusts the size as allowed by the vlumd manager 68, so that the additional space can be seen and used by those functions above the I/O filter driver 29 in the I/O stack. It also is assumed that the intended replica LUN meets the criteria for the desired replication method.

The primary/source eVLU 40B is replicated to a replica LUN. The replication can be by methods that include (but are not limited to) methods such as those used in the aforementioned SRDF, Timefinder, and Mirrorview products from EMC. As part of replication, the data on the replica LUN is synchronized with the data on the source eVLU 40B. Known replication technology, such as Timefinder (replication within an array) or SRDF (replication between arrays over a network that connects them directly) for the SYMMETRIX line of disk arrays (available from EMC Corp.), can, for example, be used for synchronization. In another example, an appliance or switch in the network can replicate between two devices on the network, on the same or different arrays. In still another example, where the source and replica logical volumes are located within a single array, data can be transmitted from the source logical volume to the target logical volume without involving a network or a host. During the synchronization, an application on host 1 may have continued access to the information on the source eVLU 40B.

The synchronization part of replication involves moving or copying the data from the source (or primary) eVLU to the replica LUN. As is understood in the art, various techniques can be used to perform synchronizations. For example, a mirroring facility, such as the SYMMETRIX Remote Data Facility (SRDF) available from EMC Corporation, Hopkinton, Mass., may be used to create mirrors between source and target volumes on different storage systems and to then synchronize them so that the storage systems themselves perform the copy.

In another situation, the replica eVLU might be removed from the host while synchronizing and is then configured back to the host when synchronization is complete. Note that removing a device from the host causes the host to notice that the device has been removed, and the host discards its cached information about the device.

Referring again to FIG. 15, after replication and synchronization, the replica LUN becomes a replica eVLU and, because the metadata was also replicated, the replica eVLU has in its metadata the same key_id as the metadata on the source/primary eVLU (block 5040). Optionally, the source/primary eVLU can be separated or split from the replica eVLU, if that step is required by the replication method (block 5050). If the replica eVLU was already configured to the host 1 with which it is to be used (block 5060), then processing proceeds to FIG. 16, block 6000 (block 5070). If, however, the replica eVLU is not yet configured to the host 1 with which it is to be used, then the process of FIG. 11A is run to configure the replica eVLU to a host that has been configured to use the key manager server that holds the key for the primary eVLU (per FIG. 8) (block 5080). Depending on the protected perimeter desired, the replica eVLU can be configured to the same host as the source eVLU, or can be configured to a different host. However, the replica eVLU and the source eVLU need access to the same key manager server or replicas of that key manager server.

Note that configuration will lead to looking up a key for the replica eVLU (block 5090), where the key itself will be the same as that for the source eVLU. Once the replica eVLU is configured to a host and the key is available (block 5100), encrypted data on the replica eVLU can be read, such as via the process of FIG. 13.

One point that should be appreciated regarding the process of FIG. 15 is that no extra steps are required over what is required to replicate a plaintext volume, so long as each host that "sees" an eVLU is properly configured with the I/O filter system 28 and that all hosts that share replicas (e.g., like the arrangement shown in the protected perimeter of FIG. 2B) use/have access to the same key manager server. Generally, for replica eVLUs, the key to access encrypted data on the eVLU is looked up either by configuring the replica (block 5080) or by "opening" the replica eVLU (for those operating systems that have device open as a feature). The key_id stored in the metadata in the replica eVLU is used to obtain the key, the same as occurs with a non-replica eVLU. For some situations (e.g., those running on WINDOWS-based operating systems and other situations where a replica LUN is not opened before access), a command such as powervt update might need to be run to trigger the kernel to recognize the change in state of a device (e.g., a LUN going from unencrypted to being an eVLU). This is further addressed in FIG. 16. In another situation, the replica device is removed from the host while synchronizing and is then configured back to the host when synchronization is complete; in this case, the processes shown in FIGS. 11A and 11B will be executed, and the powervt update command is not needed.

Figure 16:
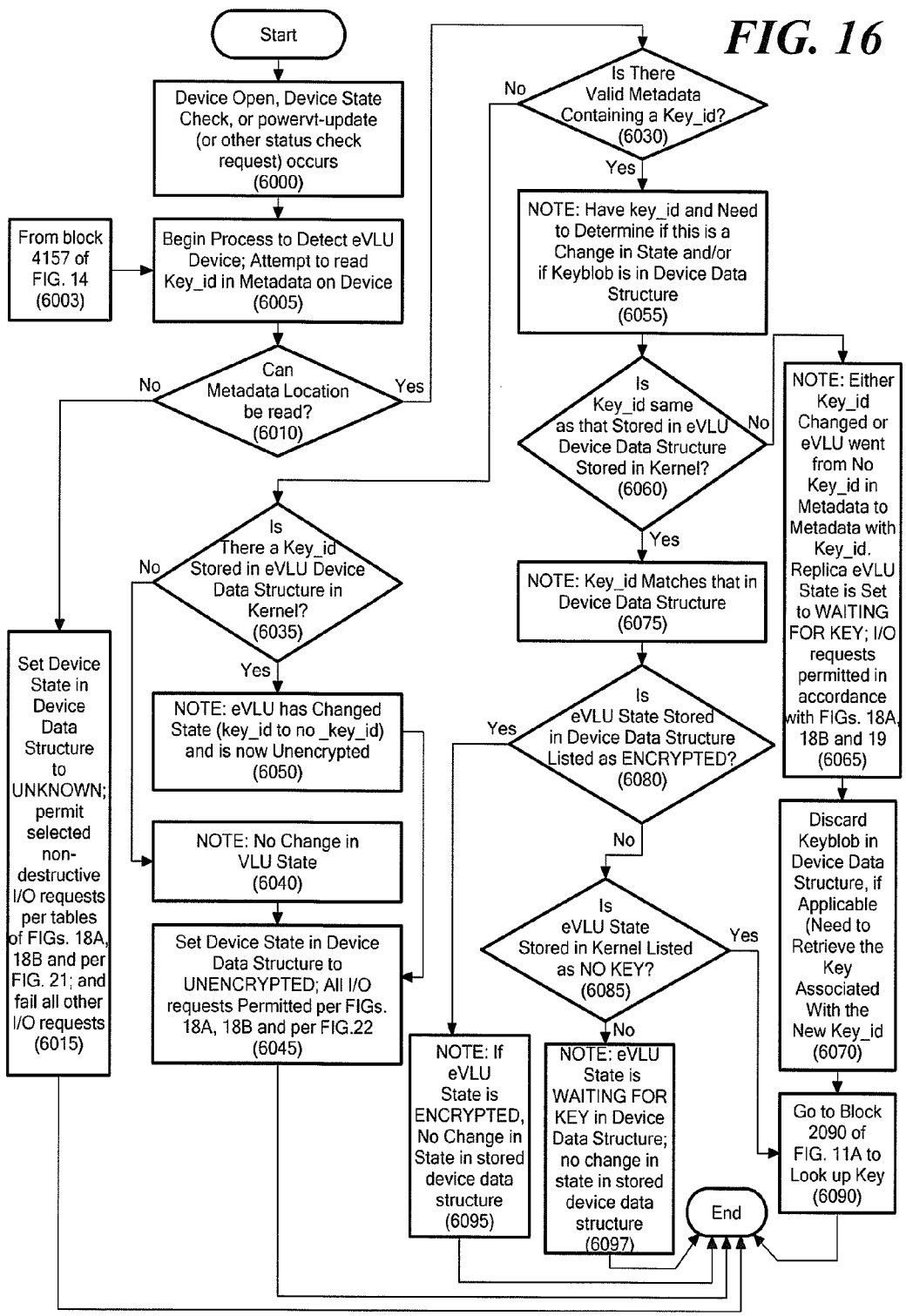
FIG. 16 is a flow chart showing a method of re-reading the metadata for a device, including a device whose state may have changed since host restart, in accordance with one embodiment of the invention.

FIG. 16 is a flow chart showing a method of re-reading the metadata for a device, including a device whose state may have changed since host restart, in accordance with one embodiment of the invention. Generally, metadata 46 on an eVLU 40B needs to be re-read when certain things occur, such as after data has been replicated to a device, after opening a device (on nearly all non-WINDOWS systems, there is a device open before writing data to or reading data from a device), and in situations where powervt update is run, such as on a WINDOWS system and/or to cover situations where metadata is changed on a device. Another situation that can trigger a change in metadata is a replica being synchronized with a different source device. In the flow chart of FIG. 16, it is assumed that a given device has already been configured into the I/O filter system 28 such that the kernel 96 (Xcrypt Manager 64 in driver 29) has stored the device state in the device data structure at the time of host restart or the last time the procedure in FIG. 16 has been run.

In block 6000 of FIG. 16 a device open or powervt update has occurred, or some other event has occurred that triggers a re-read of metadata on a device. In one embodiment of the invention, re-reading of metadata occurs when a Device State Check is performed on a device. For example, in the embodiments of the invention that are implemented using EMC POWERPATH ENCRYPTION WITH RSA, the Device State Check serves as a hint to PowerPath managers and extensions in the I/O stack that the state of the device may have changed. The Xcrypt Manager 64 allows the Device State Check for all key states and tracks its completion. A Device State Check is a generalized mechanism that causes components in the I/O stack (e.g., the EMC POWERPATH ENCRYPTION with RSA I/O stack) to re-evaluate device state, which for the Xcrypt manage 64 includes re-reading metadata, etc., in accordance with the process of FIG. 16. On the completion side, Xcrypt attempts to read or re-read the metadata region on a device (e.g., an eVLU), looking for a stored key_Id.

Referring again to FIG. 16, a process is begun to detect whether a particular device, being opened or updated is an eVLU device 40B, including detection of the state of the device, starting with an attempt by the vlumd manager 68 to read metadata 46 on the device, to determine if there is a key_id in the metadata 46 (block 6005). This check also can come in from block 4157 of FIG. 14. If the metadata location cannot be read (block 6010), then the state of the device is set to UNKNOWN (that is—it cannot be determined if the device is an eVLU), and certain types of I/O requests are permitted in accordance with FIGS. 18A, 18B, and FIG. 21, but all other I/O requests are failed (block 6015). The situation of a metadata location being unable to be read can occur, for example, if a storage device is offline or "not ready" (which is the state of a TIMEFINDER business continuance volume (BCV), for example, when it is being synchronized with the primary device.)

If, at block 6010, the metadata location 46 can be read, a check is made as to whether there is valid metadata containing a key_id (block 6030). If the answer at block 6030 is No (that is, there is not valid metadata containing a key_id), a check is made whether a key_id is stored in the device data structure in the Xcrypt Manager 64 (block 6035). If no key_id is stored in the device data structure (i.e., the answer at block 6035 is no), then there has been no change in the state of the device (block 6040), and the device state stored in the device data structure remains UNENCRYPTED, and all I/O requests are permitted per FIGS. 18A, 18B and per FIG. 22 (block 6045). Note that all blocks in FIG. 16 after block 6005 take place, in one embodiment, in the kernel.

If there is not valid metadata containing a key_id, but there was a key_id stored in the kernel (i.e., a Yes answer at block 6035), then that indicates that the device has changed state (block 6050); namely, going from having a key_id to having no key_id, meaning that the device has changed state from ENCRYPTED to UNENCRYPTED. For the UNENCRYPTED device state, all I/O requests are permitted (block

6045), in accordance with FIGS. 18A, 18B and FIG. 22, each of which is disclosed further herein.

Referring again to block 6030, if the answer was Yes (i.e., if a key_id was returned (block 6055)), then determinations need to be made as to whether this represents a change in state for the device, whether the key_id is the same as that previously stored in the device data structure, and/or also whether the keyblob associated with the key_id is stored in the device data structure. If the key_id returned in block 6030 is the same as that stored in the device data structure in the kernel (blocks 6060 and 6075), then a check is made (block 6080) as to whether the device state stored in the device data structure is ENCRYPTED. If the answer at block 6080 is Yes (i.e., the state is ENCRYPTED), then the associated keyblob is also stored in the device data structure (block 6080). If the device state stored in the device data structure is listed as ENCRYPTED, that means that there has been no change in state (block 6095).

If, at block 6080, the device state stored in the device data structure is not listed as ENCRYPTED, then a check is made as to whether the device state stored in the device data structure is "NO KEY" (block 6085), which means that there is no keyblob in the device data structure, but the device is encrypted. If the answer at block 6085 is Yes, the key needs to be retrieved, and the process of FIG. 11A is used to look up the key that goes with the key_id (block 6090). If the answer at block 6085 is No, than the device state is not "NO KEY", so, by process of elimination, it must be "WAITING FOR KEY" (block 6097). In this case, the key_id is unchanged (no change in state in stored device data structure) and the request to lookup the key has not yet been responded to by the xcrypt daemon (102).

Referring again to block 6060, if the key_id on the device being read is not the same as the key_id that was stored in the device data structure for that device (i.e., the answer at block 6060 is No), then one of two conditions has occurred. One alternative is that the key_id changed (e.g., from key_id_1 to key_id_2), which can indicate that a device that was synchronized with, e.g., "source device A" has, since system reboot (or since the last time the device was opened), been made the replica of and synchronized with "source device B". Under this alternative, the device state is set to WAITING FOR KEY (block 6065); that is, waiting for the key that goes with the key_id that is currently in the device metadata. The other alternative is that the device went from no key_id in metadata at the time of system reboot/last device open to having a key_id in metadata, which can occur when an unencrypted device becomes synchronized with an encrypted device. In this situation, as well, the device state is set to WAITING FOR KEY; that is, waiting for the key that goes with key_id that is currently in the device metadata. In the WAITING FOR KEY state, as is explained elsewhere herein, some I/O requests are permitted in accordance with the tables of FIGS. 18A, 18B and with FIG. 19. For either of the above cases, the next step (block 6070) is to discard the keyblob in the device data structure (if applicable, i.e., if there is one to discard), as a correct one will be pushed into the kernel to the Xcrypt Manager 64 when the correct key is returned. The process of FIG. 11A starting at block 2090 is used to look up the key that goes with the key_id.

FIG. 17 is a flow chart showing a method for removing the encryption property of an eVLU, in accordance with one embodiment of the invention. In block 7010, a request is received to turn encryption off for a specific eVLU. In one embodiment, this is accomplished via an "off" command, such as (for embodiments implemented using POWERPATH ENCRYPTION WITH RSA) by using the command powervt xcrypt-off, for the given device name. A security/authentication check is made (block 7020), to authenticate the user sending the request and to verify that the user has the appropriate security privileges. If not, the attempt to turn encryption off fails and an error is returned (block 7030).

If security is OK, a check is made to see if the metadata on the device can be read (as part of verifying that the device is, in fact, encrypted (block 7025). If the metadata cannot be read, then the attempt to turn encryption off fails and an error is returned (block 7030). If the metadata location can be read, the metadata is checked to see if the eVLU is already unencrypted (e.g., by checking whether the metadata includes a key_id) (block 7040). If the device state is already UNENCRYPTED, then it is unnecessary to remove the encryption property and the process stops (block 7045).

If the device state is not UNENCRYPTED and the metadata location can be read, then the device cannot be in the UNKNOWN state, and is an encrypted device, although the device itself could be in one of three states at this point: ENCRYPTED; WAITING FOR KEY; and NO KEY (block 7050). An attempt is made to undo the eVLU encrypted property by attempting to remove the key_id from the metadata region of the eVLU (such as by setting a property of the key_id to null and size to zero, which indicates that the name/value pair for the key_id is no longer stored in the metadata.

If the attempt to undo the encryption property in metadata was unsuccessful (block 7055), then an error is returned. (Note that all processes from block 7025 on take place in the kernel). If the attempt was successful, then the keyblob and key_id are removed from the device data structure in the Xcrypt Manager 64 within the I/O filter driver 29 of the kernel 96 (block 7060). The device state is set in the device data structure to UNENCRYPTED. (block 7070) and all I/O to the LU is permitted, in accordance with FIGS. 18A, 18B, and FIG. 22, herein, although ability to decrypt the encrypted data is now lost (block 7080).

FIG. 18A is a table describing the behavior of the Xcrypt Manager 64 in handling I/O requests to devices in various states with regard to encryption, in accordance with one embodiment of the invention, and FIG. 18B is a legend for the table of FIG. 18A. Accordingly, whenever mention is made herein to FIG. 18A, it should be understood that FIG. 18A is interpreted in accordance with the legend of FIG. 18B. Note that the table of FIG. 18A includes several blocks in the UNENCRYPTED state that are labeled "n/a" (meaning "not applicable"). For example, if a device state is UNENCRYPTED, it is impossible to attempt any type of a write to an encrypted region, because there aren't any. Thus, such particular combinations in the table of FIG. 18A are listed as not applicable.

In addition, in one embodiment of the invention, for example, FIG. 18A describes I/O behavior of the Xcrypt Manager 64 (see FIG. 6) as it relates to the state of a device. It will be appreciated by those of skill in the art that that Table of FIG. 18A can be tailored for different platforms (e.g., Solaris, Windows, IBM, AIX, HP, etc.). Essentially, the Xcrypt Manager 64 can act as a "filter" for I/O requests made to devices that it manages; thus, in other embodiments of the invention, filtering modules (implemented via software, hardware, or both) are used to provide the functionality shown in FIG. 18A.

FIGS. 19-23, described further below, are flowcharts implementing the functionality of the tables of FIGS. 18A and 18B for the various device encryption states shown in FIG. 18A The following brief explanations also summarize the filtering functions represented by FIGS. 18A and 18B.

FIGS. 19-23 are not discussed in numerical order, but rather in the order in which the corresponding columns appear in the table of FIG. 18A.

As shown in the table of FIG. 18A, an in accordance with at least some embodiments of the invention, when a device is in one of the known encrypted key states (ENCRYPTED, WAITING FOR KEY, and NO KEY), the I/O request is processed based on one or more factors, such as I/O request type, whether the I/O request is a read or write and even the location on the device (i.e., to an unencrypted region or an encrypted region) to which the I/O request is directed. Even for encrypted devices, there may be areas or regions on the device where the data is not encrypted. For example, in embodiments of the invention implemented on the Solaris platform, a device formatted in accordance with the Solaris VTOC (volume table of contents) holds the label, VTOC, and geometry information in the first block (block 0) of the device. This first block is not encrypted for two reasons: (1) so that the kernel layers below the I/O filter driver 29 (e.g., code/processes that are executing below the I/O filter driver 29) in the I/O stack that need to access the information in this first block can do so; and (2) so that a process, application, program, etc., that is already running earlier in time than when the I/O filter driver 29 is loaded (i.e., when the Xcrypt Manager 64 is running) or before the encryption key is available to the Xcrypt Manager 64 can access block 0 if necessary. Access to the information in the first block of the device, as described above for the Solaris implementation, or the above two examples, does not in itself constitute a security violation. Another unencrypted region for VTOC formatted devices are areas at and beyond the alternate cylinders. Other platforms may have different unencrypted regions based on device format.

Allowing at least some types of I/O requests access to encrypted devices, (and/or at least portions of the unencrypted regions of encrypted devices), including encrypted devices that may be in a state of waiting for an encryption key or a state of not having an encryption key, even before the data encryption key (DEK) is ready, known, or available, provides certain advantages and may help to overcome certain types of problems. For example, some processes may execute above the I/O filter driver 29 (such as a volume manager or cluster software) and these processes may try to access an encrypted device (e.g., an encrypted logical unit (LU)) before the DEK is available. It can be problematic to fail or pend these types of I/O requests just because the DEK is not yet known or available, because failing or pending the I/O requests may cause failures in these other processes. Higher software layers, such as volume managers or cluster software, can have failures that can be unworkable enough to cause significant delays, system hangs, and potentially other problems.

In addition, allowing at least some types of I/O requests to access a device in an UNKNOWN state (that is where it is not known if the device is encrypted or not) provides similar advantages and help with overcoming similar types of problems, as well as problems that are unique to the unknown state. As an example of the latter type of problem, as further described herein, some types of I/O requests can help a device in an UNKNOWN state transition to a known state (that is, a state where it is known whether or not a device is encrypted and, if encrypted, it is known whether or not the key is available or if the device is waiting for the key).

As the Tables of FIG. 18A show, certain types of I/O requests directed to a device in a state other than UNENCRYPTED (e.g., one of ENCRYPTED, WAITING FOR KEY, NO KEY, OR Metadata (MD) UNKNOWN (also referred to herein as "UNKNOWN")) can be allowable I/O requests even if the DEK is not available or, in the case of the UNKNOWN state, when it isn't known whether the device is encrypted or not. Generally, I/O requests that are candidates for being allowable even without the DEK include (but are not limited to) I/O requests that do not require access to the encrypted data on an encrypted device, that do not change the locations of encrypted and unencrypted regions on the device (there are some exceptions to this, discussed further below), and/or that are I/O requests that are reads (including SCSI reads) to an unencrypted region. Another requirement for determining whether an I/O request is allowable even if the DEK is not available is whether allowing the request still allows for protection of the encrypted data in the device and protection of the metadata.

For example, one family of I/O requests that can be allowed includes I/O requests from higher-level processes (i.e., processes running above the I/O filter driver 29 in the I/O stack) where such requests do not actually require access to encrypted data itself, but instead involve performance of actions such as I/O control functions, opening or closing devices, checking device status, configuring devices, etc. Recall that the I/O filter driver 29, in at least one embodiment described herein, provides functionalities such as encryption and data protection for such higher level processes, but does not provide these functionalities for entities/components that sit "lower" than the I/O filter driver 29 in the I/O stack where such entities/components are considered to be "trusted" entities/components having a functionality that does not interfere with the I/O filter driver 29 providing encryption. The I/O filter driver 29 cannot control the behavior of the entities/components that are lower in the I/O stack, but, in accordance with the embodiments of the invention described herein, the I/O filter driver 29 appropriately accommodates the entities/components (e.g., keeping block 0 unencrypted in a Solaris VTOC platform, as described above).

In addition, as the table of FIG. 18A shows, other types of I/O requests from higher level processes also may also be allowable, such as "set" types of requests and reads to known fixed unencrypted regions of the device, because such requests are non-destructive to a given encrypted logical unit (that is, they cannot change any data on the device even if given access and/or do not redefine or reconfigure regions on the device, such as slice layout, which regions are encrypted and which are not, etc.). As the Table of FIG. 18B states, non-destructive I/O requests generally are defined to include any operation that 'gets' data or state from a device or about the device. General read I/O requests, for example, as well as direct or pass-through SCSI operations like Inquiry, Mode Sense, and Reads, are all considered to be non-destructive types of requests. Conversely, destructive is defined as anything not "non-destructive" or anything that can potentially change device data or state.

Furthermore, certain types of I/O requests can be allowed to occur even if such requests have the potential for destructive action on the encrypted device, provided the I/O request being allowed has the ability to help the device transition from an UNKNOWN to a known state.

Referring now to FIGS. 18A, 18B, and 22, for devices in the UNENCRYPTED state (first column of the table), the Xcrypt Manager 64 acts simply as a pass-through. Most I/O requests are simply passed through and effectively forgotten. Note that, per FIG. 18B, "Pass Through" means that the I/O request is allowed without any special processing and I/O completion for asynchronous I/O is not monitored; I/O is dispatched down the I/O stack, As FIG. 18A shows, the only exception in this behavior is for a Device State Check.

FIG. 22 is a flow chart showing a method for processing I/O requests for a device in an UNENCRYPTED state, in accordance with FIGS. 18A and 18B. Referring briefly to FIG. 22, if a device state is UNENCRYPTED (block 9300), and an I/O request is received (block 9305), a check is made as to whether the I/O request is a Device State Check (block 9310). If Yes, then the Device State Check is allowed and tracked (block 9320), per FIGS. 18A, 18B. For example, as FIG. 18B indicates, tracking means that the I/O request is allowed and action is taken on the I/O completion side. This is accomplished in FIG. 22, via block 9335, which states that when the I/O Done is received after completion of the I/O request, processing moves to block 4143 of FIG. 14 (which was discussed previously).

Referring again to block 9310 of FIG. 22, if a device's state is unencrypted and if the I/O request is not a Device State Check, then the I/O request is passed through (i.e., allowed), regardless of its type.

Referring to FIG. 18A, for devices in the ENCRYPTED key state, most I/O requests that are not reads or writes generally will be passed through (e.g., by the Xcrypt Manager 64), because being in the ENCRYPTED state means that the DEK is available. Note that, per FIG. 18A, reads and writes (including SCSI reads and SCSI writes) to encrypted (or partially encrypted) regions are handled according to FIGS. 12-14 herein. These I/O requests are encrypted on dispatch (for writes) and are tracked (i.e., are passed down the stack with appropriate action taken upon completion of the I/O) and decrypted upon completion (for reads). In some instances (e.g., per FIG. 18A, SCSI writes to an unencrypted region, Device State checks, writes to unencrypted regions, and destructive non-SCSI IOCTLs), a given I/O request can affect the state of the device and thus subsequent I/O requests, and so the I/O request is tracked (e.g., via the Xcrypt Manager 64) and action is taken on the completion side (i.e., when the I/O request is complete). Examples of I/O requests that can affect the state of device include, for the Solaris platform, a DKIOCSVTOC IOCTL or a write to block 0. For example, on the Solaris platform, such I/O requests can impact the slice layout of the device and hence the encrypted versus unencrypted areas of the device. Other types of I/O requests that can affect/change encrypted regions of the device, even in the ENCRYPTED state, include, for example, destructive IOCTLS. Such destructive IOCTLS are operating system specific, as will be appreciated by those of skill in the art, but generally include IOCTLS that format or partition of a given device. Other IOCTLs are passed through.

FIG. 23 is a flow chart showing a method for processing I/O requests for a device in the ENCRYPTED state (block 9400 of FIG. 23), in accordance with one embodiment of the invention. When an I/O request is received (block 9403), a check is made (block 9405) as to whether the I/O request is a non-destructive SCSI IOCTL, a non-destructive, non-SCSI IOCTL (i.e., the "other" rows of the table of FIG. 18A) or a non-destructive SCSI CDB. If the answer in block 9045 is Yes, then the I/O request is passed through and allowed to execute (block 9470). If the answer in block 9405 is No, a check is made (block 9415) as to whether the I/O request is one of the following: Open, Close, SCSI Reset, or SCSI Reset All. If the answer is Yes, the I/O request is passed through (block 9470).

If the answer at block 9415 is No, the I/O is checked (block 9420) to see if it is a Device State Check. Note that, per FIG. 18B, the Device State Check is a generalized mechanism that signals software components in the I/O stack to detect and react to possible device state changes. Such changes include anything related to the device state, attributes such as device size, and identity. Device State Checks are performed based on platform requirements. For example, an open may be a trigger on certain platforms.

If the answer at block 9420 is a Yes (the I/O request is a Device State Check), then the I/O request is allowed and tracked per FIGS. 18A and 18B (block 9430). When I/O Done is signaled for the Device State Check, processing goes to block 4143 of FIG. 14 (discussed previously). If the answer at block 9420 is a No, checks are made in blocks 9425 and 9440 to see if the I/O request is a read, a write, a SCSI CDB read, or SCSI CDB write that is directed towards an unencrypted region. If the I/O request is a read or SCSI CDB read to an unencrypted region, it is passed through (block 9470). If the I/O request is a write or SCSI CDB write to an unencrypted region, the request is allowed and tracked per FIGS. 18A, 18B (block 9430). That is, per Note (5) of FIG. 18B, when a device is in the ENCRYPTED state, writes to unencrypted regions are tracked if such writes potentially could change the encrypted regions on the device; else the writes to encrypted regions are passed through without tracking. For example, writes to block 0 for some operating systems potentially can alter the encrypted areas of the device.

If the answer at block 9420 is a No and, after processing blocks 9425 and 9440, the I/O request is not one of a read, a write, a SCSI CDB read, or SCSI CDB write to an unencrypted region, and the I/O request is checked (block 9450) to see if it is a write or SCSI CDB write to an encrypted region. If the answer at block 9450 is Yes, processing proceeds (block 9455) to block 4060 of FIG. 12 (described previously above). If the answer at block 9450 is No, the I/O request is checked (block 9460) to see if it is a read or SCSI CDB read to an encrypted region. If the answer at block 9460 is Yes, then processing proceeds (block 9465) to block 3060 of FIG. 13 (described previously above).

If the answer at block 9460 is No, the I/O request is checked (block 9465) to see if it is a destructive non-SCSI IOCTL (i.e., the "other" rows of the table of FIG. 18A) that can change the locations of encrypted regions of the device. If the answer is Yes, then the I/O request is allowed and tracked per FIGS. 18A, 18B (block 9430), and, at I/O Done (block 9435), processing proceeds to block 4143 of FIG. 14 (as discussed above). If the answer at block 9465 is No, than the I/O request falls into one of the categories in the table of FIG. 18A where it is permitted to pass through, and processing ends (block 9480).

Referring again to FIG. 18A, in general, the I/O request behavior when the device is in the WAITING FOR KEY state is to: 1) Pass through read I/O requests to unencrypted areas and pend remaining read and writes. 2) Pass through non-destructive IOCTLs (including non-SCSI non-destructive IOCTLS, i.e., "other" in FIG. 18A) and pend rest. This is highly platform dependent. 3) Pass-though non-destructive SCSI CDBs and pend rest. 4) Pass through Open, Close, SCSI Reset and SCSI Reset All. Pended I/O requests are restarted when one of two things happen: 1) The device state changes to ENCRYPTED (e.g., the xcrypt (userspace) daemon 102 passes down the corresponding keyblob thereby causing the Xcrypt Manager 64 to set the device state to ENCRYPTED); or 2) The device state changes to NO KEY either when the xcrypt (userspace) daemon 102 returns an indication that no key was found or when the timeout on waiting for the key set in block 2130 of FIG. 11A expires (e.g., FIG. 11B, blocks 2660-2670) causing the Xcrypt Manager 64 to set the device state to NO KEY. Those pended I/O requests are then restarted, and reevaluated based on the treatment of I/O requests for the ENCRYPTED or NO KEY states respectively.

Figure 19:
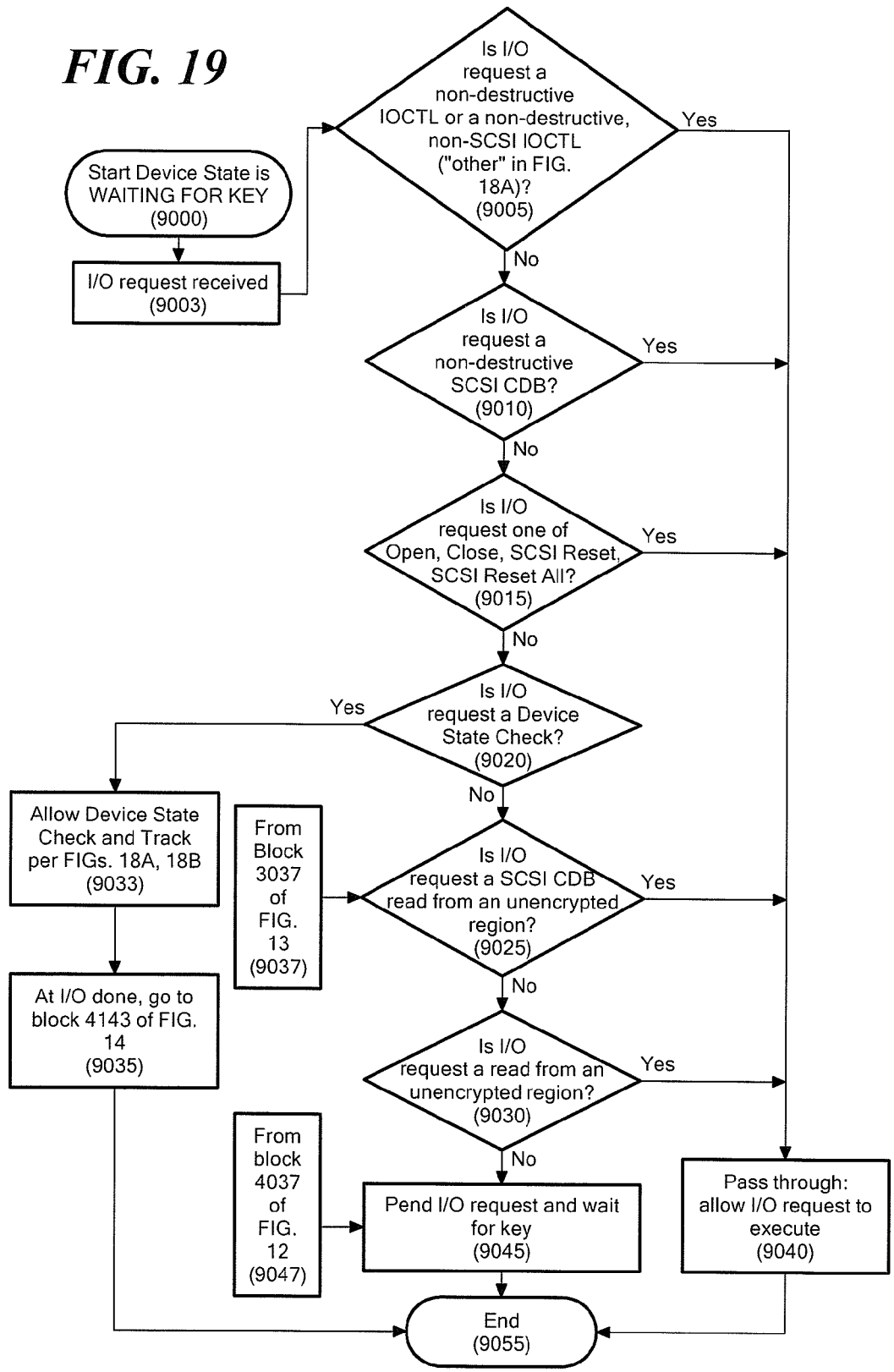
FIG. 19 is a flow chart showing a method for processing I/O requests for a device in a WAITING FOR KEY state, in accordance with FIGS. 18A and 18B.

FIG. 19 is a flow chart showing a method for processing I/O requests for a device in a WAITING FOR KEY state (block 9000), in accordance with one embodiment of the invention. When an I/O request is received (block 9003), a check is made (block 9005) to see if the request is a non-destructive SCSI IOCTL or a non-destructive, non-SCSI IOCTL (i.e., the "other" row in the table of FIG. 18A). If the answer at block 9005 is Yes, then the I/O request is passed through and allowed to execute (block 9040). If the answer at block 9005 is no, then a check is made (block 9010) to see if the I/O request is a non-destructive SCSI CDB. If the answer at block 9010 is Yes, then the I/O request is passed through and allowed to execute (block 9040). Examples of non-destructive SCSI CDBs that are allowable in an illustrative Solaris embodiment include (but are not limited to) so-called "get" types of commands (commands which "get" information but do not change it), such as Inquiry, Test Unit Ready, and Modesense. SCSI CDBs other than non-destructive SCSI CDBs (i.e., destructive SCSI CDBs) are pended.

Referring again to FIG. 19, if the answer to both 9005 and 9010 is No, a check is made (block 9015) as to whether the I/O request is one of: Open, Close, SCSI Reset, or SCSI Reset All. If the answer is Yes, the I/O request is passed through (block 9040).

If the answer at block 9015 is No, the I/O is checked (block 9020) to see if it is a Device State Check. If the answer at block 9020 is a Yes (the I/O request is a Device State Check), then the I/O request is allowed and tracked per FIGS. 18A and 18B (block 9033). When I/O Done is signaled for the Device State Check (block 9035), processing goes to block 4143 of FIG. 14 (discussed previously). If the answer at block 9020 is a No, a check is made at block 9025 to see if the I/O request is a SCSI CDB read from an unencrypted region. If the answer at block 9025 is Yes, it is passed through (block 9040). If the answer at block 9025 is no, a check is made at block 9030 to see if the I/O request is a read from an unencrypted region. If the I/O request is a read from an unencrypted region (i.e., the answer at block 9030 is Yes), it is passed through (block 9040). If the answer at block 9030 is no, then the I/O request is pended until the key is available (block 9045).

Note that a device can get into a NO KEY state during Startup Mode. (Startup Mode is defined below.) When I/O requests are pended during Startup Mode of a host, on some platforms, it could delay processing of some processes operating above the I/O filter driver 29 in the I/O stack or it could delay the entire Startup Mode process. Thus, on some platforms, rather than setting the state to WAITING FOR KEY when the key_id is retrieved, if the Xcrypt Manager 64 is in the Startup Mode, the state of the device is set immediately to NO KEY.

Referring again to FIG. 18A, the general processing for I/O requests when the device in the NO KEY state (e.g., the behavior of the Xcrypt Manager 64), for conditions in Post-Startup Mode, is to: 1) Pass through read IO to unencrypted areas and fail the rest. 2) Pass through non-destructive non-SCSI IOCTLs (the "other" row in table of FIG. 18A) and fail the rest. This is highly platform dependent. 3) Pass-though non-destructive SCSI CDBs and fail the rest. 4) Pass through Open, Close, SCSI Reset and SCSI Reset All. Note, this behavior is similar to the behavior already discussed in connection with the WAITING FOR KEY state, except that where I/O requests are pended in WAITING FOR KEY, they are failed for devices in the NO KEY state.

As FIG. 18A shows, there is one exception in the NO KEY state depending on whether the I/O request is being sent when the Xcrypt Manager 64 is operating in Startup Mode or not. Note that Startup Mode refers to a point in time when it is not known whether or not the xcrypt (userspace) daemon 102 is running and available to lookup DEKs. Until the xcrypt (userspace) daemon 102 indicates to the Xcrypt Manager 64 that it is running, the Xcrypt Manager 64 operates in Startup Mode.

If the I/O request is a non-destructive SCSI CDB request and the Xcrypt Manager 64 is in Startup Mode, the only type of I/O request that is permitted is the Inquiry request; all others are failed. Such limited availability during Startup Mode helps to prevent higher level processes from attempting access to a device when such a process has no chance of succeeding with such access, because no key is available. Inquiry thus is the only non-destructive SCSI CDB that is allowed. If Inquiry were not allowed (i.e., failing an Inquiry request), it would cause higher level processes to assume that the device no longer exists, or is temporarily disconnected. Once an encryption key eventually is retrieved, it would be harder to recover the higher level processes. In contrast, allowing an Inquiry from such a higher level process to succeed, while failing all other SCSI CDBs, produces the desired behavior of causing the higher level processes to try again later to access the device, when it is more likely that the Xcrypt Manager 64 has the key.

The following example problem and solution helps to further illustrate this issue. Consider an example where a higher level process configures itself and (SCSI) Inquires all devices and then makes further SCSI I/O requests that also succeed. The higher level process then attempts read operations, looking for its data on the device; however, that data is encrypted (for ENCRYPTED devices) and so the I/O filter driver 29 has to fail the IO (as the key not available yet). This would then cause the higher level process to look for alternate copies of its data on the device (and those attempts would fail), and other apparent attempts to recover its data. This ultimately causes Startup Mode to take a long time.

A solution to the above example that works is for the Xcrypt Manager 64 to allow a SCSI Inquiry (INQ), but fail all other SCSI I/O requests, even non-destructive requests, during Startup Mode. With some higher level processes, after the process sends a SCSI INQ request, the process follows by sending a SCSI Test Unit Ready (TUR) CDB. TUR is a SCSI command used to determine if a device is up and ready to accept read/write requests. By allowing INQ, but not allowing TUR (or other SCSI commands) (i.e., by failing TUR), the Xcrypt Manager 64 permits the higher level process to know device information and to let the higher level process note the existence of the device, but nothing more during early Startup Mode. This helps to discourage the higher level process from attempting any I/O request or other action that requires the encryption key, because there's no possibility of getting the encryption key at this point in time (during Startup Mode). The higher level process then "gives up" on the device and Startup Mode proceeds. This helps to avoid a long Startup Mode delay. When TUR fails, the higher level process attempts the command later, after a timeout period. Eventually, when the Xcrypt Manager 64 has the key, TUR will be allowed, and the higher level device can attempt I/O access to the device at a point when it will be successful.

Figure 20:
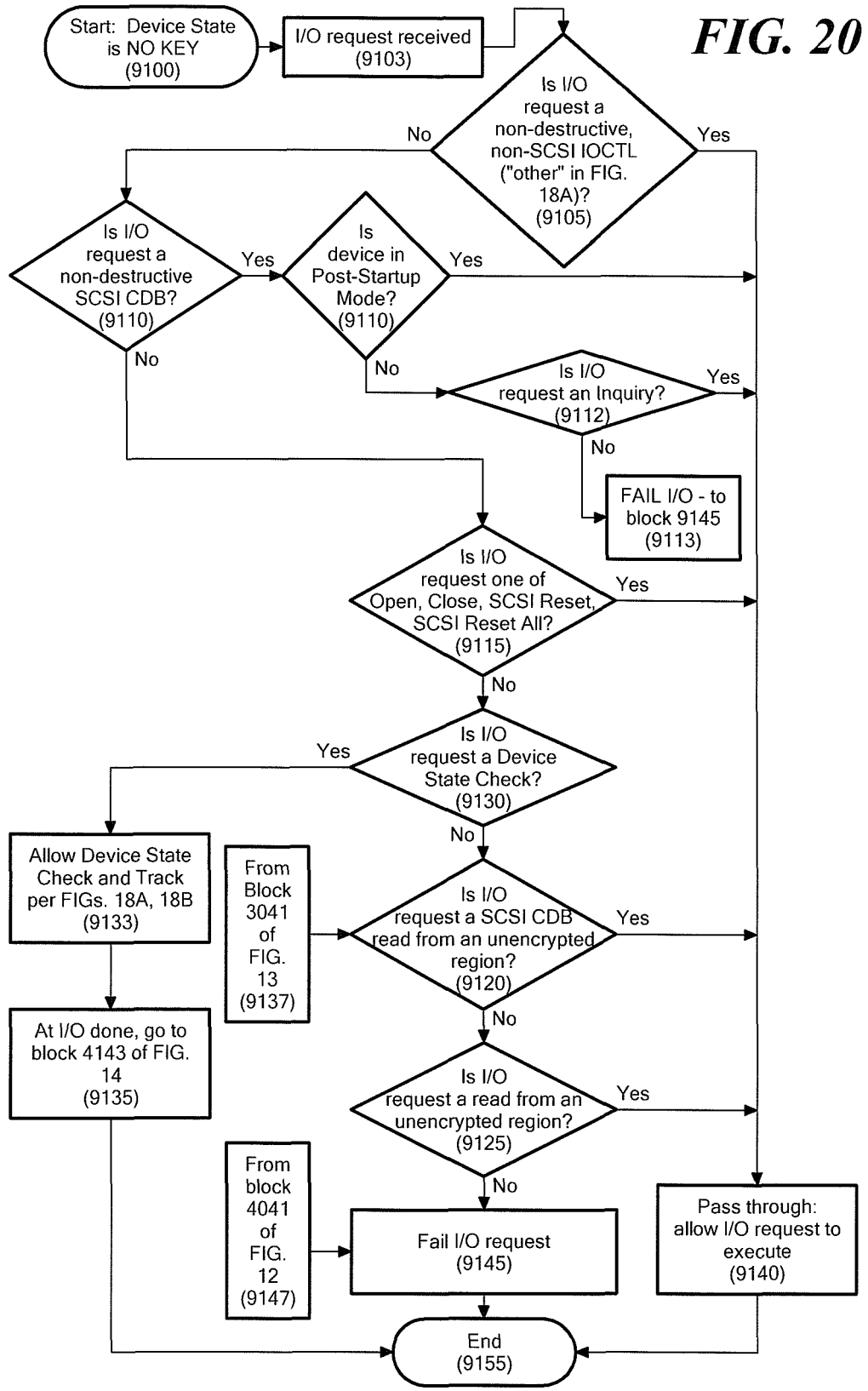
FIG. 20 is a flow chart showing a method for processing I/O requests for a device in a NO KEY state, in accordance with FIGS. 18A and 18B.

Referring now to FIG. 20, FIG. 20 is a flow chart showing a method for processing I/O requests for a device in a NO KEY state (block 9100), in accordance with one embodiment of the invention. When an I/O request is received (block 9103), a check is made (block 9105) to see if the I/O request is a non-destructive, non-SCSI IOCTL (i.e., the "other" row of FIG. 18A). If the answer is Yes, the I/O request is passed through (block 9140). Examples of non-destructive, non- SCSI IOCTLs, in one embodiment of the invention, include (but are not limited to) DKIOCGVTOC and DKIOCINFO on the Solaris platform.

If the answer is No at block 9105, the I/O request is checked (block 9110) to see if it is a non-destructive SCSI CDB. If the answer at block 9110 is Yes, a further check is made to determine if the Xcrypt Manager 64 is past Startup Mode (i.e., is Post-Startup Mode) (block 9111). In the table of FIG. 18A, the terms "Startup Mode" and "Post-Startup Mode" refer to an internal state in the Xcrypt Manager 64 where the initial state is Startup Mode. The transition from Startup Mode to Post-Startup Mode occurs when the encryption xcrypt (userspace) daemon 102 sends its first message from user-space to the Xcrypt Manager 64. Thus, the Post-Startup Mode state describes the knowledge of the Xcrypt Manager 64 that the xcrypt (userspace) daemon 102 is up and running (and responding to lookup requests). The timing of the transition during the Startup Mode/Post-Startup Mode cycle is platform dependent and on some platforms affects how I/O is handled.

Referring again to block 9111, if the I/O request is a non-destructive SCSI CDB and the Xcrypt Manager 64 is in Post-Startup Mode, then the I/O request is passed through (block 9140). If, however, the answer at block 9111 is No, then a further check is made of the I/O request to see if it is an Inquiry (block 9112). If the answer at block 9112 is Yes, then the I/O request is passed though (block 9140). If the answer at block 9112 is No, than the I/O request is Failed (block 9113) and processing jumps to block 9145 (fail I/O request).

Referring again to block 9110, if the I/O request is not a non-destructive SCSI CDB, the I/O request is checked to see if it is one of: Open, Close, Reset, or Reset All (block 9115). If the answer is Yes, the I/O request is passed through (block 9140).

If the answer at block 9115 is No, the I/O is checked (block 9130) to see if it is a Device State Check. If the answer at block 9130 is a Yes (the I/O request is a Device State Check), then the I/O request is allowed and tracked per FIGS. 18A and 18B (block 9133). When I/O Done is signaled for the Device State Check (block 9135), processing goes to block 4143 of FIG. 14 (discussed previously). If the answer at block 9130 is a No, checks are made in blocks 9120 and 9125 to see if the I/O request is a SCSI CDB read from an unencrypted region or a read from an unencrypted region. If the I/O request is a SCSI CDB read from an unencrypted region or a read from an unencrypted region, the I/O request is passed through (block 9140), else, the I/O request is failed (block 9145).

Referring again to FIG. 18A, the I/O request handling for I/O requests when the device is in the UNKNOWN state is to 1) Pass through read I/O to unencrypted areas and fail the rest. 2) Pass through non-destructive IOCTLs (including non-destructive non-SCSI IOCTLs—the "other" row in FIG. 18A) and fail the rest. 3) Pass-through non-destructive SCSI CDBs and fail the rest. 4) Pass through Open, Close, SCSI Reset and SCSI Reset All. The behavior in the UNKNOWN state is similar to that of the device in the NO KEY state, with some minor distinctions. For example, certain destructive CDBs are allowed (e.g., the AAS SCSI CDB, which is otherwise considered a destructive CDB) because they can help transition devices into an accessible state. For example, in one embodiment, the invention is implemented using POWERPATH ENCRYPTION with RSA in an environment using the EMC INVISTA product (a storage virtualization product). During migration of data from one system to another, INVISTA devices show up as having an UNKNOWN state. Allowing certain destructive CDBs, like the AAS (advanced array set) SCSI CDB, help to transition the INVISTA devices into an accessible state. Of course, as those of skill in the art will appreciate, allowing certain destructive CDBs can be helpful in other implementations, using other products, as well.

FIG. 21 is a flow chart showing a method for processing I/O requests for a device in an UNKNOWN state (block 9200) (i.e., a state where the metadata cannot be read), in accordance with one embodiment of the invention. An UNKNOWN state can occur, for example, if a given device is not turned on (although this is not the only cause for this state). When an I/O request is received (block 9203), a check is made (block 9205) to determine if the I/O request is a non-destructive SCSI IOCTL or a non-destructive, non-SCSI IOCTL (the "other" row in FIG. 18A). If the answer at block 9205 is Yes, then the I/O request is passed through and allowed to execute (block 9255). If the answer at block 9205 is No, then a check is made (block 9210) to determine whether the I/O request is a non-destructive SCSI CDB. If the answer at block 9210 is Yes, then the I/O request is passed through and allowed to execute (block 9255). If the answer at block 9210 is No, a check is made (block 9215) as to whether the I/O request is one of an Open, Close, Reset, or Reset All. If the answer is Yes, the I/O request is passed through (block 9255).

If the answer at block 9215 is No, the I/O request is checked (block 9220) to see if it is a destructive SCSI CDB that enables transitioning out of the UNKNOWN state (e.g., an AAS request). If the answer at block 9220 is Yes, then the I/O request is passed through (block 9255). If the answer at block 9220 is No, then the I/O is checked (block 9225) to see if it is a Device State Check. If the answer at block 9225 is a Yes (the I/O request is a Device State Check), then the I/O request is allowed and tracked per FIGS. 18A and 18B (block 9228). When I/O Done is signaled for the Device State Check (block 9235), processing goes to block 4143 of FIG. 14 (discussed previously).

If the answer at block 9225 is a No, a check is made to determine if the I/O request is a SCSI CDB read from a fixed unencrypted region (9240). A fixed unencrypted region means that it is a region that is known to be unencrypted and is configured so that it is fixed as unencrypted (i.e., is not reconfigurable to later become encrypted). An example of a fixed unencrypted region for many platforms is block 0 (block zero). For example, with VTOC type devices in Solaris, it is known that block 0 is a fixed unencrypted region, and this is true for some other platforms (e.g., Windows and AIX, for instance). Fixed unencrypted regions can be differentiated from non-fixed unencrypted regions, because some regions can transition from unencrypted to encrypted upon execution of certain I/O requests or other instructions. For example, often the "end" blocks of a device are variable unencrypted locations, because the size of a device can grow. If the device state is UNKNOWN, it is not possible to know whether the locations of the encrypted and unencrypted regions will change by the time the state of the device is known (note that the Device State Checks described herein and/or the process of FIG. 16 described herein will track such changes in the encrypted and unencrypted regions). Hence, the safest way to protect the encrypted data and the metadata is to permit reads only from fixed unencrypted regions.

If the I/O request is a SCSI CDB read from a fixed unencrypted region, then the I/O request is passed through (block 9255). If the I/O request is not SCSI CDB read from a fixed unencrypted region, then the I/O request is failed (block 9250).

The methods disclosed herein are especially useful in computer systems utilizing an enterprise storage system, however, one of ordinary skill in the art will appreciate that the features and principles of the present invention may be implemented in many other types of computer systems. One of ordinary skill in the art will also appreciate that features and principles of the present invention may be implemented in different components of a computer system with at least one associated data storage subsystem.

In describing the embodiments of the invention illustrated in the figures, specific terminology is used for the sake of clarity. However, the invention is not limited to the specific terms so selected, and each specific term at least includes all technical and functional equivalents that operate in a similar manner to accomplish a similar purpose.

As those skilled in the art will recognize, the invention described herein can be modified to accommodate and/or comply with existing and/or newly developed technologies and standards. In addition, variations, modifications, and other implementations of what is described herein can occur to those of ordinary skill in the art without departing from the spirit and the scope of the invention as claimed. Further, virtually any aspect of the embodiments of the invention described herein can be implemented using software, hardware, or in a combination of hardware and software.

It should be understood that, in the Figures of this application, in some instances, a plurality of system elements or method steps may be shown as illustrative of a particular system element, and a single system's element or method step may be shown as illustrative of a plurality of a particular systems elements or method steps. It should be understood that showing a plurality of a particular element or step is not intended to imply that a system or method implemented in accordance with the invention must comprise more than one of that element or step, nor is it intended by illustrating a single element or step that the invention is limited to embodiments having only a single one of that respective elements or step. In addition, the total number of elements or steps shown for a particular system element or method is not intended to be limiting; those skilled in the art will recognize that the number of a particular system element or method steps can, in some instances, be selected to accommodate the particular user needs. Moreover, the steps of the disclosed methods may be modified in any manner, including by reordering steps and/or inserting or deleting steps, without departing from the principles of the invention.

The processes, flow charts, and flow diagrams provided herein do not depict the syntax of any particular programming language. Rather, they illustrate the functional information one of ordinary skill in the art requires to fabricate circuits or to generate computer software to perform the processing required of the particular apparatus. It should be noted that many routine program elements, such as initialization of loops and variables and the use of temporary variables, are not shown. It will be appreciated by those of ordinary skill in the art that unless otherwise indicated herein, the particular sequence of steps described is illustrative only and can be varied without departing from the spirit and scope of the invention.

It is believed that computer programs based on the written description and methods of this invention are within the skill of an experienced developer. The various programs or program modules can be created using any of the techniques known to one skilled in the art or can be designed in connection with existing software. For example, program sections or program modules can be designed in or by means of Java, C, C++, HTML, XML, or HTML with included Java applets. In addition, one or more of such software sections or modules can be integrated into a computer system or browser software.

Although the invention has been described and pictured in a preferred form with a certain degree of particularity, it is understood that the present disclosure of the preferred form, has been made only by way of example, and that numerous changes in the details of construction and combination and arrangement of parts may be made without departing from the spirit and scope of the invention as hereinafter claimed.

The invention claimed is:

1. A method of controlling access to an encrypted storage device configured to be in operable communication with a computer system, the encrypted storage device capable of being in a state, the method comprising the unordered steps of:
 (a) receiving an input/output (I/O) request directed to the encrypted storage device;
 (b) checking whether the encryption key for the encrypted storage device is available;
 (c) if the encryption key is not yet available:
  (c-1) allowing the I/O request if it does not require access to actual encrypted data stored on the encrypted storage device;
  (c-2) allowing the I/O request if it comprises a predetermined input/output control (IOCTL), the predetermined IOCTL comprising one of reset, reset all, and a non-destructive non small computer standard interface (SCSI) IOCTLs;
  (c-3) allowing the I/O request if it comprises a predetermined, non-destructive SCSI command descriptor block (CDB);
  (c-4) allowing the I/O request if it that enables an entity that sent the I/O request to avoid a malfunction in its operation;
  (c-5) allowing the I/O request if it opens or closes the encrypted storage device; and
  (c-6) allowing the I/O request if it checks the state of the encrypted storage device; and
 (d) else, if the encryption key is not available and the I/O request is not one of (c-1) through (c-6), denying the I/O request.

2. The method of claim 1, further comprising the unordered step of
 (e) tracking the I/O request if the I/O request comprises a check of the state of the encrypted storage device.

3. The method of claim 1, further comprising the unordered steps of:
 (f) determining whether the encrypted storage device is in a known state or an unknown state, wherein the unknown state of the encrypted storage device comprises a condition where the encrypted storage device's state cannot be determined; and
 (g) if the state of the encrypted storage device comprises the unknown state, allowing the I/O request if it comprises a predetermined destructive SCSI CDB that is capable of transitioning the encrypted storage device from the unknown state to one of the known states.

4. The method of claim 3, further comprising the unordered step of:
 (h) if the encrypted storage device is in a known state, determining whether the known state comprises one of having an encryption key, waiting for an encryption key, and having no encryption key;
 wherein the state of having an encryption key comprises a state where the encryption key has become available and all I/O requests to the encrypted storage device will be permitted;
 wherein the state of waiting for an encryption key comprises a state where there is no encryption key available for the encrypted storage device and the time for obtaining the encryption key has not expired; and wherein the state having no encryption key comprises a state where there is no encryption key and the time for obtaining the encryption key has expired.

5. The method of claim 1, wherein the encrypted storage device further comprises an unencrypted region, the unencrypted region having a location and size and storing therein unencrypted metadata relating to the encryption of the encrypted device, and wherein the method further comprises the unordered step of:
(j) failing the I/O request if it is capable of damaging, destroying, changing, providing access to, or otherwise altering any portion of any one or more of: the unencrypted region, the location of the unencrypted region, the size of the unencrypted region, and the metadata stored in the first unencrypted region.

6. The method of claim 4, wherein the method further comprises the unordered steps of:
(j) if the encrypted storage device is in a Startup Mode and in the having no encryption key state:
(j-1) allowing a SCSI CDB that comprises a SCSI Inquiry CDB and;
(j-2) failing all SCSI CDBs other than SCSI Inquiry CDBs.

7. The method of claim 4, further comprising the unordered steps of:
(m) if the encrypted storage device is in Post-Startup mode and in the having no encryption key state:
(m-1) allowing the I/O request if it comprises a read or SCSI CDB read to an unencrypted area on the encrypted storage device;
(m-2) allowing the I/O request if it comprises a read or SCSI CDB read, so long as the I/O request is not directed to any encrypted locations on the encrypted storage device;
(m-3) allowing the I/O request if it comprises a non-destructive SCSI CDB; and
(m-4) allowing the I/O requests if it comprises one of Open, Close, SCSI Reset, and SCSI Reset All; and
(n) if the encrypted storage device is in Post-Startup mode and in the having no encryption key state, failing all other I/O requests that do not comprise one of ((m-1) through (m-4)).

8. The method of claim 1, further comprising the unordered steps of:
(o) if the encrypted storage device is in the waiting for encryption key state:
(o-1) allowing the I/O request if it comprises a read or SCSI CDB read, so long as the I/O request is not directed to any encrypted locations on the encrypted storage device;
(o-2) allowing the I/O request if it is determined to comprise a non-destructive IOCTL, non-destructive non-SCSI IOCTL, or non-destructive SCSI CDBs; and
(o-3) allowing I/O requests that comprise one of Open, Close, SCSI Reset, and SCSI Reset all; and
(p) if the encrypted storage device is in the waiting for encryption key state, pending all I/O requests that do not comprise one of (o-1) through (o-3).

9. The method of claim 4, further comprising the unordered step of:
(i) wherein if the encrypted storage device is in the state of waiting for an encryption key:
(i-1) denying the I/O request if it is capable of allowing access to encrypted information on the encrypted storage device without the key; and
(i-2) denying the I/O request if it is capable of changing, damaging, destroying, or otherwise altering any portion of encrypted information stored on the encrypted storage device without also helping the storage device transition from an unknown state to a known state.

10. The method of claim 4, wherein the encrypted storage device further comprises a region that is unencrypted, and wherein, if the encrypted storage device is in a state of waiting for an encryption key, the method further comprises the unordered step of
(q) allowing the I/O request if it is directed to the region that is unencrypted.

11. The method of claim 4, wherein the state of the encrypted storage device comprises having an encryption key and wherein the encrypted storage device further comprises an encrypted region having a size and storing encrypted data therein, wherein the method further comprises the unordered step of:
(r) tracking the I/O request if it comprises an I/O request capable of changing either the size of or encrypted data stored in the encrypted region.

12. The method of claim 4, wherein the method further comprises the unordered steps of:
(s) if the state of the encrypted storage device comprises waiting for an encryption key:
(s-1) allowing the I/O request if it does not require access to actual encrypted data stored on the encrypted storage device;
(s-2) allowing the I/O request if it comprises a predetermined input/output control (IOCTL), the predetermined IOCTL comprising one of reset, reset all, and a non-destructive non small computer standard interface (SCSI) IOCTL;
(s-3) allowing the I/O request if it comprises a non-destructive SCSI command descriptor block (CDB);
(s-4) allowing the I/O request if it enables an entity that sent the I/O request to avoid a malfunction in its operation;
(s-5) allowing the I/O request if it prevents malfunction of a predetermined process layer wherein proper operation of the predetermined process layer is required for proper operation of the computer system;
(s-6) allowing, if the encrypted storage device further comprises an unencrypted region, the I/O request if it is directed to the unencrypted region of the encrypted storage device and that comprise reads or SCSI CDB reads;
(s-7) allowing the I/O request if it opens or closes the encrypted storage device;
(s-8) allowing the I/O request if it checks the state of the storage device; and
(t) else, if the state of the encrypted storage device comprises waiting for an encryption key, pending all other I/O requests that do not comprise one of (s-1) through (s-8).

13. The method of claim 4, further comprising the unordered steps of:
(u) if the state of the storage device comprises encrypted and waiting for a key:
(u-1) failing the I/O request if it is that are capable of allowing access to encrypted information on the encrypted storage device without the key; and
(u-2) failing the I/O if it is capable of changing, damaging, destroying, or otherwise altering any portion of encrypted information stored on the encrypted storage device.

14. The method of claim 4, further comprising the unordered steps of:
(v) if the encrypted storage device is in a state of having no encryption key and is also in a Startup mode:
(v-1) allowing the I/O request if it does not require access to actual encrypted data stored on the encrypted storage device;

(v-2) allowing the I/O request if it that comprises a predetermined input/output controls (IOCTL), the predetermined IOCTL comprising one of reset, reset all, and a non-destructive non small computer standard interface (SCSI) IOCTL;

(v-3) allowing the I/O request if it comprises a predetermined, non-destructive SCSI Inquiry command descriptor block (CDB);

(v-4) allowing the I/O request if it enables an entity that sent the I/O request to avoid a malfunction in its operation;

(v-5) allowing the I/O request if it prevents malfunction of a predetermined process layer, wherein proper operation of the predetermined process layer is required for proper operation of the computer system;

(v-6) allowing the I/O request if it opens or closes the storage device; and (v-7) allowing the I/O request if it checks the state of the storage device.

15. The method of claim 4 further comprising the unordered steps of:

(w) if the encrypted storage device is in a state of having no encryption key and is also in a Post-Startup mode:

(w-1) allowing the I/O request if it does that do not require access to actual encrypted data stored on the encrypted storage device;

(w-2) allowing the I/O request if it comprises a predetermined input/output controls (IOCTL), the predetermined IOCTL comprising one of reset, reset all, and a non-destructive non small computer standard interface (SCSI) IOCTL;

(w-3) allowing the I/O request if it comprises a non-destructive SCSI command descriptor block (CDB);

(w-4)(d) allowing the I/O request if it enables an entity that sent the I/O request to avoid a malfunction in its operation;

(w-5) allowing the I/O request if it prevents malfunction of a predetermined process layer, wherein proper operation of the predetermined process layer is required for proper operation of the computer system;

(w-6) allowing the I/O request if it opens or closes the encrypted storage device; and (w-7) allowing the I/O request if it that checks the state of the encrypted storage device; and (x) else, if the encrypted storage device is in a state of having no encryption key and is also in a Post-Startup mode, failing the I/O request if it does not comprise are not one of (w-1) through (w-7) above.

16. The method of claim 4, further comprising the unordered steps of:

(x) configuring a metadata region on the encrypted storage device, the metadata region having a location and size and being accessible only to a predetermined process, the metadata region comprising unencrypted information indicating whether or not any other region of the encrypted storage device is encrypted and, if any other region of the storage device is encrypted, comprising information relating to the encryption key; and (y) failing the I/O request if it is capable of damaging, destroying, changing, providing access to, or otherwise altering any portion of any one or more of: the metadata region, the location of the metadata region, the size of the metadata region, and the metadata stored in the first metadata region.

17. The method of claim 4, wherein the encrypted storage device further comprises a first region that is unencrypted and a second region that is encrypted, wherein the method further comprises the unordered step of:

(z) if the state of the encrypted storage device comprises encrypted and having an encryption key available, tracking the request if it comprises an I/O request capable of changing the encrypted region of the encrypted storage device.

18. A system for controlling access to encrypted information, the system comprising:

an encrypted storage device storing encrypted information therein, the encrypted storage device capable of being in either an unknown state or at least one known state, wherein the known state comprises one of having an encryption key, waiting for an encryption key, and having no encryption key;

a processor in operable communication with the encrypted storage device, the processor programmed to:

(a) receive an input/output (I/O) request directed to the encrypted storage device;

(b) check whether the encryption key for the encrypted storage device is available;

(c) if the encryption key is not yet available:

(c-1) allow the I/O request if it does not require access to actual encrypted data stored on the encrypted storage device;

(c-2) allow the I/O request if it comprises a predetermined input/output control (IOCTL), the predetermined IOCTL comprising one of reset, reset all, and a non-destructive non small computer standard interface (SCSI) IOCTL;

(c-3) allow the I/O request if it comprises a predetermined, non-destructive SCSI command descriptor block (CDB);

(c-4) allow the I/O request if it enables an entity that sent the I/O request to avoid a malfunction in its operation;

(c-5) allow the I/O request if it opens or closes the encrypted storage device; and (c-6) allow the I/O request if it checks the state of the encrypted storage device; and (d) else, if the encryption key is not available and the I/O request is not one of (c-1) through (c-6), fail the I/O request.

19. The system of claim 18, wherein the processor is further programmed to:

(f) determine whether the encrypted storage device is in a known state or an unknown state, where the unknown state of the encrypted storage device comprises a condition where the encrypted storage device's state cannot be determined; and (g) if the state of the encrypted storage device comprises the unknown state, allow the I/O requests if it comprises a predetermined destructive SCSI CDB that is capable of transitioning the encrypted storage device from the unknown state to one of the known states.

20. The system of claim 18, wherein, if the encrypted storage device is in the state of waiting for an encryption key, the processor is further programmed to:

(i) fail the I/O request if it is capable of allowing access to encrypted information on the encrypted storage device without the key; and (j) fail the I/O request if it is are capable of changing, damaging, destroying, or otherwise altering any portion of encrypted information stored on the encrypted storage device without also helping the storage device transition from an unknown state to a known state.

* * * * *